(12) United States Patent
Rosso

(10) Patent No.: US 8,583,843 B2
(45) Date of Patent: Nov. 12, 2013

(54) COMMUNICATIONS CONTROL BUS AND APPARATUS FOR CONTROLLING MULTIPLE ELECTRONIC HARDWARE DEVICES

(76) Inventor: Roberto Rosso, Montreal (CA)

( * ) Notice: Subject to any disclaimer, the term of this patent is extended or adjusted under 35 U.S.C. 154(b) by 542 days.

(21) Appl. No.: 12/597,605

(22) PCT Filed: Apr. 25, 2008

(86) PCT No.: PCT/CA2008/000846
§ 371 (c)(1),
(2), (4) Date: Mar. 16, 2010

(87) PCT Pub. No.: WO2008/131565
PCT Pub. Date: Nov. 6, 2008

(65) Prior Publication Data
US 2011/0106996 A1  May 5, 2011

Related U.S. Application Data

(60) Provisional application No. 60/966,556, filed on Apr. 26, 2007.

(51) Int. Cl.
*G06F 13/00* (2006.01)
*G06F 13/364* (2006.01)

(52) U.S. Cl.
CPC .................................. *G06F 13/364* (2013.01)
USPC ....................................................... 710/110

(58) Field of Classification Search
USPC ............ 710/104–112, 300–317, 8–19, 62–64
See application file for complete search history.

(56) References Cited

U.S. PATENT DOCUMENTS

| | | | |
|---|---|---|---|
| 5,054,022 A | 10/1991 | Van Steenbrugge | |
| 5,457,446 A | 10/1995 | Yamamoto | |
| 5,608,611 A | 3/1997 | Szudarek et al. | |
| 5,621,662 A * | 4/1997 | Humphries et al. | 700/276 |
| 5,880,677 A | 3/1999 | Lestician | |
| 6,016,523 A * | 1/2000 | Zimmerman et al. | 710/63 |
| 6,076,124 A * | 6/2000 | Korowitz et al. | 710/301 |
| 6,516,366 B1 * | 2/2003 | Gates et al. | 710/105 |
| 6,529,144 B1 | 3/2003 | Nilsen et al. | |
| 6,700,333 B1 | 3/2004 | Hirshi et al. | |
| 6,864,798 B2 | 3/2005 | Janik | |
| 6,892,265 B2 * | 5/2005 | Sagues et al. | 710/301 |
| 6,967,565 B2 | 11/2005 | Lingemann | |
| 7,822,896 B1 * | 10/2010 | Sagues et al. | 710/104 |
| 2001/0043719 A1 | 11/2001 | Harakawa et al. | |

* cited by examiner

*Primary Examiner* — Raymond Phan
(74) *Attorney, Agent, or Firm* — Philip Swain; Fasken Martineau DuMoulin LLP

(57) ABSTRACT

Disclosed is a communications control bus. The bus comprises an IMB slave CPU, at least two registers, and a three bit data connector, which connects the two registers. The connector permits transmission of a three bit data signal between the two registers. A network interconnects the two registers and the IMB slave CPU.

60 Claims, 41 Drawing Sheets

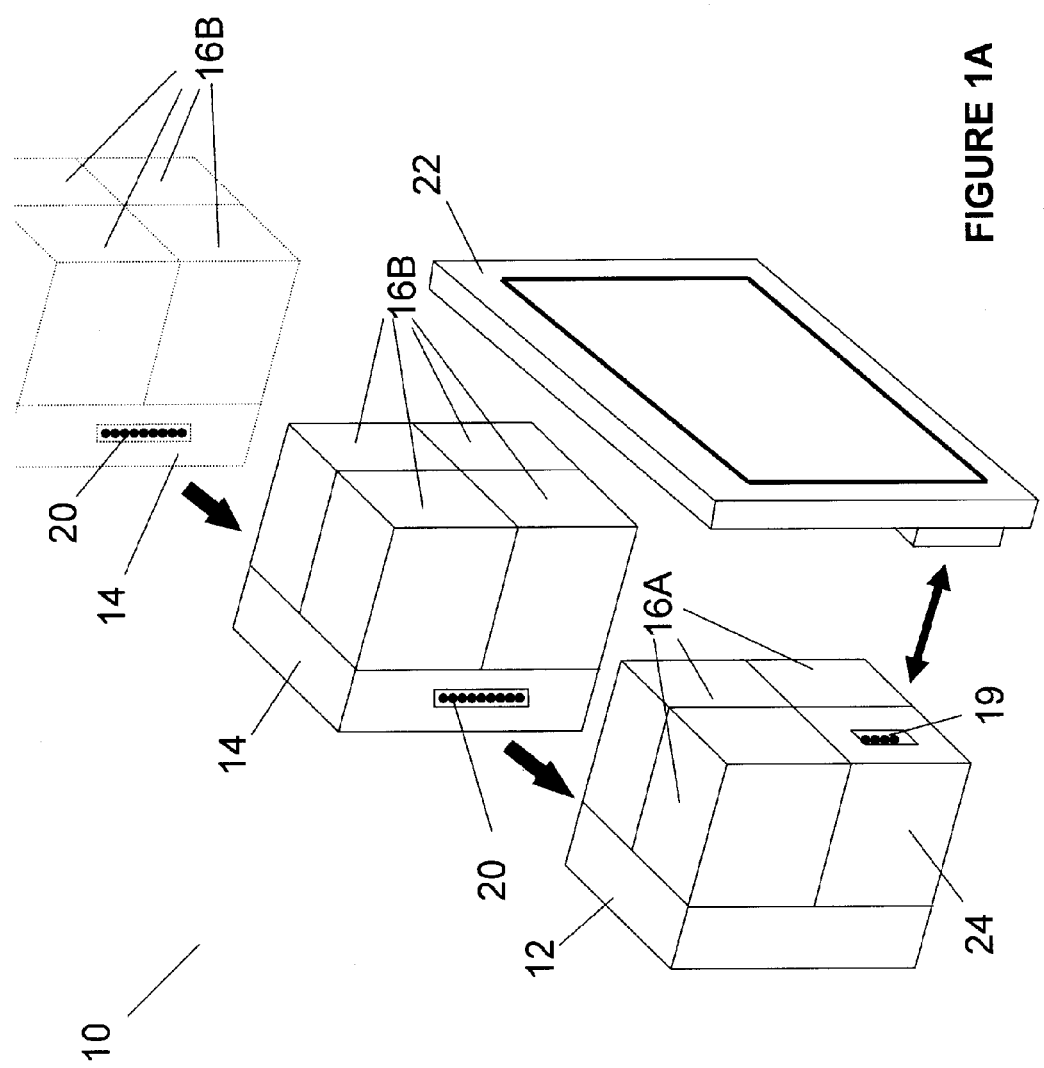

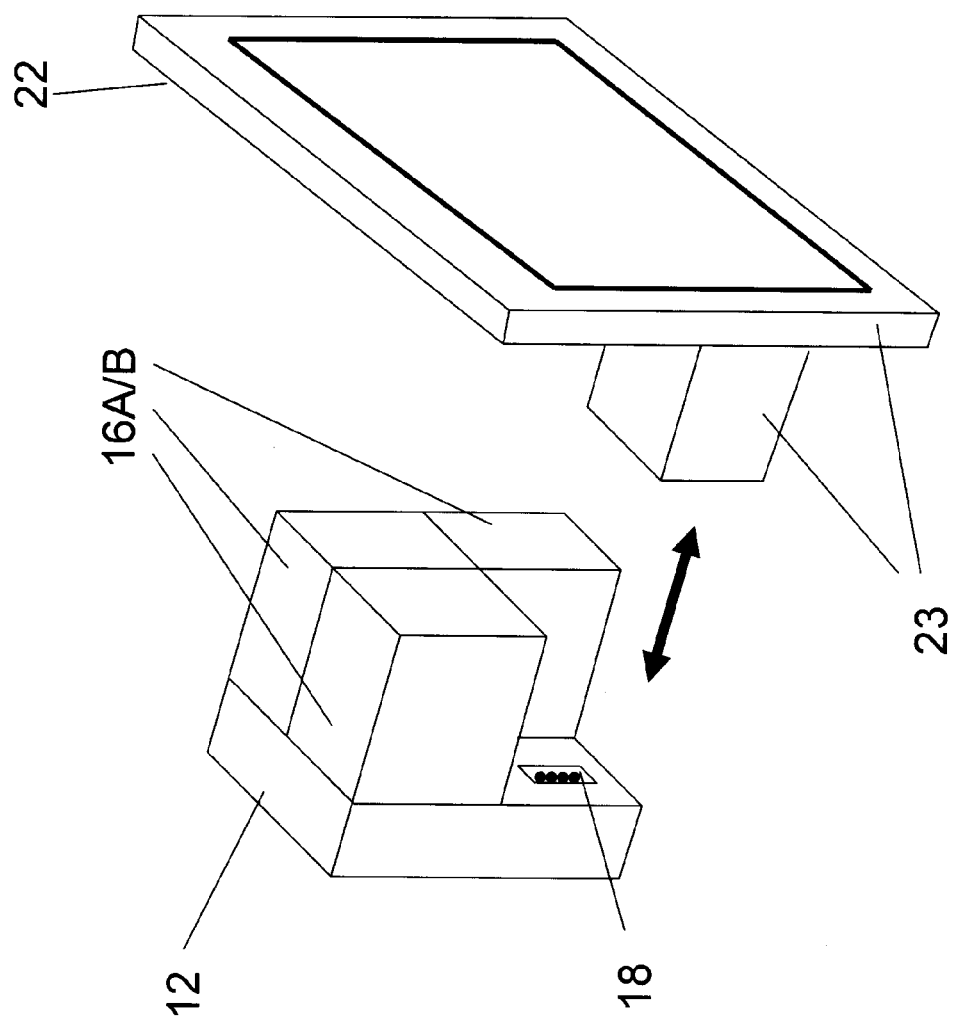

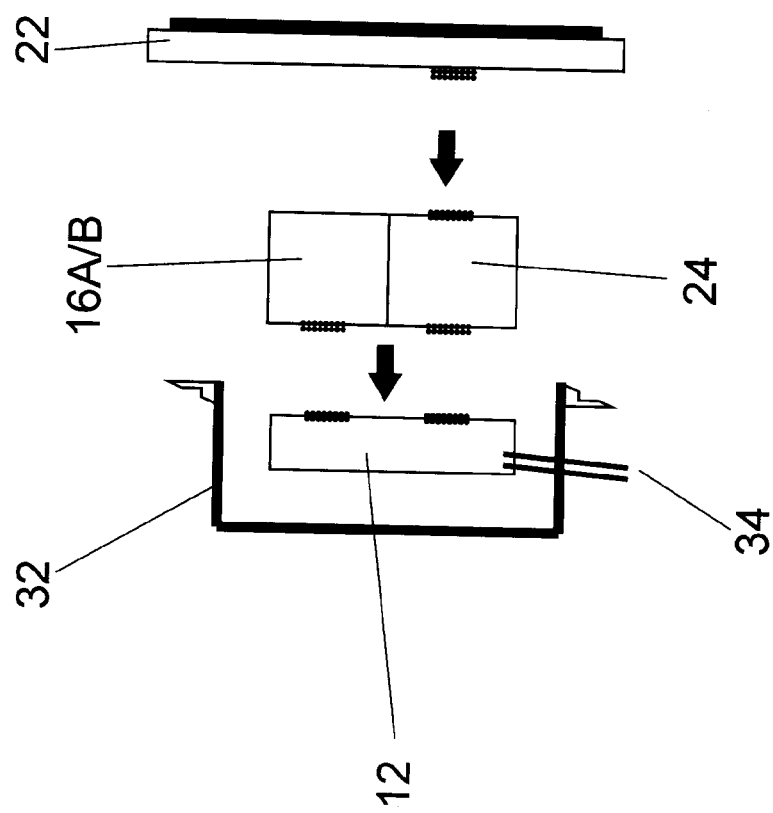

COMMUNICATIONS CONTROL BUS AND APPARATUS FOR CONTROLLING MULTIPLE ELECTRONIC HARDWARE DEVICES

RELATED APPLICATIONS

Pursuant to 35 U.S.C. § 365(c), this application claims the benefit of PCT International Application Number PCT/CA2008/000846, which designates the U.S. and has an international filing date of Apr. 25, 2008, and which claims priority to U.S. Provisional Application Number 60/966,556 filed Apr. 26, 2007, and which is herein incorporated by reference in its entirety.

FIELD OF THE INVENTION

The present invention concerns a communications control bus, and more particularly to a control bus for controlling multiple electronic hardware devices.

BACKGROUND OF THE INVENTION

Building automation systems are well known and widely used in residences and industrial environments. Typically, multiple systems and devices such as climate control, lighting, temperature control and the like are controlled by a controller located remotely from the systems to be controlled.

Power Line Carrier (PLC) technology or protocol is one technology that has existed for over twenty years and uses a command signal transmitted over the existing 120 volt home electrical wiring system. However, some PLC systems are subject to interference from other electrical systems, creating such inconveniences as unanswered or false commands.

Wireless technology using radio frequencies (RF) are sometimes used in newer home constructions, but more typically is used in older homes for expanding existing hardwired systems. Typically, a command signal is transmitted by radio waves to a central controller. However, this topology requires additional hardware and space to accommodate the central controller and is usually a closed platform, which prevents the user from modifying certain logic sequences or adding specific hardware functionality.

Low voltage hardwired systems have been used for over forty years to create a communications network within the home. This technology uses communications over a data path over wires placed in the walls of the house before they are covered with plaster. Each control device includes a copper wire connecting it to a main controller. Furthermore, with the advent of computer controlled systems and controlling software, the remote control of the multiple systems and devices would appear to be straightforward. However, to install such systems in buildings, typically the interior of the buildings have to be re-modeled. In residential environment, such as homes, remodeling can be prohibitively expensive and typically requires structural modifications to walls and existing wiring to install additional complex wiring to accommodate such controller systems.

A number of examples have been disclosed which address the aforesaid problems. In U.S. Pat. No. 6,980,080, issued on Dec. 27, 2005 to Christensen et al., a wireless home automation system is disclosed in which multiple controllers control a variety of functions using a two-way communication with a number of devices such as lighting, burglar alarms, thermostats and the like. This system appears to rely on learnt information between the controllers, which is stored in a memory for each controller. In U.S. Pat. No. 6,967,565 issued on Nov. 22, 2005 to Lingemann, a building automation system is disclosed which uses multiple user interface units with touch screens, power drivers and a controller. All of these are connected to a common trunk conductor. From the user interface unit, multiple electrical devices in a building may be controlled by the units and wireless remote controls. In U.S. Pat. No. 6,865,596, issued on Mar. 8, 2005 to Barber et al., a master controller in a control area network system is disclosed, within a larger control area network, and which may have a number of devices connected to it. The master controller has a device manager which provides a so-called "virtual device". U.S. Pat. No. 6,813,525, issued on Nov. 2, 2004 to Reid et at discloses a programmable control system which includes a control module having one or more inputs to which a sensor device can be connected. Also included is an external actuator device which can be used for manual override and status feedback. This system appears to rely on a learning mode and a memory to store characteristics of the external sensor. In U.S. Pat. No. 6,192,282, issued on Feb. 20, 2001 to Smith et al., a building automation system, which is modular in design is disclosed and which minimizes the amount of instruction needed to control a building system. The system appears to operate by translating control instructions in one control protocol to control instructions in a second control protocol. In U.S. Pat. No. 5,706,191, issued on Jan. 6, 1998 to Bassett et al., a method for bringing an appliance and/or a mechanical/electrical system of a residence into communication with another is disclosed. To achieve this, each appliance is provided with an appliance interface module apparatus. U.S. Pat. No. 5,557,545, issued on Sep. 17, 1996 to Loffel et al., discloses an automatic control for a power plant with a number of interacting plant components having an automation system which is shared by the plant components, and with automation devices executing various functions. The automation devices are connected to each other and to a master control unit though a data bus which transmits plant relevant data. U.S. Pat. No. 5,289,365, issued on Feb. 23, 1994 to Caldwell et al., discloses a module electrical control system for controlling office equipment. The system includes a number of control modules which are interconnected with an input module via a bus assembly. A keypad appears to generate an input signal, an output port to which the system bus assembly is connected and a circuit which is responsive to the input signal for supplying a command signal to the output port. The system bus assembly includes at least two signal channels, one of which is selectively supplied with a switched low voltage signal, the other being selectively supplied with a data signal. In U.S. Pat. No. 5,128,855, issued on Jul. 7, 1992 to Hilber et al., a system for controlling an operating installation of a building's automation system is disclosed. The system comprises a control module which serves as a master transmitter-receiver and a function module, which serves as a slave transmitter. A bus connection includes a bus rail which connects the control module and the function module to transmit addresses and data, and operating voltages. In US patent application Ser. No. 2005/0125083, published on Jun. 9, 2005 to Kilco, a server-based system for providing a substantially automated operation and control of a number of functions within a premises, such as residence, is disclosed.

The aforesaid designs suffer from a number of significant drawbacks. None of the designs appear to be retrofittable into an existing household wiring network using existing household electrical boxes. The designs appear to be complex and may be prohibitively expensive to install into industrial, commercial or household environments. Some of the designs appear to be server based, which may not be practical for household systems control. In one example, each appliance to be controlled appears to be provided with an interface module, which presumably would mean that each household appliance would have to be wired up to its AIM. This may be prohibitively expensive and would require modifying existing appliances.

Thus, there is a need for an improved controller for remotely controlling multiple electronic hardware devices, which is simple to install and modular with straightforward expandability.

SUMMARY OF THE INVENTION

I have made a surprising and unexpected discovery that multiple electronic hardware devices can be remotely controlled from a single location. This is achieved by using a modified control bus, the design of which allows a simple "plug in" of expandable modules which quadruples the available circuitry from a single location. The bus is located in a module, which can be retrofitted into an existing household electrical box, such as found in light switches, thereby significantly reducing, or essentially eliminating, the need for remodeling an existing wiring system in a house. Advantageously, this reduces the cost of remodeling and disruption of the household.

Accordingly in one aspect, there is provided a communications control bus, the bus comprising:
a) an IMB slave CPU;
b) at least two registers;
c) a first three bit data connector for connecting the at least two registers, the connector permitting transmission of a three bit data signal between the at least two registers; and
d) a network interconnecting the at least two registers and the IMB slave CPU.

Typically, the at least two registers comprise:
a) a first control register; and
b) a first data register;
e) the network interconnecting the first control register and the first data register, the network being configured such that in response to a first at least 8 bit data signal being received at the first control register, a first 3 bit disable command signal is transmitted by the first control register to the first data register.

Typically, the at least two registers further comprise:
a) a second control register;
b) a second data register;
c) a third control register;
d) a third data register;
e) a fourth control register; and
f) a fourth data register;
g) the network being configured such in response to second, third, and fourth at least 8 bit data signals being received respectively at the second, third and fourth control registers, a second, third and fourth 3 bit disable command signal is transmitted to the respective second, third and fourth data registers.

In one example, the network is configured such in response to fifth, sixth, seventh and eighth at least 8 bit data signals being received respectively at the first, second, third and fourth control registers, a fifth, sixth, seventh, and eighth 3 bit load command signal is transmitted to the respective first, second, third and fourth data registers so that each data register is permitted to receive at least 8 bits of data. The network is configured such in response to ninth, tenth, eleventh and twelfth at least 8 bit data signals being received respectively at the first, second, third and fourth control registers, a fifth, sixth, seventh and eighth 3 bit disable command signal is transmitted to the respective first, second, third and fourth data registers. The network is configured such in response to a 3 bit unload command signal is transmitted to the respective first, second, third and fourth data registers from the respective first, second, third and fourth control registers, the at least 8 bits of data stored in the data registers is transmitted to the IMB slave CPU. The first control register is paired with the first data register; the second control register is paired with the second data register; the third control register is paired with the third data register; and the fourth control register is paired with the fourth data register. The at least two registers are connected by a 3 bit command signal. In one example, a first 32 bit stream of data is received by the first, second, third and fourth control registers. A second 32 bit stream of data is received by the first, second, third and fourth data registers. The second 32 bit stream of data is transmitted from the fourth data register to the IMB slave CPU. An SL1 signal wire connects the IMB slave CPU to the first control register. An SL2 signal wire connects the IMB slave CPU to the first data register. A first clock signal wire interconnects the first, second, third and fourth control registers to the IMB slave CPU. An enable signal wire interconnects the first, second, third and fourth control registers to the IMB slave CPU. A second clock signal wire connects the first, second, third and fourth data registers to the IMB slave CPU. A DQA feedback wire connects the fourth data register to the IMB slave CPU.

In one example, each control register includes at least one input/output pin and each data register includes at least one input/output pin. At least three wires interconnect each paired control register and data register. Each control register transmits a 3 bit command signal to each data register located adjacent thereto. The at least two registers and the first three bit data connector comprise a 13 bit bus. The 13 bit bus includes an eight bit bi-directional data register and five most significant output bits of an adjacent control register. The first three bit data connector issues a command to the adjacent control register. At least one ACM connector is connected to each pair of control registers and data registers. The bus includes four ACM connectors. The bus further comprising a HUS and a MUC. Each IMB includes at least four MUCs.

Accordingly in another aspect, there is provided a modular apparatus for controlling multiple electronic hardware devices, the apparatus comprising:
a) at least one intelligent master base for use with an electrical circuit;
b) a first communications control bus, as described above, located in the intelligent master base; and
c) at least one adaptable cube module connected to the intelligent master base, the communications control bus being adapted to allow the number of adaptable cube modules to be increased in multiples of four.

In one example, an intelligent slave base is connected to the intelligent master base. A second communications control bus is located in the intelligent slave base. The intelligent master base and the adaptable cube module are sized and shaped for location in an electrical box. A smart plate is connected to the adaptable cube module. A smart plate is connected to the intelligent slave base. A smart plate is connected to the intelligent master base. A slim slave base module is connected to the intelligent master base. A slim slave base module is connected to the intelligent slave base.

In one example, the intelligent master base comprises:
a) an IMB master CPU;
b) an IMB slave CPU electrically connected to the IMB master CPU via an I$^2$C standard;
c) at least two adaptable cube module connectors for receiving the adaptable cube modules;

d) a first HUS bus interconnecting the at least two adaptable cube module connectors to the IMB slave CPU;
e) a circuit for remotely controlling the multiple electronic hardware devices, the circuit being connected to the IMB slave CPU; and
f) a power supply for powering the circuit, the IMB master CPU, and the IMB slave CPU, the power supply being connected to an electrical wiring network.

The IMB slave CPU is a PIC micro-controller or DSC/DSP processors. Each adaptable cube module connector is at least a 28 pin header. The intelligent master base further includes an RF transceiver chip having a mesh topology stack, the stack communicating information in the format of the SPTN communications protocol.

In another example, the intelligent slave base further comprises:
a) an ISB master CPU;
b) at least two adaptable cube module connectors for receiving the adaptable cube modules;
c) a second communications control bus, as described above, located in the intelligent slave base; and
d) a second HUS bus interconnecting the at least two adaptable cube module connectors to the ISB master CPU; and
e) a power supply for powering the ISB master CPU, the power supply being connected to the IMB.

In another example, each adaptable cube module comprises:
a) an adaptable cube module connector for receiving the intelligent master base;
b) a conductive circuit having an eight bit bus portion, and first and second routes;
c) an 8 bit bus control buffer connected to the second route; and
d) a plurality of resistors connected to the first route, the resistors defining an address of the adaptable cube module, the conductive circuit communicating data from the intelligent master base to the resistors.

The adaptable cube module connector includes a plurality of connections for use with HUS services. The conductive circuit further comprises a buffer latch control connected to an output of a control register. The apparatus further comprises a smart plate cover interface. The smart plate cover interface and the adaptable cube module may be one-piece. The resistors are parallel pull up or pull down resistors. The intelligent slave base and the intelligent master base are connected by a base-expansion connector. The base expansion connector comprises an I$^2$C standard. The smart plate includes a smoke detector, at least one infra red proximity detector, at least one motion detector, at least one GFI (Ground fault interruption), at least one Arc detection, or at least one lighting dimmer circuit. The intelligent master base and the adaptable cube module are located in an 1104, 4×4 or 4/11/16, 6×6, 8×8, 10×10, 12×12, 16×16 or 24×24 electrical box. The slim slave base module comprises a PC board for communicating conductive traces between base expansion connectors, the board having located therein a plurality of holes through which power conductors pass independent of the conductive traces. Alternatively, the slim slave base module comprises a PC board for communicating conductive traces between base expansion connectors, the board having a plurality of housing terminal screws for connecting to the electrical wiring system.

According to another aspect, there is provided an intelligent master base comprising:
a) an IMB master CPU;
b) an IMB slave CPU electrically connected to the IMB master CPU via an I$^2$C standard;
c) four adaptable cube module connectors for receiving respectively four adaptable cube modules;
d) a HUS bus interconnecting the adaptable cube module connectors to the IMB slave CPU;
e) a circuit for remotely the controlling the multiple electronic hardware devices, the circuit being connected to the IMB slave CPU; and
f) a power supply for powering the circuit, the IMB master CPU, and the IMB slave CPU, the power supply being connected to an electrical wiring network.

In one example, the IMB slave CPU is a PIC micro-controller or DSC/DSP processors.

Each adaptable cube module connector is at least a 28 pin header. The intelligent master base further includes an RF transceiver chip having a mesh topology stack, the stack communicating information in the format of the SPTN communications protocol.

According to yet another aspect, there is provided an intelligent slave base comprising:
a) an ISB master CPU;
b) four cube module connectors for receiving respectively four adaptable cube modules;
c) a communications control bus, as described above, located in the intelligent slave base; and
d) a HUS bus interconnecting the adaptable cube module connectors to the ISB master CPU; and
d) a power supply for powering the ISB master CPU, the power supply being connectable to an intelligent master base.

According to still another aspect, there is provided an adaptable cube module comprising:
a) an adaptable cube module connector for receiving an intelligent master base;
b) a conductive circuit having an eight bit bus portion, and first and second routes;
c) an 8 bit bus control buffer connected to the second route; and
d) a plurality of resistors connected to the first route, the resistors defining an address of the adaptable cube module, the conductive circuit communicating data from the intelligent master base to the resistors.

In one example, the adaptable cube module connector includes a plurality of connections for use with HUS services. The conductive circuit further comprises a buffer latch control connected to an output of a control register. The resistors are parallel pull up or pull down resistors.

According to another aspect, there is provided a slim slave base module comprising: a PC board for communicating conductive traces between base expansion connectors, the board having located therein a plurality of holes through which power conductors pass independent of the conductive traces.

According to an alternative aspect, there is provided a slim slave base module comprising a PC board for communicating conductive traces between base expansion connectors, the board having a plurality of housing terminal screws for connecting to the electrical wiring system.

In one example of the above, the smart plate includes features selected from the group consisting of: a graphical color touch screen, a battery charger, proximity sensors, a long range motion sensor, a thermostat a lux meter (TAOS technology, a smoke detector, doorbell buzzer system, video camera images, a humidistat an intercom system an intrusion system, a camera, programmable control function blocks, a permanent or/and detachable nightlight, virtual switches/ dimmers, telephone and smart tagging systems, displays readings associated to the establishments hot water tank(s) which determine the amount of hot water available per tank.

In yet another example of the above, the electrical box includes any a combination of one or more hardware devices selected from the group consisting of: IMB, ISB, MUCX's, RF communications in the IMB, lighting dimmer circuits, connectivity for a graphical color touch screen, a long range motion detector, thermostat, a lux meter (TAOS technology), smoke detector, doorbell buzzer button, humidistat, intercom, camera, battery charger, GFI (Ground fault interruption), arc detector, single or duplex receptacles, motion sensor, single/double pole button switches, AC/DC discrete low/high voltage input, AC/DC discrete low/high voltage output, DC analog voltage/current output, DC analog voltage/current input, $CO_2$ sensor, RS232 RF links, DAC, ADC, on/off photocell, RS232, RF-RS-232, RS-422, RS-485, RF-RS-422, RF-RS-485, pulse width modulator output, buzzer, night light, power bar with electrical cord, witch/dimmer buttons and battery charger.

Typically, the intelligent master base is cuboid, the intelligent slave base is cuboid., and the adaptable cube module is cuboid.

According to yet another aspect, there is provided a one-piece apparatus for controlling multiple electronic hardware devices, the apparatus comprising:
 a) an adaptable cube module connectable to an intelligent master base; and
 b) a smart plate cover interface connected to the adaptable cube module.

In one example, the smart plate includes features selected from the group consisting of: a graphical color touch screen, a battery charger, proximity sensors, a long range motion sensor, a thermostat a lux meter (TAOS technology, a smoke detector, doorbell buzzer system, video camera images, a humidistat an intercom system an intrusion system, a camera, programmable control function blocks, a permanent or/and detachable nightlight, virtual switches/dimmers, telephone and smart tagging systems, displays readings associated to the establishment's hot water tank(s) which determine the amount of hot water available per tank.

According to another aspect, there is provided a circuit for remotely controlling multiple hardware devices, the circuit comprising a communications control bus, as described above.

According to yet another aspect, there is provided a method of remotely controlling multiple devices using a communications control bus, the method comprising:
 a) electrically interconnecting a first control register, a first data register, and an IMB slave CPU; and
 b) transmitting a three bit data disable signal from the first control register to the first data register.

In one example, the method further comprising:
 a) receiving a first at least 8 bit data signal at the first control register; and
 b) transmitting a first 3 bit disable signal from the first control register to the first data register.

In another example, the method further comprising:
 a) receiving second, third, and fourth at least 8 bit data signals at respective second, third and fourth control registers; and
 b) transmitting a second, third and fourth 3 bit disable command signal to the respective second, third and fourth data registers.

In yet another example, the method further comprising:
 a) receiving fifth, sixth, seventh and eighth at least 8 bit data signals respectively at the first, second, third and fourth control registers allowing its previous first, second, third and fourth data bytes to be transferred to the fifth, sixth, seventh and eighth control registers; and
 b) transmitting a fifth, sixth, seventh, eighth, ninth, tenth, eleventh and twelfth 3 bit load command signal to the respective first, second, third, fourth, fifth, sixth, seventh and eighth data registers so that each data register is permitted to receive at least 8 bits of data.

In still another example, the method further comprising:
 a) receiving ninth, tenth, eleventh and twelfth at least 8 bit data signals respectively at the first, second, third and fourth control registers allowing its previous fifth, sixth, seventh and eighth data bytes to be transferred to the fifth, sixth, seventh and eighth control registers; and
 b) transmitting a thirteenth, fourteenth, fifteenth sixteenth, seventeenth, eighteenth, nineteenth and twentieth, 3 bit disable command signal to the respective first, second, third fourth, fifth, sixth, seventh and eighth data registers.

In another example, the method further comprising:
 a) transmitting a 3 bit unload command signal to the respective first, second, third, fourth, fifth, sixth, seventh and eighth data registers from the respective first, second, third, fourth, fifth, sixth, seventh and eighth control registers; and
 b) transmitting the at least 8 bits of data stored in the data registers to the IMB slave CPU.

According to yet another aspect, there is provided a method of controlling multiple electronic hardware devices using a touchless smart plate interface having a proximity detector, the smart plate interface being connected to a modular apparatus, as described above, the method comprising: waving a hand at least once near the proximity detector to control operation of a first electronic hardware device.

In one example, the method further comprising, after waving the hand at least once, pausing the hand near the proximity detector so as to further control operation of the first electronic hardware device. Two consecutive hand wavings near the proximity detector operates a second electronic hardware device. Two consecutive having wavings followed by a pause near the proximity detector further controls operation of the second hardware device. In another example, three consecutive hand wavings near the proximity detector operates a third electronic hardware device. Three consecutive hand wavings followed by a pause near the proximity detector further controls the third electronic hardware device.

In another example, the hand is moved orthogonal to the proximity detector so as to further control the electronic device. The hand is moved orthogonal to the proximity detector so as to dim lights.

BRIEF DESCRIPTION OF THE FIGURES

Further aspects and advantages of the present invention will become better understood with reference to the description in association with the following Figures, wherein:

FIG. 1A is an exploded view of an adaptable cube module (ACM) and a smart plate cover showing connectivity to an intelligent master base (IMB);

FIG. 2A is a perspective view of a one-piece apparatus showing an ACM and a smart plate cover with connection to an intelligent master base;

FIG. 4 is a side view of the apparatus of FIG. 2 located in a domestic 1104 electrical box;

DETAILED DESCRIPTION OF THE INVENTION

My discovery concerns a novel 13-bit bus, which communicates between an intelligent master base (IMB) and a number of adaptable cube modules (ACM). Each IMB includes four 13 bit ports, which can significantly expand the number of devices and systems that can be connected to the IMB and controlled via an interface. A user can easily control multiple household systems from a single location using buttons or a touch screen interface. To achieve this without using my 13 bit bus, fifty two discrete I/Os would be required eliminating the opportunity of simultaneously using any other on board MUC peripherals.

Modular Apparatus

Figure 1:
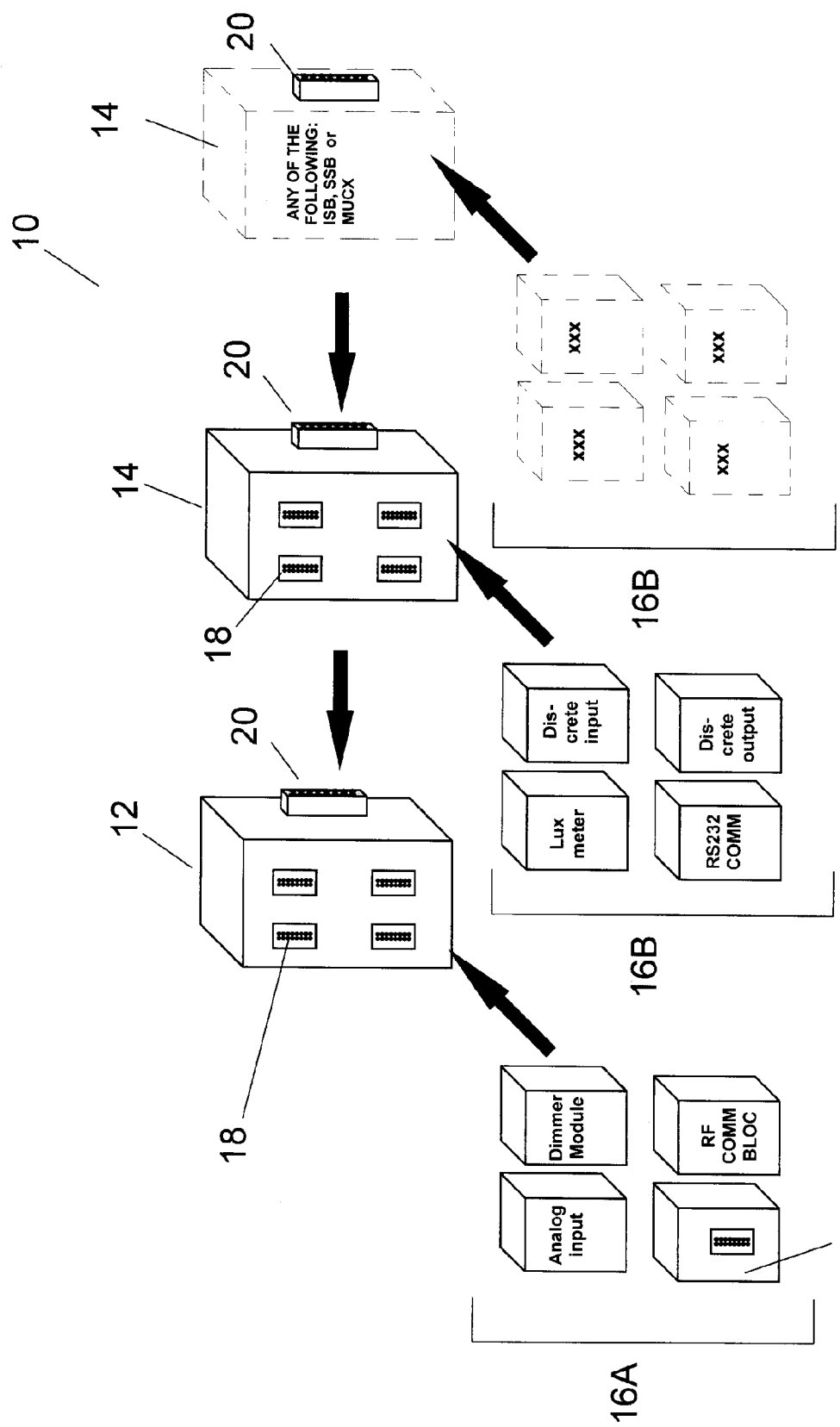
FIG. 1 is an exploded view of an embodiment of a modular apparatus.

Referring now to FIG. 1 a modular apparatus is shown generally at 10. Broadly speaking, the apparatus 10 comprises at least one IMB 12, and at least one ACM 16A, which are connectable to the IMB 12. The apparatus 10 optionally comprises an intelligent slave base (ISB) 14 and at least one ACM 16B connectable thereto. In the example shown, four ACMs 16A are connected to the IMB 12, and four ACMs 16B are connected to the ISB 14. As will become apparent upon further reading of this description, the number of ACMs 16A or 16B can be expanded in multiples of four (as shown by the phantom lines in FIG. 1). Examples of ACM types 16A or 16B include, but are not limited to: single/double pole button switches; light dimming switches; single or duplex domestic 120 VAC/15 A receptacles; single or duplex domestic 120 VAC/15 A receptacles with GFI/ACR detection capabilities; motion sensors; AC/DC discrete low/high voltage input; AC/DC discrete low/high voltage output; DC analog voltage/current output; DC analog voltage/current input; proximity sensor; RF link; DAC; ADC; opto module measuring visible light; on/off photo cell; camera; general communication blocks such as (RS232; RF-RS-232; RS-422; RS-485;RF-RS-422; RF-RS-485); temperature sensor; pulse width modulator such as for modulated output based on thermostat temperature readings, PID control loops devices; buzzer; humidistat; and the like. Up to two hundred and fifty six or more types of ACMs are contemplated. Any four of the aforesaid ACM types allow a unique combination of I/Os (or circuitries) per IMB. If an additional four ACMs are required, then the ISB 14 can be connected to the IMB 12 and another four ACMs 16B are added so as to increase the total number of ACMs to eight. Further repeating this, additional ISBs 14 can be added thus allowing the possible number of ACMs can be increased in multiples of four, thus twelve, sixteen and so on.

Each IMB 12 and ISB 14 includes four ACM connectors 18, although it is possible that two ACM connectors can be used, each of which is typically a 28 pin header. Other future connectors which can also be used include 32 and 34 pin headers or more. The ACMs 16A/B are connectable to their respective IMB 12 or ISB 14 by a simple "plug-in" operation. The ISB 14 is connectable to the IMB 12 using an $I^2C$ communications standard (not shown) via a base expansion connector 20, with the four ACMs 16B being connectable to the ISB 14.

As illustrated in FIG. 1A, the apparatus 10 can optionally be used with a smart plate cover 22 that can be temporarily plugged into the IMB 12. A smart plate cover interface 24 having a connector 19 for receiving the plate cover 22 allows the user to employ a user friendly programming interpreter interface residing in the smart plate cover 22 to program the apparatus 10. This allows for easy setup configurations to be carried out by the user via embedded generic functions enabling control to the underlying ACMs 16A. Once the logic is created, the smart plate cover 22 may be removed and stored until future programs are required while leaving the smart plate cover interface module 24 connected to its IMB 12. The smart plate cover interface module 24 in essence is a module that extends the ACM connecter 18 and allows the connectivity of the smart plate cover 22 via the connector 19.

Figure 2:
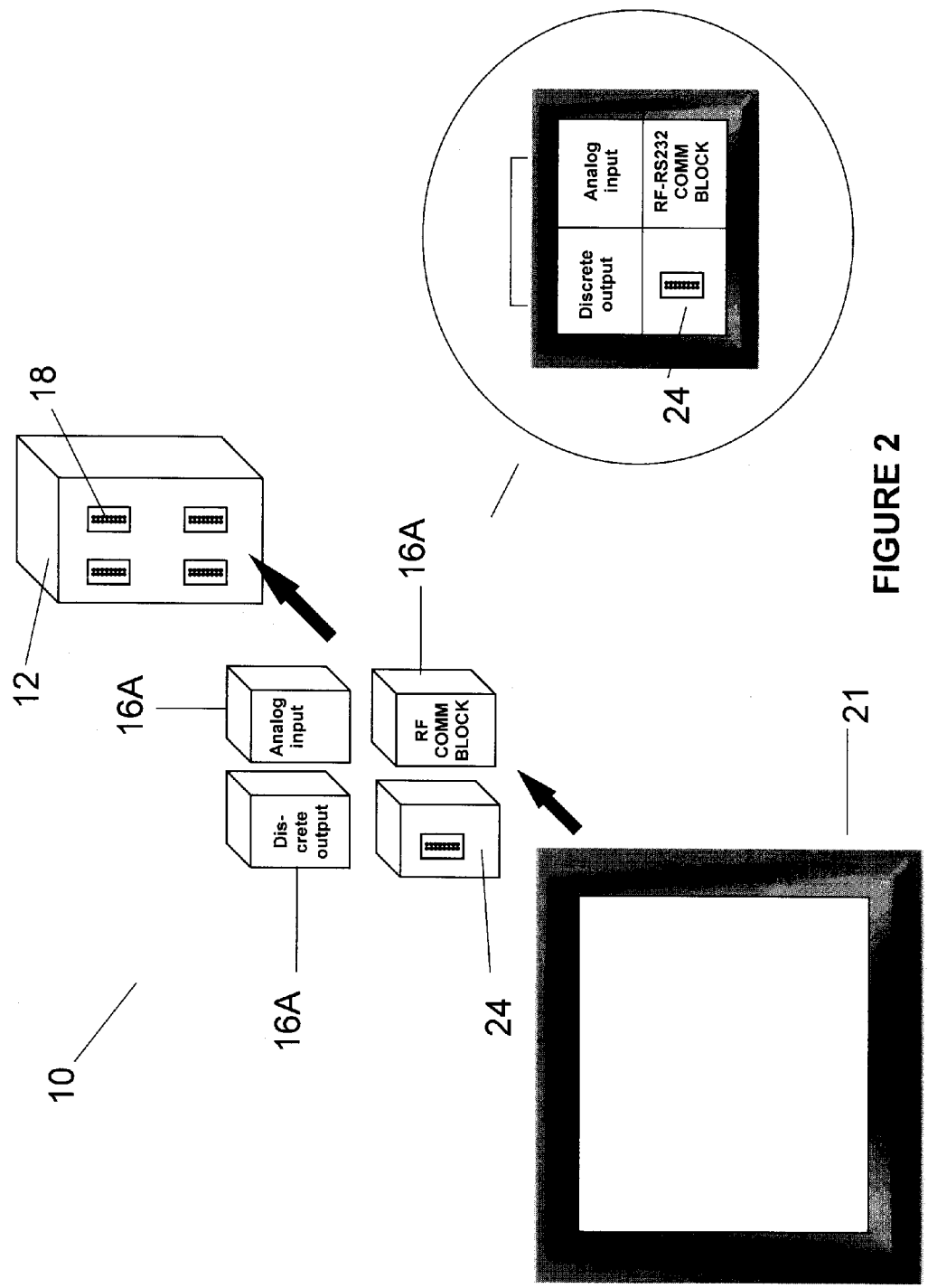
FIG. 2 is an exploded view of a modular apparatus showing location of a plate cover with an aperture.

FIG. 2 illustrates the apparatus 10 comprising the IMB 12 and four ACMs 16A being used in a residential environment such as, for example, in a residential single gang electrical box, where once the apparatus 10 is configured, the user can optionally remove the smart plate cover 22 and replace it with a simple plate cover 21 designed as an open frame surrounding the ACMs 16A. The open frame allows the ACMs 16A to be viewed while leaving the smart plate cover interface module 24 exposed. This set up is advantageous when a user requires basic functionality while retaining the ability for the ACMs to be interactive with the user such as, for example, an RS-232 port ACM or a button and status LEDs ACMs and the like.

Now referring to FIG. 2A, an alternative apparatus design which may be useful in homes includes an ACM 16A which is fabricated as a one-piece apparatus in which the smart plate 22 is integral with the ACM. This allows the user to purchase a single ACM with a smart plate cover as a single one-piece component 23 which can then be plugged into the IMB 12 via the ACM connector 18 thereby hiding the underlying modules. This alternative apparatus 10 is permanently used with the smart plate cover 22 allowing the user to conveniently use the interface to control the underlying ACMs.

It is to be understood that any smart plate cover 22 can be plugged into the smart plate cover interface module 24. Referring now to FIGS. 3, 3B, 3C, 3D and 3E any smart plate cover 22 can be plugged into the smart plate cover interface module 24 so as to hide the underlying ACMs. The smart plate 22 may be a basic model 26, which includes, for example, a basic color LCD touch screen indicator 27 and a plurality of dimmer switches 29 for dimming lights in a room or other hardware devices. Moreover, when two IMBs 12 are required instead of one, a wider smart plate cover 22 would be used to hide the eight underlying ACMs. The shape of the switches 29 or the sizes of the color TFT LCD screens may change according to the aesthetic tastes of the user. A more sophisticated model 28 may include, for example, a larger touch screen interface 31 which operates an integrated micro-computer for remotely controlling multiple systems throughout a house, such as for example, temperature control, lighting, door controls and the like. It is contemplated that the apparatus 10, may be controlled via the smart plate 22 which can communicate via a control software operated from computer readable medium. Thus, during typical use, the apparatus 10, when connected to the ACMs 16A/B, can be used for domestic controls as well as controlling commercial/industrial systems such as machinery, heating, lighting and the like, regardless of whether a smart plate cover is installed or not.

The programs, such as software kernels or Source code programs and data, which are within the IMBs and ISBs and the smart plates 22 may be upgraded using a personal computer or via a phone line over the internet.

Figure 3:
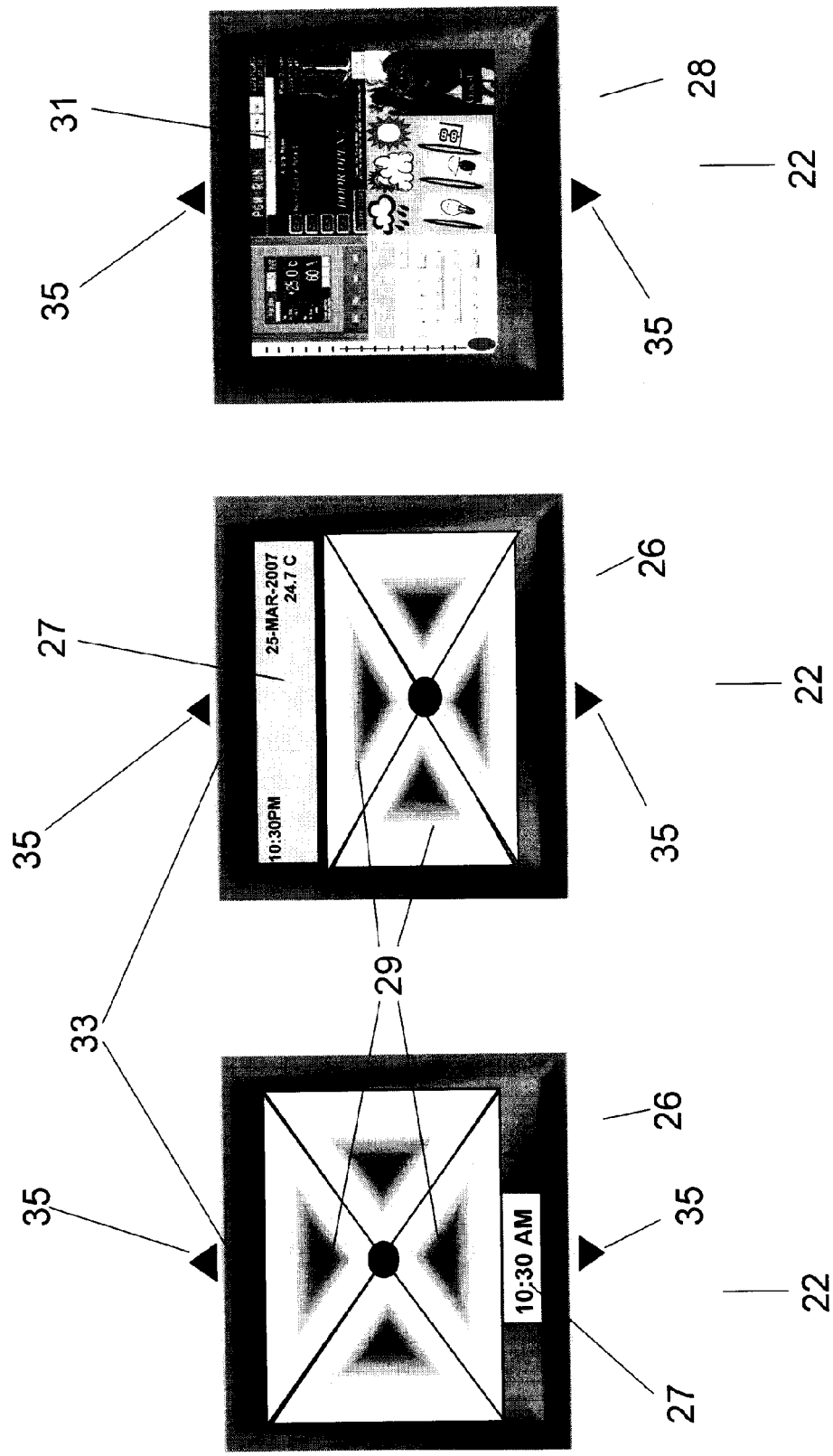
FIG. 3 are photographs illustrating smart plate covers.
Figure 3A:
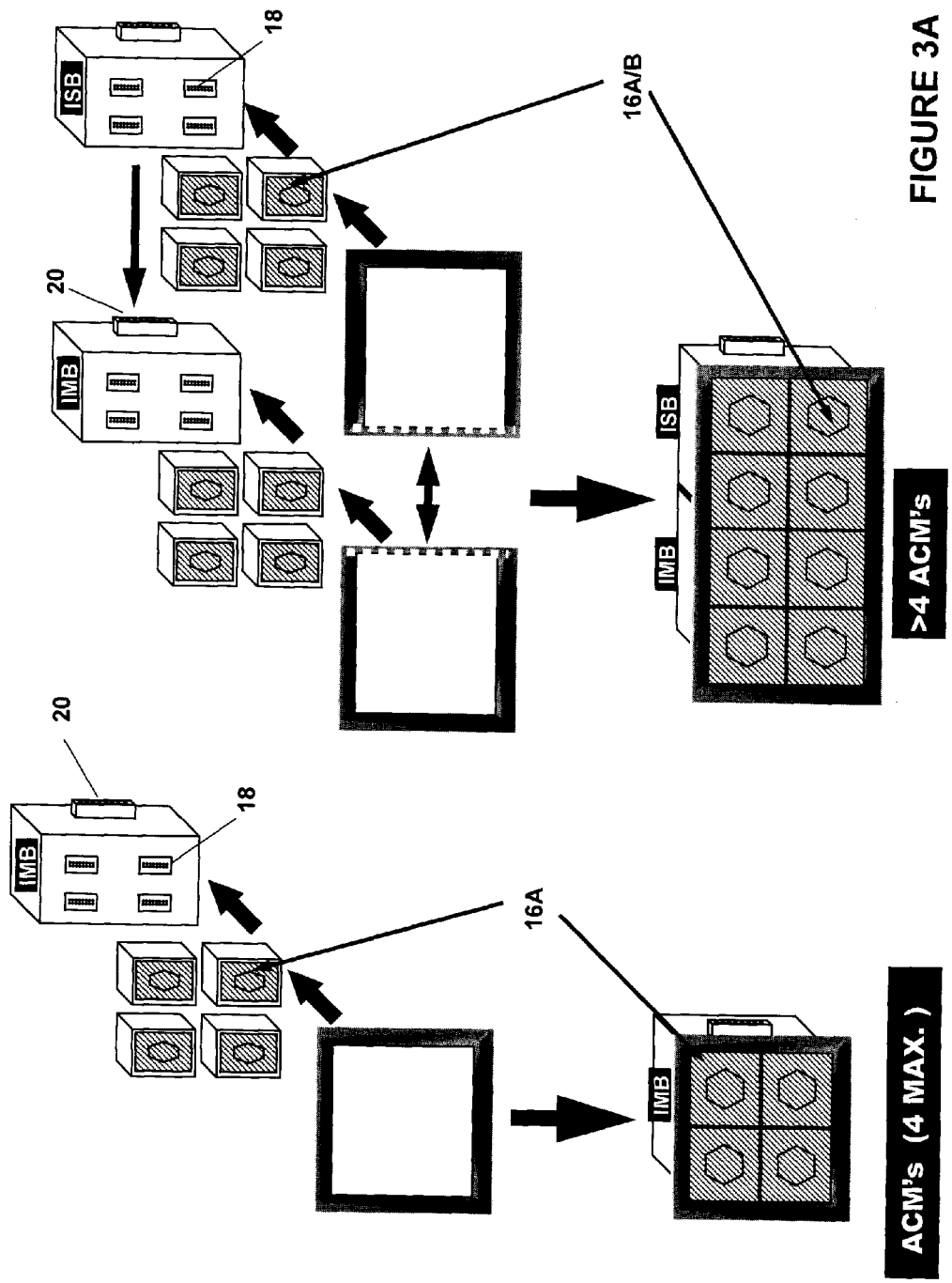
FIG. 3A is a diagram showing a modular IMB/ISB configuration.
Figure 3B:
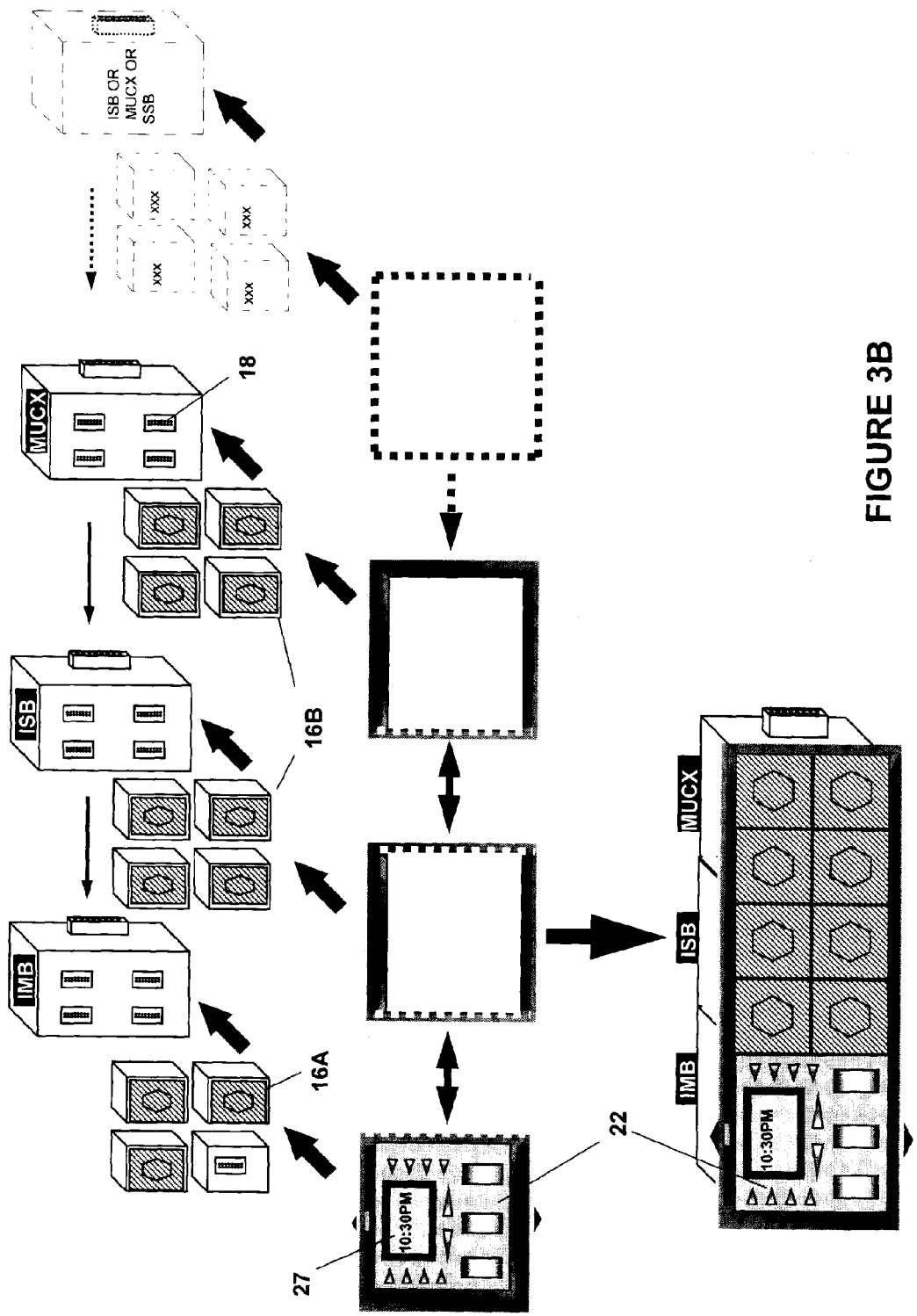
FIG. 3B is a diagram showing a modular IMB/ISB/MUCX configuration and open frame covers in combination with a smart plate cover.
Figure 3C:
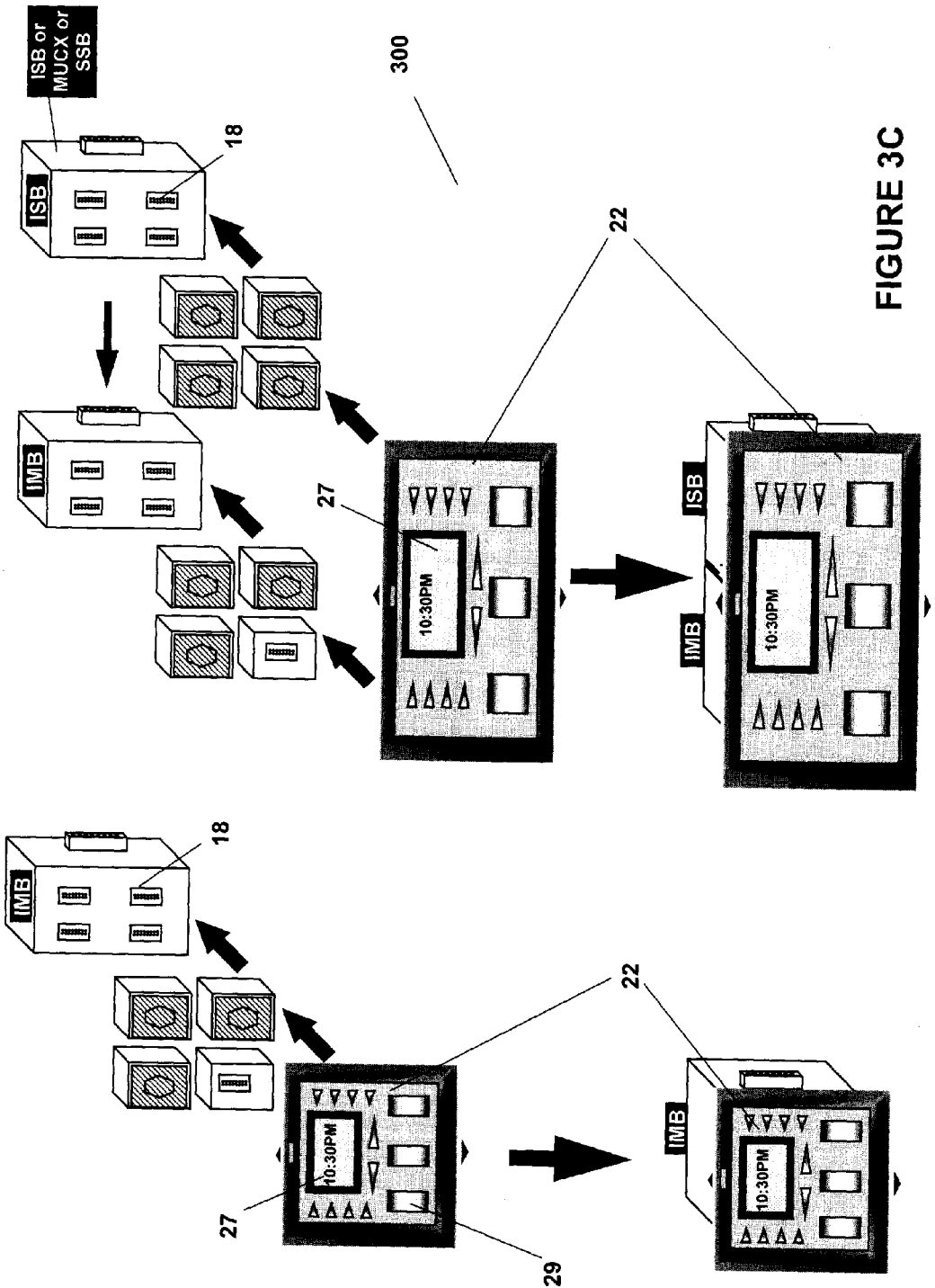
FIG. 3C is a diagram showing a modular single/double gang IMB/ISB configuration with smart plate covers.
Figure 3D:
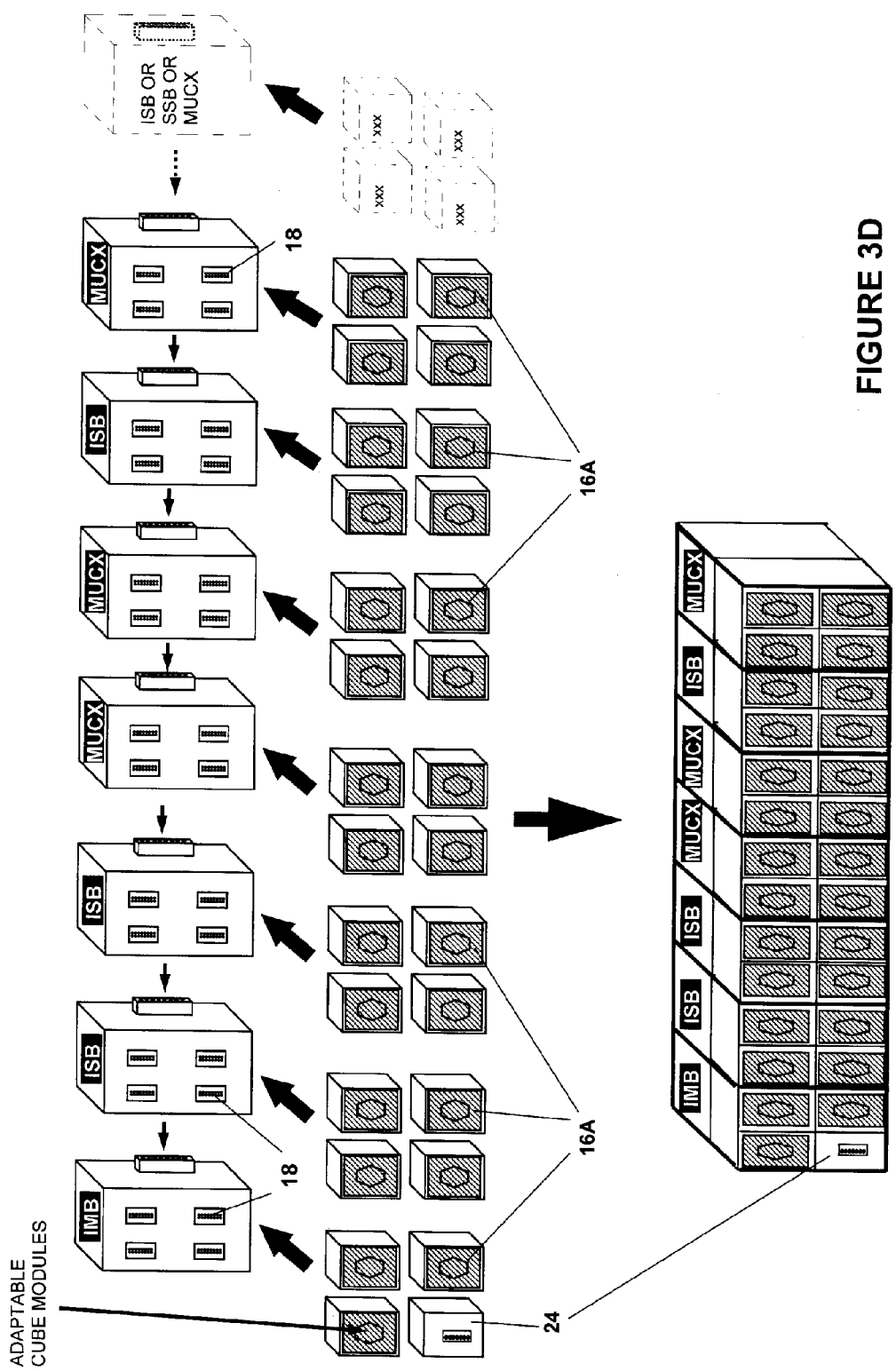
FIG. 3D is a diagram showing an unlimited modular assembly of multiple IMB/ISB/MUCX modules.

Still referring to FIG. 3, the basic model 26 and the sophisticated model 28 may include additional detectors located around the smart plate 22 frame of the models 26, 28 such as, for example, infra-red proximity detectors 33, smoke detectors 35 and motion detectors and the like. The proximity detectors 33 can be used to detect the location and movement of a hand relative to the detector 33. In some instances, movement of the hand within a pre-defined area relative to the detector may be used to activate a specific system, such as lighting, whereas movement of the hand within another pre-defined area relative to the detector may be used to activate other systems or dimming actions.

Additional systems and hardware devices located remotely from the IMB 12, which may be operated using the sophisticated model of smart plate 26 or 28 (or models with color TFT LCD panels), include the following non-limiting examples:

Double pole switches; three way switches; four way switches;
Home utility timers for controlling lighting switches and plugs;
Motion detector (Each apparatus may detect motion and transfer this information to all other apparatuses);
Heating thermostats with programmable set points;
LUX meter used to measure amount of visible light in a room so to control light intensities;
Door buzzer activator (For single family dwelling to multi family dwellings) condominiums and the like;
Photocell, internal/exterior temperature and humidity readings;
A vertical motion detector pointing up (for smoke detection) and a vertical motion detector pointing down to detect foot, knee or hand for controlling electrical loads;
Incorporation of a night light in every apparatus. The night light will be made that the user can detach it and use it as a flash light when power outages occur;
Telephone, Intercom and intrusion systems with camera;
Mirror (Image from integrated camera displayed on color LCD);
Random lighting activation when no-one home;
Smart tagging, smart card systems and car starter;
Advanced security systems such as eye scanning/finger print recognition;
Agenda/time/date/calculator/Long range weather forecast/Internet/E-mail and utility screen savers when unit is in wait mode or not in use;
battery charger;
Real time statistical analysis of main home electrical system such as displaying hydro power consumption in watts, electrical panel status, status of breakers in panel and amperage used per breaker, phase out detection meaning, the system can warn the user if a phase is disconnected, current status of main ground meaning the system can warn the user if there is a faulty service ground, resetting any panel breakers from any apparatus, comparative power consumption reports from one year to another and utility lists;

GPS capabilities; and

A series of programmable control function blocks such as AND gate, OR gate, counters, set/reset variables, lag, mathematical, PID and the like.

Still referring to FIG. 3, the infrared detectors 35 are orientated so that one of the detectors points downwards towards the floor for human hand/knee/foot detections and another pointing upwards towards the ceiling for smoke detections. The detector pointing downwards 35 can distinguish if a hand is present (at a few inches below the smart plate) or if a knee is present (at two feet below the smart plate cover), or if a foot is present (at four feet below the smart plate cover). The smart plate cover 22 can use infra-red detectors 33 to detect a frontal finger tap or hand-wave-to accomplish touch less switch control to control what ever loads are connected in the underlying modules and further control software actions within the IMB master CPU, IMB slave CPU or the ISB master CPU.

The infra red detectors 33 or 35 (so-called proximity or touchless sensors or detectors) are integral with the smart plate covers 22 and can be used to detect distance or the movement of a hand, knee or foot relative to the detector. In some instances, movement of the hand within a pre-defined area relative to the detector may be used to activate a specific system, such as lighting, whereas movement of the hand within another pre-defined area relative to the detector may be used to activate another system or dimming actions. At least two infra red proximity sensors (one facing the floor for foot, hand and/or knee detections and one facing forwards for frontal hand, body or close object detections) are used as touchless sensors to control default software sequences or default hardware actions such as on/off controls when the detection of a hand, knee or foot is waved once. Double or triple or more hand, knee or foot wavings in a short period of time can further result in controlling different software or hardware actions.

The following outlines the logical result of the touchless waving actions:

One wave signals an on/off control of a first electronic hardware device such as default lighting, heating or motor loads connected to the underlying ACMs;

One wave plus a paused detection is a signal to dim or reduce the default lighting, lighting scene, heating or motor load connected to the underlying ACMs;

Two consecutive waves allows the user to control a second electronic hardware device such as a second lighting scene or to control other loads such as heating, motors or other lighting connected to the underlying ACMs of the apparatus 10 and/or heating, motor or lighting loads connected to ACMs in other apparatus 10 installed in remote electrical boxes or installed in remote electrical equipment such as heaters and motor housings;

Two consecutive waves plus a paused detection allows the user to dim the second lighting scene or reduce/increase other loads such as heating, motor speeds or other lighting connected to the underlying ACMs of the current apparatus 10 or/and heating, motor or lighting loads connected to ACMs in other apparatus 10 devices installed in remote electrical boxes or installed in remote electrical equipment such as heaters and motor housings;

Three consecutive waves allows the user to control a third electronic hardware device such as a third lighting scene or control loads such as heating, motors or other lighting connected to the underlying ACMs of the current apparatus 10 or/and heating, motor or lighting loads connected to ACMs in other apparatus 10 devices installed in remote electrical boxes or installed in remote electrical equipment such as heaters and motor housings;

Three consecutive waves plus a paused detection allows the user to dim the third lighting scene or reduce/increase other loads such as heating, motor speeds or lighting connected to the underlying ACMs of the current apparatus 10 or/and heating, motor or lighting loads connected to ACMs in other apparatus 10 devices installed in remote electrical boxes or installed in remote electrical equipment such as heaters and motor housings;

Additional consecutive waves allows the user to control subsequent electronic hardware devices such as subsequent lighting scenes or control subsequent loads such as heating, motors or other lighting connected to the underlying ACMs of the current apparatus 10 or/and heating, motor or lighting loads connected to ACMs in other apparatus 10 devices installed in remote electrical boxes or installed in remote electrical equipment such as heaters and motor housings;

Additional consecutive waves plus a paused detection allows the user to dim subsequent lighting scenes or reduce/increase other loads such as heating, motor speeds or other lighting connected to the underlying ACMs of the current apparatus 10 or/and heating, motor or lighting loads connected to ACMs in other apparatus 10 devices installed in remote electrical boxes or installed in remote electrical equipment such as heaters and motor housings.

Thus it is possible to control multiple electronic hardware devices using the touchless smart plate interface 22 having the proximity detector 33, 35, in which the smart plate interface 22 is connected to the modular apparatus 10 by: waving a hand at least once near the proximity detector to control operation of a first electronic hardware device. Thereafter waving the hand at least once, pausing the hand near the proximity detector further controls operation of the first electronic hardware device. Two consecutive hand wavings near the proximity detector operates a second electronic hardware device and then two consecutive having wavings followed by a pause near the proximity detector further controls operation of the second hardware device. The method may also include three consecutive hand wavings near the proximity detector operates a third electronic hardware device and three consecutive hand wavings followed by a pause near the proximity detector further controls the third electronic hardware device.

One feature of the control method involves pulling the hand orthogonally away from the proximity detector so as to further control the electronic device. This is particularly useful if the user desires to dim the lights in a room or indeed fine tune the function of other electronic devices described herein.

In another instance, the waving actions described above can be used to also control internal logic sequences for specific tasks. Instead of using the pause to dim or reduce/increase loads as described above, another option is by varying the distance of a hand, knee or foot from the detectors located in smart plates 22. Furthermore, consecutive waves combined with distance variations from the touchless detector will further control other hardware or software actions.

A long-range motion sensor for sensing movement and displaying a movement alarm on the screen, may further transmit these readings to the underlying IMB/ISB/MUCX bases for further broadcasting this information via radiofrequency (RF) to other apparatus 10 devices installed in remote electrical boxes or installed in remote electrical equipment such as heaters and motor housings. Included within the smart plate 22 are the following:

- thermostat for sensing heat and displaying the heat measurements on the screen and may further transmit these readings to the underlying IMB/ISB/MUCX bases for further broadcasting this information via RF to other apparatus 10 devices installed in remote electrical boxes or installed in remote electrical equipment such as heaters and motor housings;
- a lux meter (TAOS technology) for:
  - i) measuring visible light;
  - ii) measuring infrared light; or
  - iii) measuring visible or infrared light measurements on the screen and may further transmit these readings to the underlying IMB/ISB/MUCX bases for further broadcasting this information via RF to other apparatus 10 devices installed in remote electrical boxes or installed in remote electrical equipment such as heaters and motor housings so to control their operation based on the amount of visible light being detected;
- smoke detector (using infra red and/or photo electric and/or ionization technologies) with on board alarm and displaying the alarm(s) on the screen and may further transmit the alarm(s) to the underlying IMB/ISB/MUCX bases for further broadcasting this information via RF to other apparatus 10 devices installed in remote electrical boxes or installed in remote electrical equipment such as heaters and motor housings;
- Doorbell buzzer system;
- Video camera images of front door or any other rooms of a dwelling or building may be broadcasted via rf to other apparatus 10 devices installed in remote electrical boxes or installed in remote electrical equipment housings;
- humidistat for sensing humidity and displaying the humidity readings on the screen and may further transmit these readings to the underlying IMB/ISB/MUCX bases for further broadcasting this information via rf to other apparatus 10 devices installed in remote electrical boxes or installed in remote electrical equipment such as heaters and motor housings;
- camera so the apparatus can take pictures and store them in memory or display them and may further be transmitted to the underlying IMB/ISB/MUCX bases for further broadcasting this information via RF to other apparatus 10 devices installed in remote electrical boxes or installed in remote electrical equipment such as heaters and motor housings;
- intercom system used to record voice and may further transmit the vocal sound message to the underlying IMB/ISB/MUCX bases for further broadcasting this information via to other apparatus 10 devices installed in remote electrical boxes or installed in remote electrical equipment such as heaters and motor housings;
- intrusion system used to detect intruders by displaying intruder alarms on the screen and may further transmit these alarms to the underlying IMB/ISB/MUCX bases for further broadcasting this information via RF to other apparatus 10 devices installed in remote electrical boxes or installed in remote electrical equipment such as heaters and motor housings;
- camera allowing the user to take pictures and to display these pictures on the screen and may further transmit the picture images to the underlying IMB/ISB/MUCX bases for further broadcasting this information via rf to other apparatus 10 devices installed in remote electrical boxes or installed in remote electrical equipment such as heaters and motor housings;
- A series of programmable control function blocks such as timer, set, reset, lag, mathematical, PID and the like used for custom programs via an on board TFT color screen's graphical user interface programming language;
- Permanent or/and detachable Nightlight;
- Virtual switch creation can be accomplished by a predefined graphical user friendly interface screen which can allow the user to easily select any remote apparatuses 10 of his choice to receive or transmit switching or dimming control via RF. For example, a virtual switching and dimming control is a logic sequence in the apparatus 10 that carries out the actions of a single pole, double pole, three way, four way or five way (or more way) switch or dimmer which can be used to control loads such as heating, motors or lighting connected to the underlying ACMs of the current apparatus 10 to any heating, motor or lighting connected to remote ACMs of other apparatus 10 devices installed in remote electrical boxes or installed in remote electrical equipment such as heaters and motor housings;
- Telephone and smart tagging systems; and
- Displays readings associated to hot water tank(s) which determine the amount of hot water available per tank.

All of the transmissions described above use a communications control bus from the smart plates to the IMB/ISB/MUCX. The communications control bus, as will be described below, is used when bidirectional transmissions of 8 bit bus data are required, whereas a HUS is used for any analog or special signals.

Additionally, the apparatus 10 can incorporate emergency lighting for use during hydro power outages. Also a detachable utility flash light may be associated with the smart plate cover 22. Also contemplated is the use of a touch-button which can transform a portion of the smart plate cover 22 into a mirror using a miniature camera disposed in the smart plate cover 22.

Figure 3E:
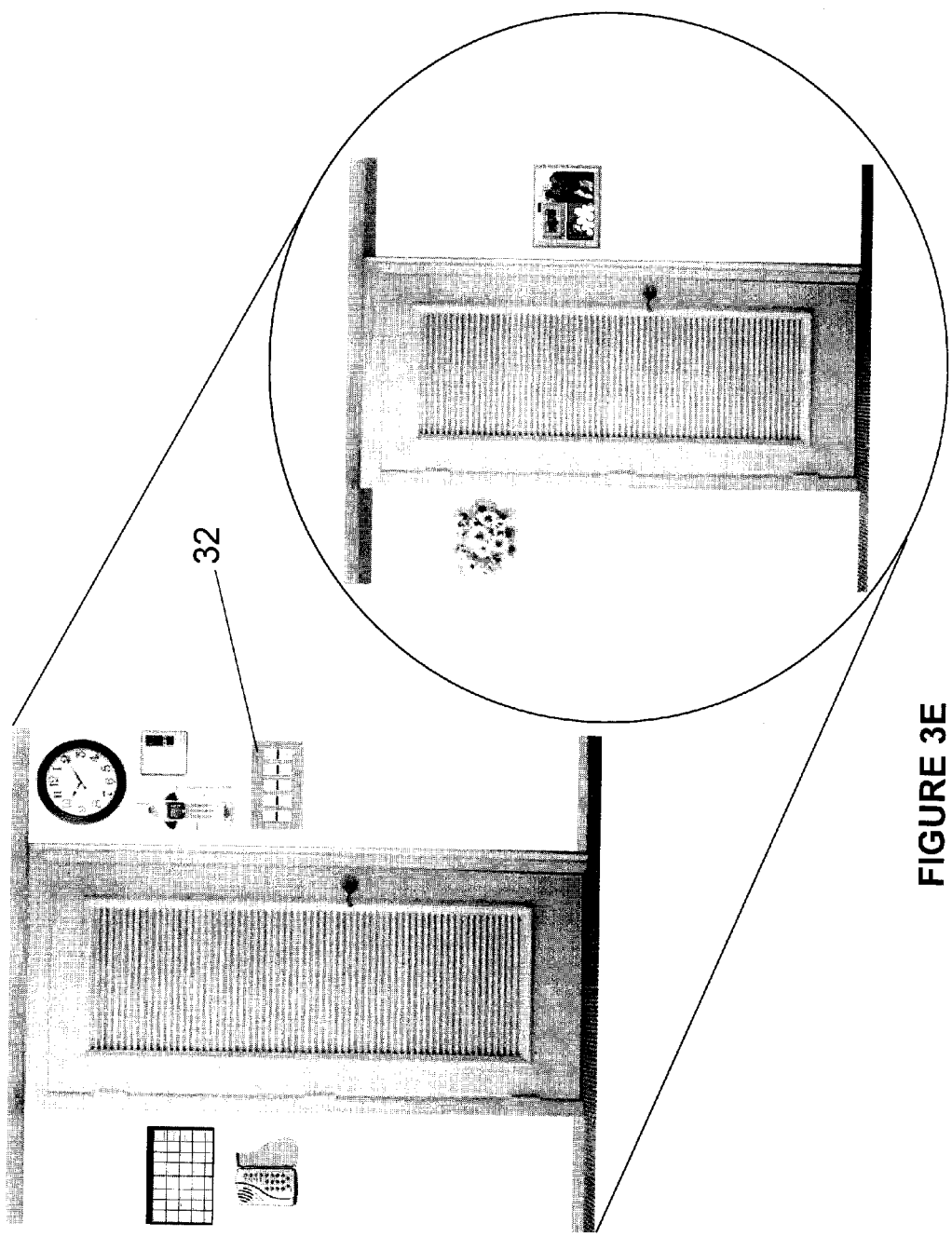
FIG. 3E is a comparative illustration showing the use of a smart plate cover to control multiple devices from a single location.

Additionally, the smart plate cover 22 may also include any combination of the following features:

- a graphical color touch screen (16/18/20/24 pixel color depth) as shown in the smart plates 22. in which the graphical color touch screen is used to display and operate the following features:
  - display images which can be loaded from a desktop, laptop, handheld computer or a USB memory drive to the IMB using an RF link or a USB smart drive connection and thereby allowing to further transfer data or images from the IMB to the smart plate 22 via the MUC standard;
  - display dates, time, internal room and external temperatures, long range forecasts, humidity levels;
  - display real time statistical analysis of the home electrical system such as displaying hydro power consumption in watts and electrical panel status. This information is obtained by reading current and voltages from the home electrical circuits connected within the electrical panel. The current and voltage readings will be measured by a remote apparatus 10 by the means of transducers connected from the electrical circuits (using a current transformer and electrical tappings) to the remote apparatus 10 and all of which is installed within or close to an electrical panel. This information may then be broadcast via RF to other apparatuses 10 which will display the following information:

status of breakers in panel and amperage used per breaker;

phase out detection meaning, the system can warn the user if a phase is disconnected;

current status of main ground meaning the system can warn the user if there is a situation of faulty service ground;

comparative power consumption reports from one year to another and consumption utility lists which can compare the power used for every apparatus 10;

to control all underlying ACMs;

an alarm clock or utility timer settings;

battery charger as an integral part of a smart plate;

Referring now to FIGS. 3E and 4, generally speaking, each room in a house has at least one domestic electrical box 32 located in a wall, typically near a doorway, which allow easy access and operation upon entry into the room. The box 32 is typically a single or multi ganged 1104 electrical box which support plugs and switches for operating lights, fans and the like. Other domestic boxes which can accommodate the apparatus 10, include, but are not limited to, boxes such as a 4×4 or a 4/11/16. The box 32 can house the apparatus 10 so that it is connected via existing wires 34 to the electrical wiring network of the house (not shown). Advantageously, as best illustrated in FIG. 3E, the apparatus 10 located in the box 32 allows all of the electrical devices such as a clock, thermostat, intercom and the like to be moved into a single location thereby allowing the user to control them from a single location.

All IMBs can be hardwired to the electrical wiring network of the house only once by an electrician. Thereafter the choice of the underlying modules (ACMs) can be conveniently selected and plugged in by the user without electrical hazards or damage to the electrical system. Furthermore, the ACMs 16A/B can be replaced with different modules to satisfy the user's specific needs. The IMB 12, the ISB 14 and the ACMs 16A are sized and shaped to be located into the domestic electrical box 32 (which can be single gang or multi gang configurations). Although the IMB 12, the ISB 14 and the ACMs 16A and 16B are generally illustrated as cuboid, it is to be understood that they may also be designed and manufactured in other shapes and sizes as well, such as for example, slim cuboids so as to be located in space limited areas. For example, an ACM 16A can be in the shape of a receptacle or a fixed decorative place mat or coaster because its underlying IMB/ISB bases are discretely accommodated. An ACM 16A may even extend itself taking the form of an extension cord. Thus, each electrical box 32 can accommodate an IMB 12 with four ACMs 16A and one of the smart plates 26 or 28 can be plugged into one of the ACMs 16A so as to cover the electrical box 32. This provides an aesthetically pleasing single control point from which multiple household devices can be remotely controlled, as best illustrated in FIG. 3E.

Figure 5:
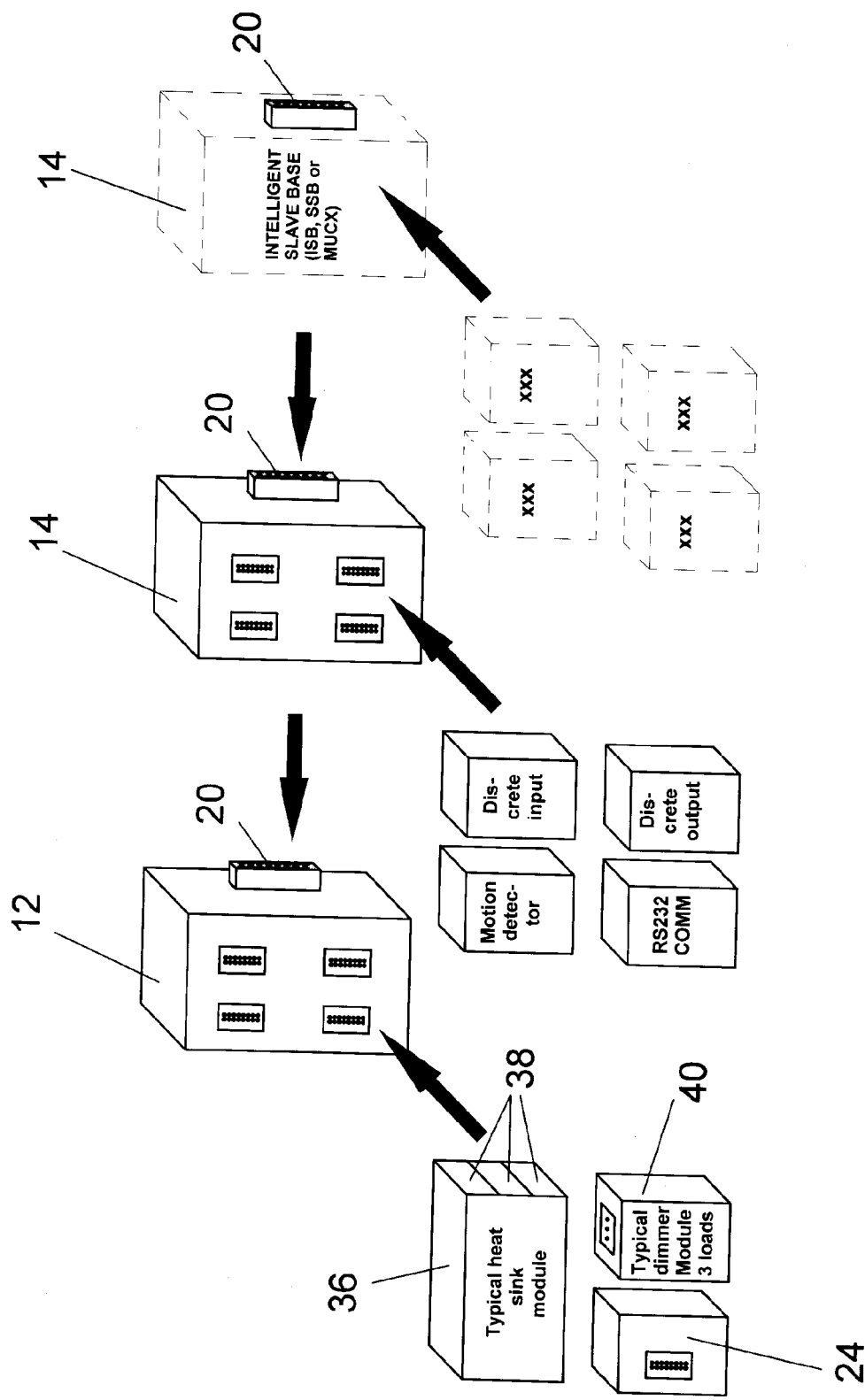
FIG. 5 is an exploded view of a modular apparatus of FIG. 1 with a heat sink module and a plurality of other ACMs connected to an IMB and an intelligent slave base (ISB)
Figure 6:
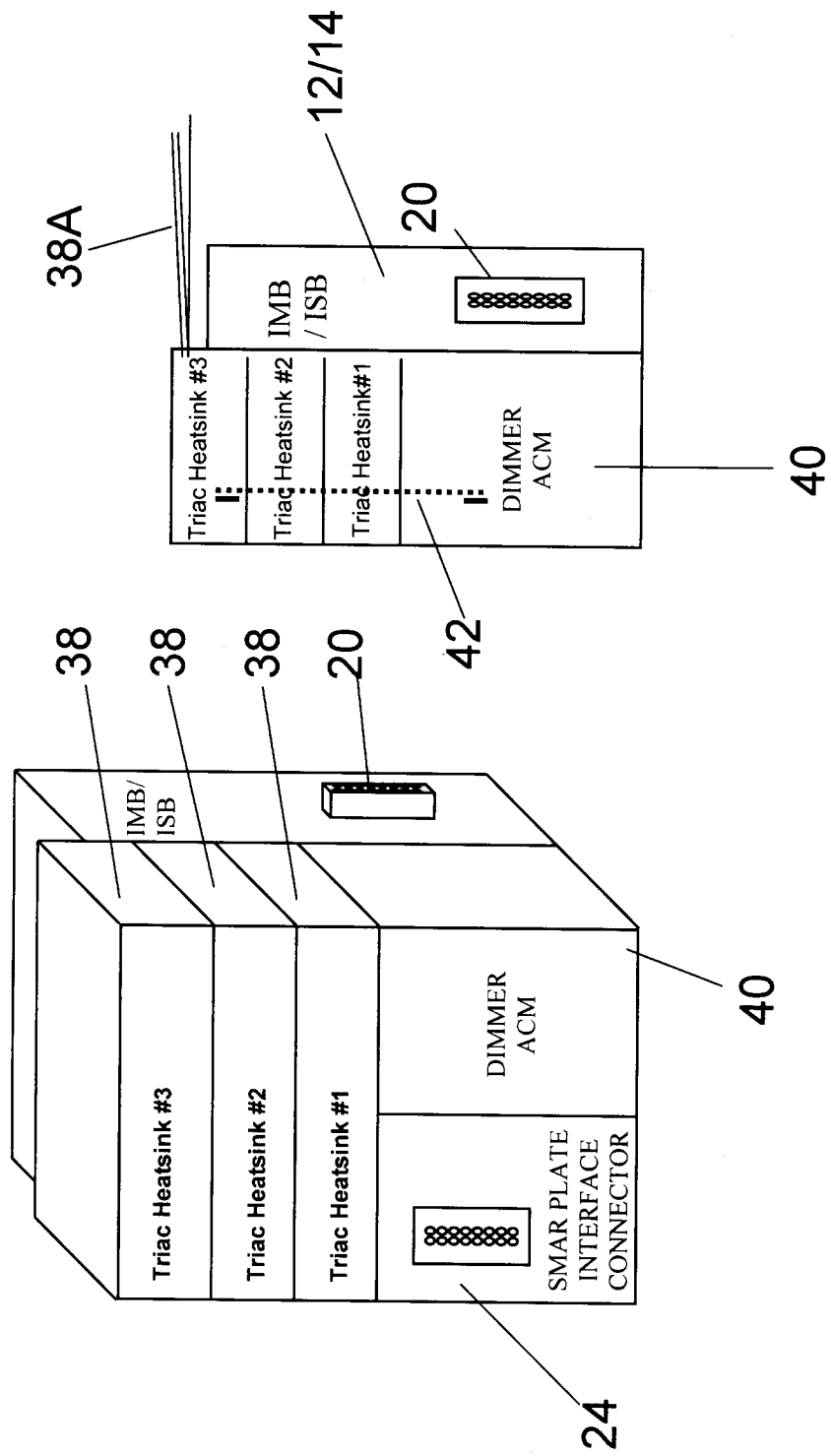
FIG. 6 is a perspective and a side view of an ACM apparatus showing stacked heat sinks used in a low power configuration.
Figure 7:
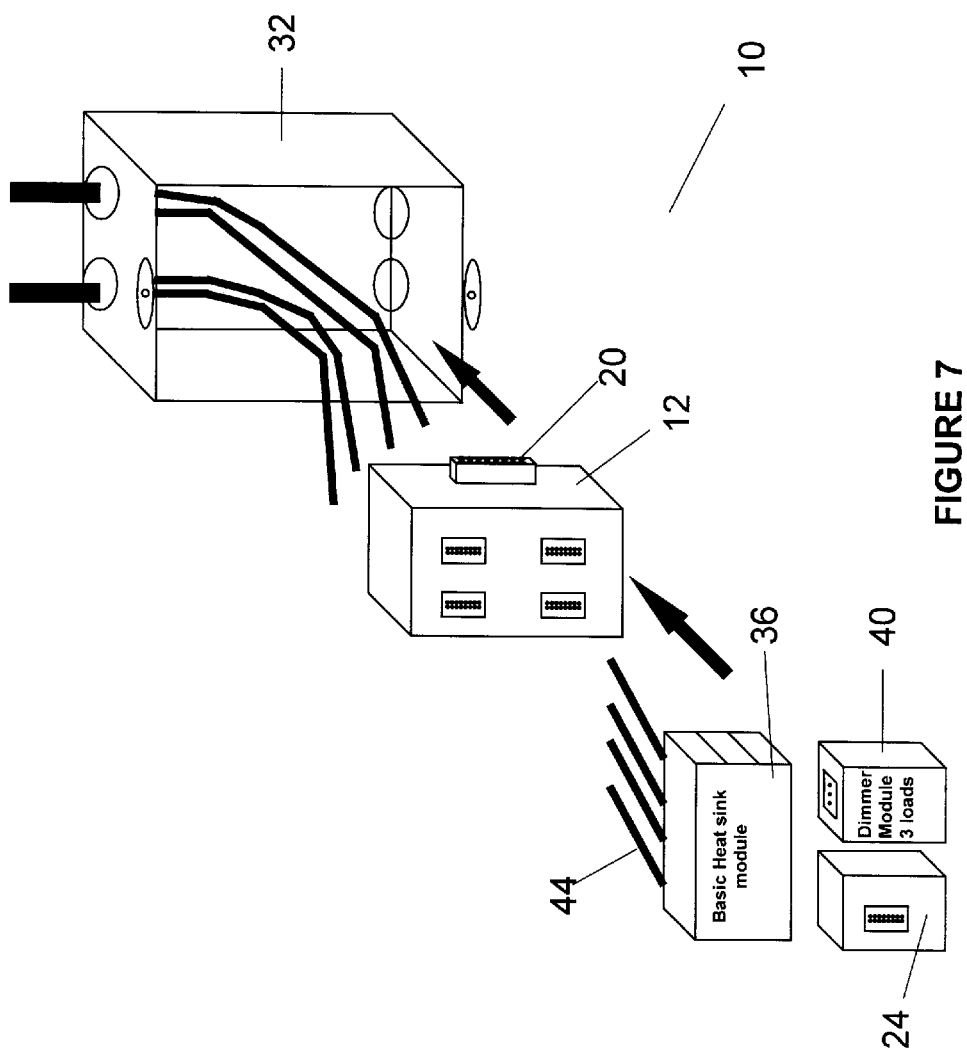
FIG. 7 is an exploded view of an intelligent master base with a basic heat sink module in a vertically orientated domestic single gang 1104 electrical box.

Referring now to FIGS. 5, 6 and 7, a specific example of the modular apparatus 10 is provided in which a basic heat sink ACM module 36 is connected to a dimmer ACM 40 and not to the IMB 12. The basic heat sink module 36 includes three stacked heat sinks 38 located above the dimmer ACM 40 and a smart plate cover interface module 24 into which the smart plate cover 22 can be plugged. The heat sink module 36 and the dimmer ACM 40 may also be constructed as a one piece apparatus. The heat sinks 38 are interconnected using wires 42 inside the heat sink module 36. The heat sink module 36 is controlled by circuitry from the dimmer ACM 40. The dimmer heat sink load wiring 38A and 44 connect to the electrical wiring network as they overpass the IMB/ISB 12/14 as shown in FIGS. 6 and 7. In the example shown, the minimum loading will be one load of 150 watts at 120 VAC per heat sink. The example of this modular apparatus can be located in the electrical box 32.

Figure 8:
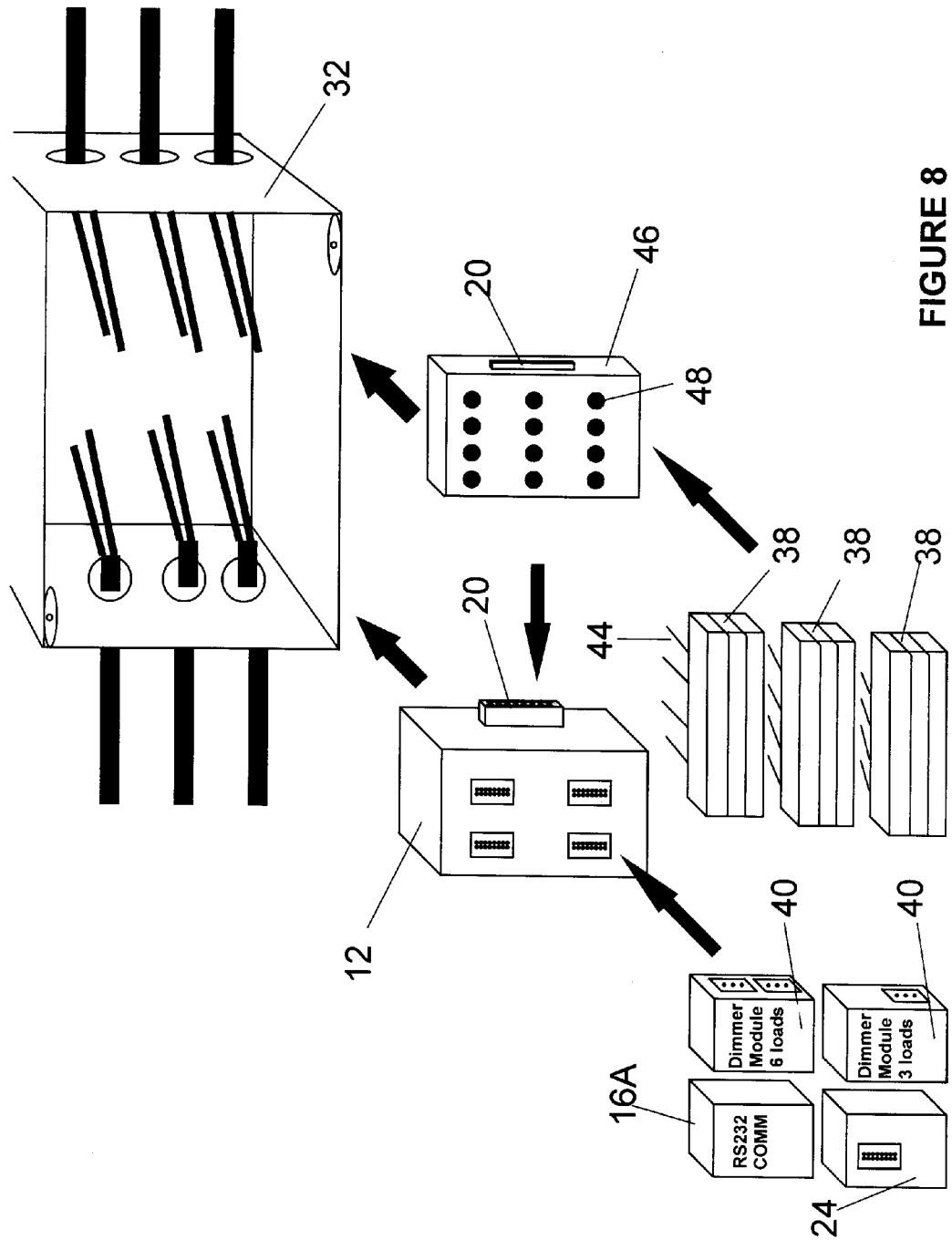
FIG. 8 is an exploded view of an alternative modular apparatus in a high power configuration using stacked heat sink modules connected to a slim slave base (SSB) module and located in a 4×4 or 4/11/16 electrical box.

Referring now to FIG. 8, another example of the modular apparatus 10 is illustrated in which a slim slave base (SSB) module 46 is connected to the IMB 12 via the base expansion connector 20. Three stacked heat sinks 38 are connected to the dimmer modules 40 which contain the dimming circuits that control TRIACs integrated in the heat sinks 38. The SSB 46 includes a plurality of access holes 48 for receiving the load wiring 44 from each heat sink module 38. The load wiring 44 will go through the holes of the SSB 46 and connect to the electrical wiring in the electrical box 32.

Figure 8A:
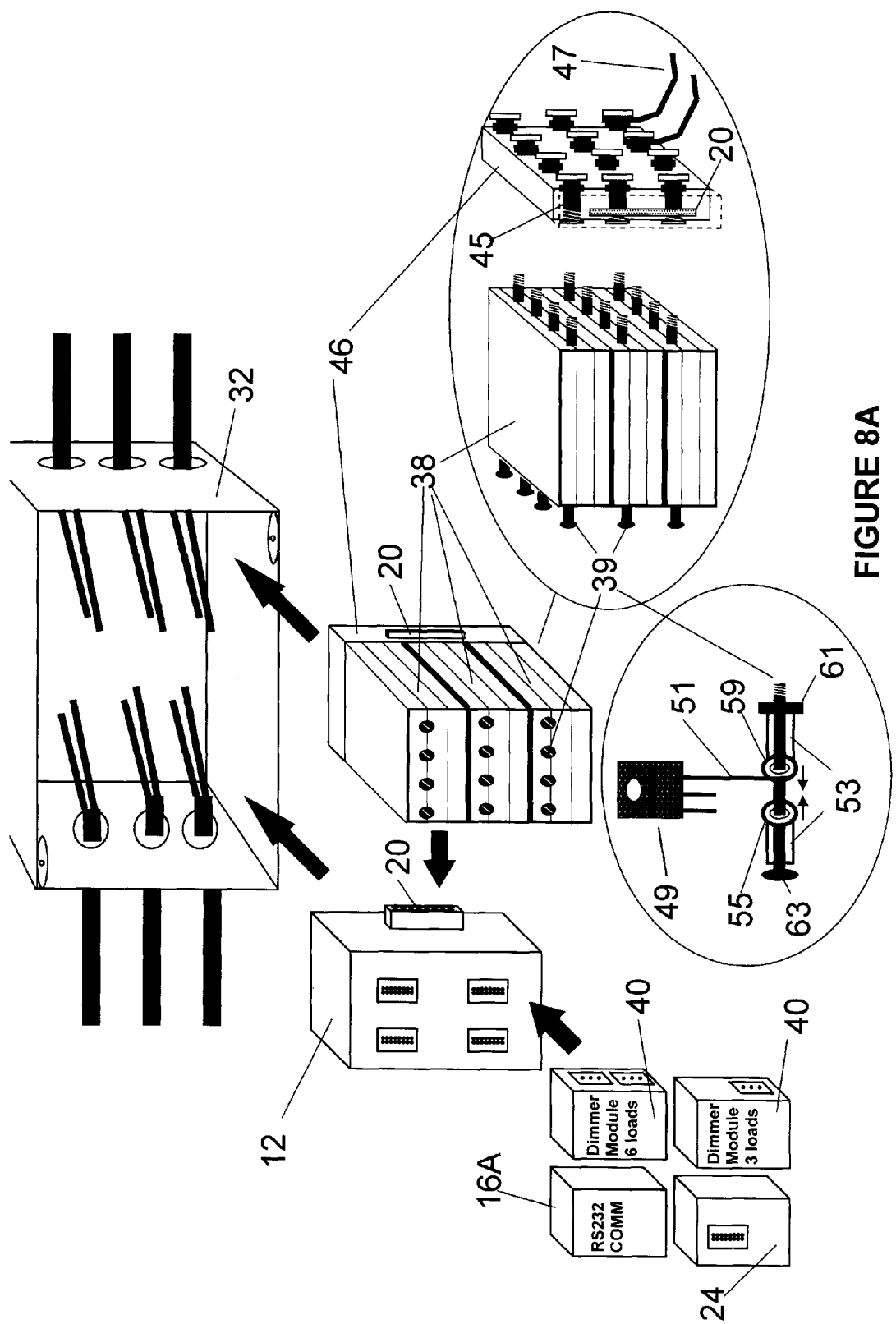
FIG. 8A is a detailed exploded view of an alternative modular apparatus in a high power configuration using stacked heat sink modules connected to a slim slave base (SSB) module using conductive screws and located in a 4×4 or 4/11/16 electrical box.

Alternatively, the SSB 46, as illustrated in FIG. 8A, includes screws 39 which replace the load wires, and which are fixed on the heat sink modules 38 and can be screwed into the SSB 46. A TRIAC 49 is an internal electronic component which is bolted onto the heat sinks. Each heat sink module 38 comprises three heat sinks where each heat sink includes the TRIAC 49. The TRIAC 49 is responsible for controlling one electrical load. In the example illustrated, the TRIAC includes a pin out conductor 51 which is connected to a screw instead of a long conductor, for example a pin conductor from TRIAC 51 is welded to a washer 59. When the user tightens the screw 39 by introducing a screw driver into a head screw 63, the pin out conductor 51 is squeezed between washers 55 and 59 by the exerted pressure produced from two cylinders 53 located around the screw 39. Force will be produced at the top of the screw by the head screw 63 and the bottom of the screw by a limit block 61 which is welded to the cylinder 53 located at the opposite end of the head screw 63. The limit block 61 is compressed by the housing terminals 45 in the SSB 46 and the head screw 63 allows for adequate screw 39 stability. This mechanism will assure a good conductivity between the pin out conductor 51 and the screw 39. Therefore, the user can safely and simply tighten the screw 39 into the respective housing terminals 45 which extend from one side of the SSB 46 to the other side allowing the user to join the electrical wiring network 47 behind the SSB module 46. The screw housing terminals 45 accommodate the fixed screws 39 from the heat sink modules 38 allowing connectivity and conductivity from the heat sink TRIACS located in the heat sink modules 38 to the electrical network behind the SSB 46. The electrical wiring 47 in box 32 is tightened under the housing terminal head screw 45. The base expansion connector 20 is connected to a special internal system bus of the slim salve base 46 which is not related to the load wire connectivity hardware 44, 45 or 47. When using the SSBs 46 as illustrated in FIGS. 8 and 8A, it is noteworthy that the SSB does not contain any logical intelligence or electronic circuits. The rational intent behind the SSBs' 46 hardwire traces is to form the continuations of communication conductors (which are power supply, CD88, HUS, and I$^2$C) from, reading left to right, its left hand IMB 12 (or ISB) to its right hand ISB. Furthermore, the SSB extends the circuitry from one IMB to another while providing space for hardware such as heat sinks between IMBs and ISBs without loosing any control or power signals from one base to another It is to be noted that the same screw type mechanism described for FIG. 8A may also apply to FIGS. 6 and 7 which demonstrates the apparatus in a low power configuration for a single gang 1104 box. This allows easy interchangeability of the dimmer ACMs 38 without the user needing to manipulate the electrical network wiring.

Referring to FIG. 8, in the example illustrated, the total load for the heat sinks 38 is a minimum of 150 watts per heat sink at 120 VAC. In this example, the IMB 12 includes two dimmer modules 40 (one of which offers control to 3 loads and one of which offers control to 6 loads), an RS232 ACM, and ACM 24 which is used to receive the smart plate cover module 22. When used with the apparatus 10, the configuration in FIG. 8 provides a high power configuration compared to the low power configuration shown in FIGS. 6 and 7. The IMB 12 and the slave slim base module 46 are located in the electrical box 32, which in this case is a 4×4 electrical box.

Figure 9:
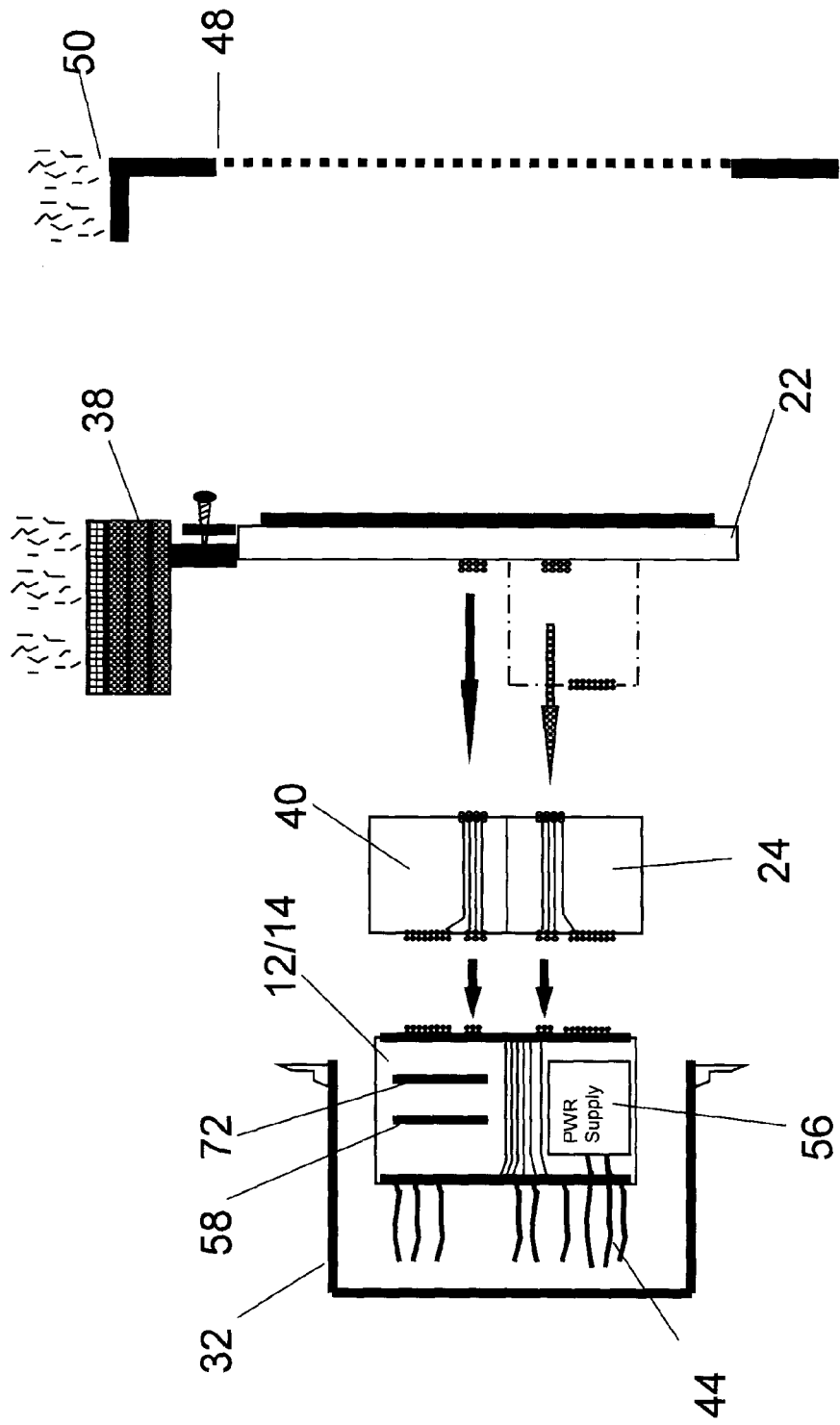
FIG. 9 is a detailed side view of an alternative modular apparatus showing an alternative location of stackable heat sinks.

Referring now to FIG. 9, another example of the modular apparatus 10 is illustrated in which the heat sinks 38 are alternatively stacked and connected to the smart plate cover 22 externally of the box 32. An additional plate cover 48 may be located over the heat sinks and may include convection holes 50 locatable adjacent the heat sinks.

Intelligent Master Base (IMB) and Intelligent Slave Base (ISB)

Figure 10:
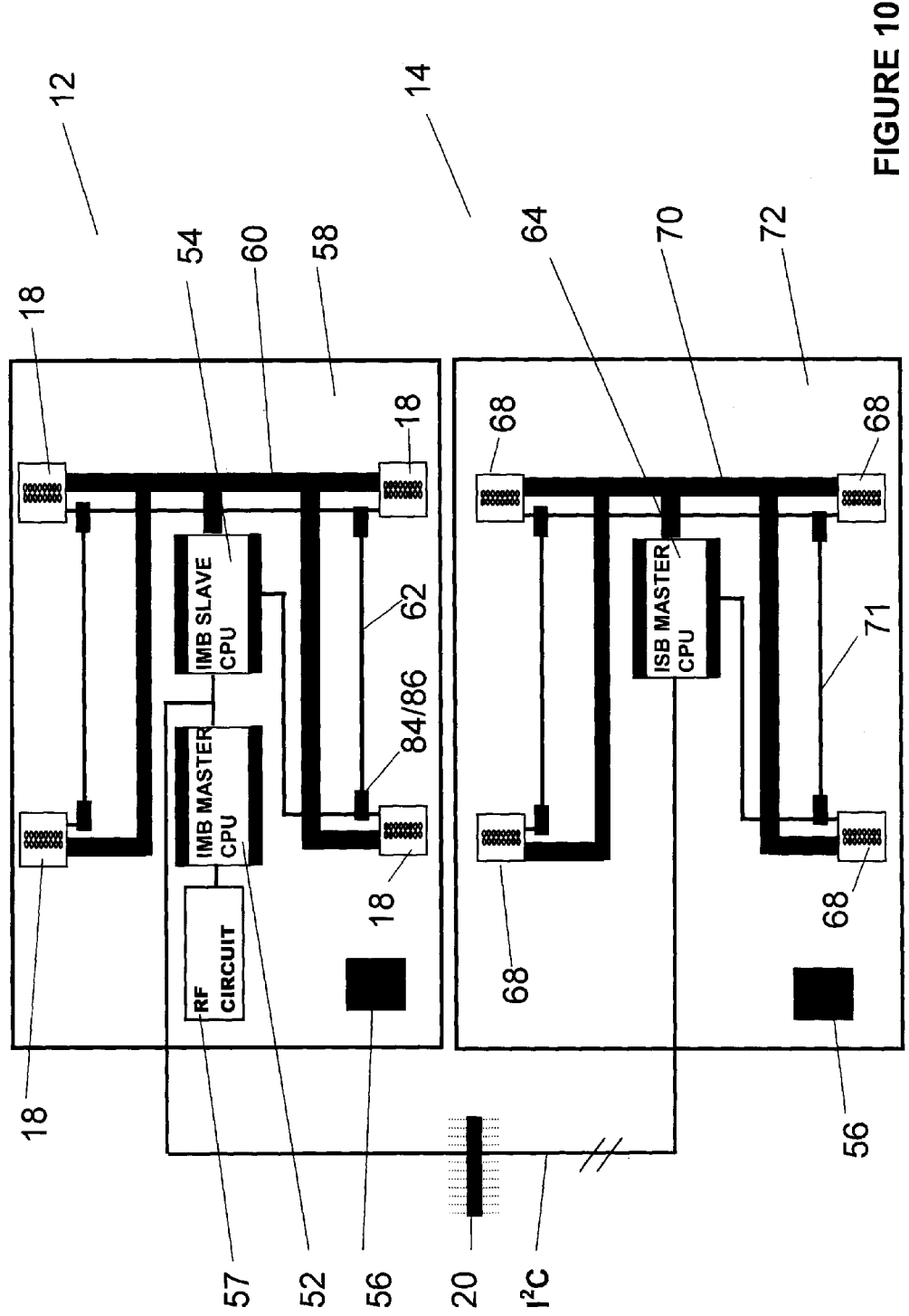
FIG. 10 is a diagrammatic representation of an IMB and an ISB showing the location of an IMB master CPU, an IMB slave CPU, an ISB master CPU and communication control buses.

Referring now to FIG. 10, the IMB 12 comprises a master central processing unit called an IMB master CPU 52, which is connected to the IMB slave CPU 54 via I$^2$C, a power supply 56 and an RF module 57, all of which are mounted onto an IMB prototype circuit board (PCB) 58. The IMB master CPU 52 is used for global settings and controlling RF operations and the IMB slave CPU 54 is used to communicate with the ACMs 16A. A first I/O bus 60 which is called the HUS (HUS will be later discussed in details) interconnects the IMB slave CPU 54 to the four ACM connectors 18. A first communication control bus 62, which I call a CD88 communications standard (note that communications control bus and CD88 communications standard are used interchangeably throughout this description) also interconnects the four ACM connectors 18 to the IMB slave CPU 54. The CD88 will be described in more detail below. Typical examples of the IMB master CPU and the IMB slave CPU include, but are not limited to, PIC, DSC/DSP micro-controller processors, 68 Series (Motorola), 8088 Series (Pentium), ARM processors and the like. In the examples shown, the processors are PIC micro-controller or MCUs.

The ISB 14 comprises an ISB master CPU 64, a power supply 56, and four ACM connectors 68, which are also interconnected using a second I/O bus 70 called the HUS and which is mounted onto a prototype circuit board (PCB) 72. The HUS will be described in more detail below. A second communication control bus 71 also interconnects the four ACM connectors 68. It is to be noted that the first and second communication control busses 62 and 71 are identical.

Thus, the ISB 14 comprises only one micro-controller called the ISB master CPU 64, whereas the IMB 12 comprises two micro-controllers CPUs called IMB master CPU 52 and IMB slave CPU 54. It is to be noted that the IMB 12 and ISB 14 communicate via I$^2$C through the base expansion connector 20. The IMB PCB 58 and the ISB PCB 72 are mounted in their respective IMB and ISB 12,14 with their respective power supply 56 being connected to standard power wires at 120VAC (phase, neutral and ground) in the electrical box 32.

It is important to make the following distinction between the CPU's that communicate by I$^2$C and the CPU's that communicate by CD88 and HUS. Within the IMB 12, the IMB master CPU 52 and IMB slave CPU 54 communicate via the conventional I$^2$C industry standard. When any of the ISB slave CPUs 64 communicate with an IMB master CPU 52, they also share the same two wire I$^2$C bus. However, when a multiple universal communications extender (MUCX), as described below, is connected to an IMB or an ISB, the communications used will be via extended circuitries of CD88 and HUS, thereby excluding the use of I$^2$C.

The Communications Control Bus (CD88)

Figure 11:
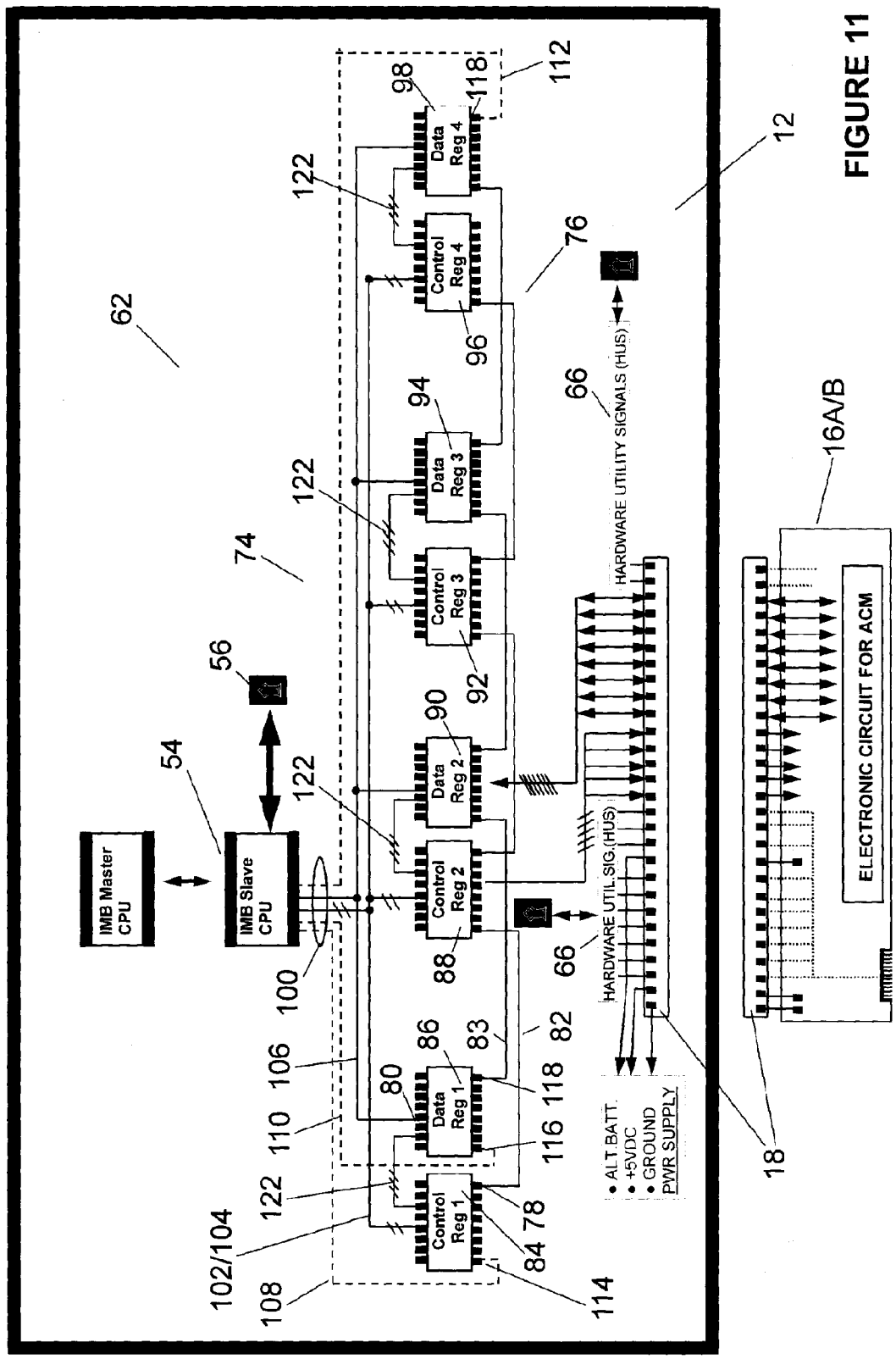
FIG. 11 is a circuit diagram of an embodiment of a communications control bus (CD88 communication standard) located in an intelligent master base or an intelligent slave base (note that the "//" indicates two wires)

Referring now to FIG. 11, an embodiment of the communication control bus 62 is illustrated disposed in the IMB 12. As described above, I have called my new communication control bus 62 a "CD88 communications standard" in which the "CD" denotes Control/Data register and the "88" denotes "eight bits per control register and 8 bits per data register". Each register in FIG. 11 is a serial in serial out with 8 bi-directional I/O parallel bits 74HC299 device. The communication control bus 62 comprises a network (or circuit) 74 having eight 8-bit shift registers 76 which are electrically interconnected in a daisy chain manner using a plurality of I/O pins like 78 and wires 82. The eight 8-bit shift registers 76 include, in series, a first control register 84 and first data register 86; a second control register 88 and second data register 90; a third control register 92 and third data register 94; and a fourth control register 96 and fourth data register 98. The shift registers 76 are arranged in pairs, thus the first control register 84 and the first data registers 86 are one pair, the second control register 88 and the second data register 90 are another pair and so on. Each control register and data register pair are connected to its corresponding ACM connector 18, such as for example, the second control register 88 and the second data register 90 pair, are connected to an ACM connector, as best illustrated in FIG. 11. Each register is a serial in serial out with 8 bi-directional I/O parallel bits 74HC299 device.

The IMB slave CPU 54 in the IMB 12 comprises six IMB slave CPU I/O pins 100 for serially communicating 13 bits of data to each of the four ACM connectors 18 (also known as MUC ports), as will be explained in more detail below.

Six wires (listed below) lead from the six IMB slave CPU I/O pins 100 which connect the IMB slave CPU 54 to the eight 8-bit shift registers 76. The six wires include:
Wire #1: Clock#1 102
Wire #2: Enable 104
Wire #3: Clock#2 106
Wire #4: SL1 108
Wire #5: SL2 110
Wire #6: DQA Feedback 112

The clock #1 wire 102 and the enable wire #2 104 connect the IMB slave CPU 54 to the first, second, third and fourth control registers 84, 88, 92 and 96 and transmits clocking and enable data signals to each control register. The SL1 wire #4 108 and the SL2 wire #5 110 respectively are outputs from the IMB slave CPU 54 which transmit serial data signals. The SL1 wire 108 signal is connected to a serial input pin 114 (the SL1 input pin) of the first control register 84. The SL1 input pin 114 can serially take in 8 bits at one time without loosing the states of the bits. Similarly, the SL2 wire #5 110 is connected to an SL2 input pin 116 in the first data register 86. The SL2 input pin 116 can also serially take in 8 bits at one time without loosing the states of the bits. The clock #2 wire 106 connects the four data registers 86, 90, 94 and 98 to the IMB slave CPU 54 and transmits clocking data signals there from to each of the data registers. The DQA feedback wire #6 at 112 which is connected to the DQA-output pin 118 of the fourth data register 98 is connected to the IMB slave CPU 54 and feeds serial data back thereto.

Thus, the communication control bus 62 comprises the aforesaid six wires 102, 104, 106, 108, 110 and 112, which communicate data signals from the IMB slave CPU 54 to the eight 8-bit shift registers 76 in the network (or circuit) 74. Two eight bit shift registers, namely each pair of the control and data registers, such as for example the first control register 84 and the first data register 86, are associated with each ACM 16A thereby providing each IMB 12 with the ability to connect to up to four ACMs 16A/B.

The 13 Bit Bus

Figure 13:
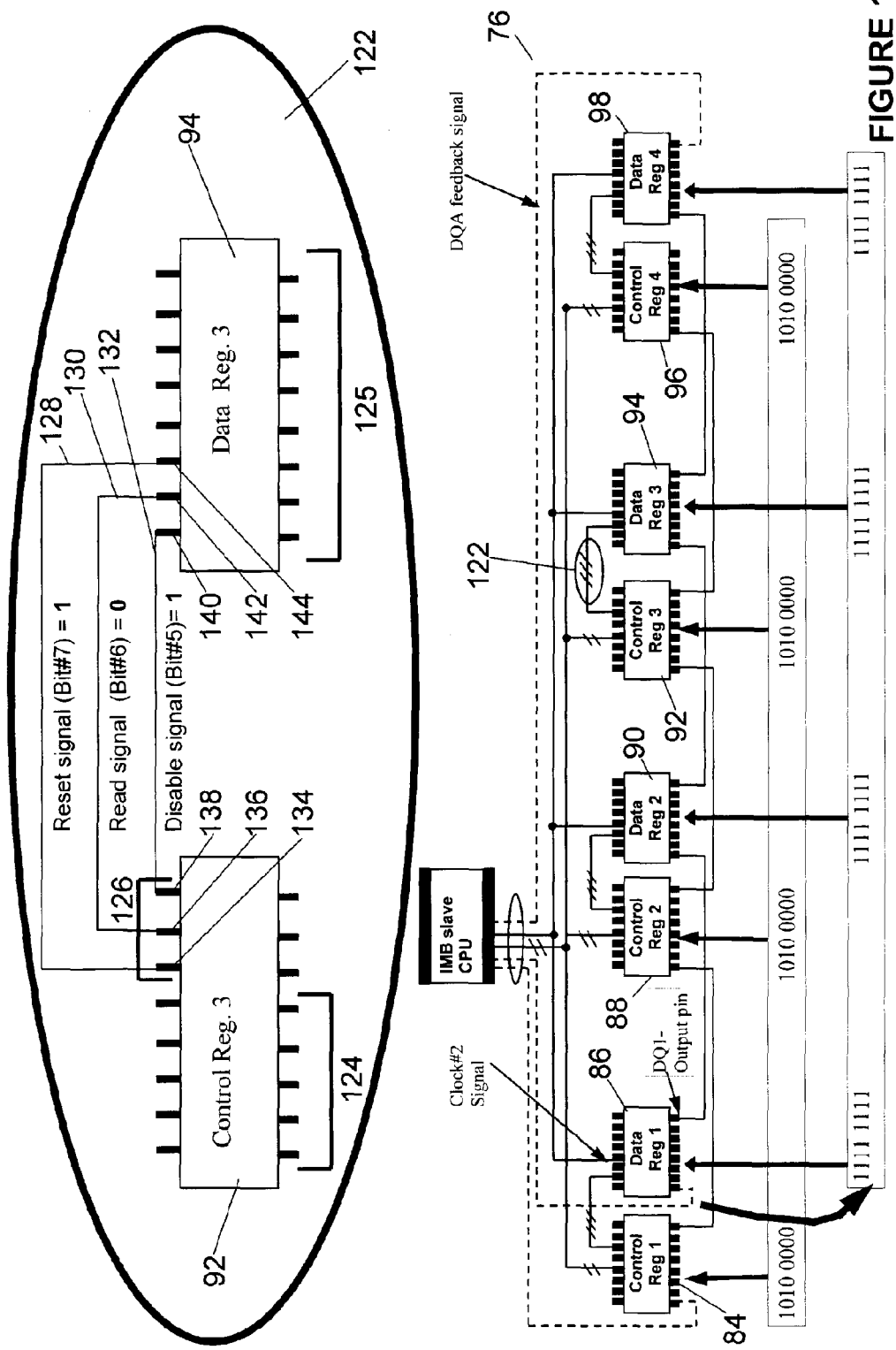
FIG. 13 illustrates a loading operation of data registers using the circuit of FIG. 11.
Figure 14:
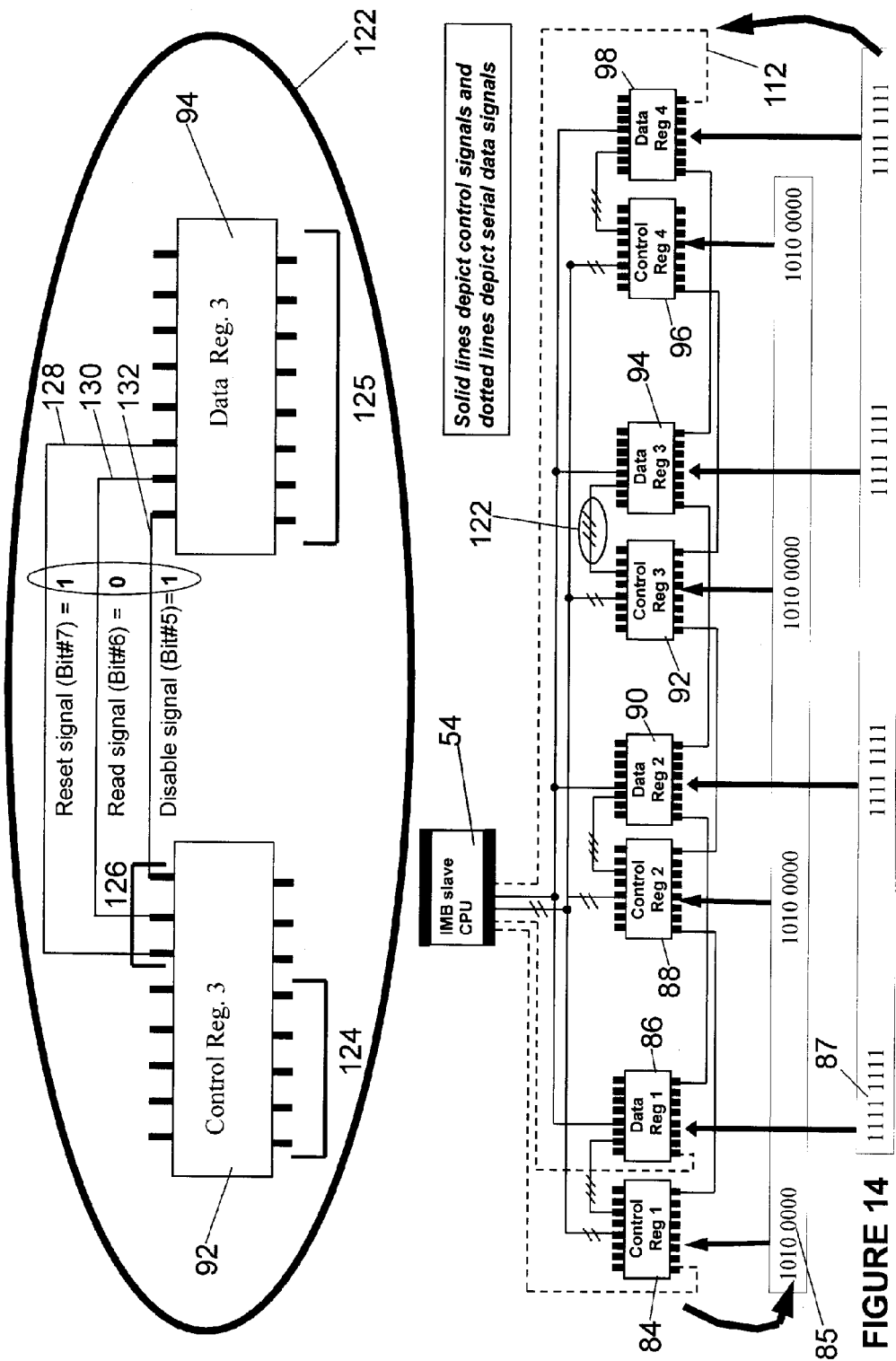
FIG. 14 illustrates an unloading operation of the data registers of FIG. 13.

Referring to FIGS. 11, 13 and 14, each pair of control and data registers comprises a 3 bit command bus 122. For the sake of clarity, since each 3 bit command bus is identical, only one will be described in detail with reference to the third control register 92 and the third data register 94, as illustrated in FIG. 13. The 3 bit command bus 122 is a 3 wire link between the control register 92 and the data register 94 which issues command signals for the data register 94. Since the eight 8-bit shift registers 76 are arranged in pairs, in which the control register controls its adjacent data register, as illustrated, the 3 bit command bus arrangement is repeated for each pair. Three connector wires 128, 130, and 132 interconnect the control register 92 with the data register 94 via three control connector pins per register. The control pins 134, 136, and 138 are located on the control register 92 (which are the 3 most significant bits of the control register) 126 and the control pins 140, 142, and 144 are located on the data register 94 (which are input control signals for the data register device). The control register 92 uses its five least significant bits 124 as additional outputs that can be used as complementary signals. The data register 94 uses its 8 bit bi-directional I/O parallel bus 125 to communicate 8 bits at a time. Therefore, 8+5=13 bits, 8 of them forming the 8 bit bi-directional I/O bus from the data register 94 and 5 as complementary outputs from the control register 92 equates to one 13 bit bus per ACM connector 18. (124+125). The five bits 124 of the control register 92 are outputs only, which can be used as optional control signals on the PCB 58 or PCB 72 at 18 or 68 which connect to the ACMs 16A/B. The eight bits 125 of the data register 94 is a bi-directional 8 bit bus, which is used on the PCB 58 or PCB 72 which connect to the ACMs 16A/B at 18 or 68. Therefore, each register pair (control/data registers) produces a 13 bit bus.

The ACM Connector

As illustrated in FIG. 13, each 13 bit bus 124, 125 originating from each paired registers (control/data) communicates with one of the four ACM connectors 18/68 which are integrated in each of the IMBs 12 and ISBs 14.

Figure 17:
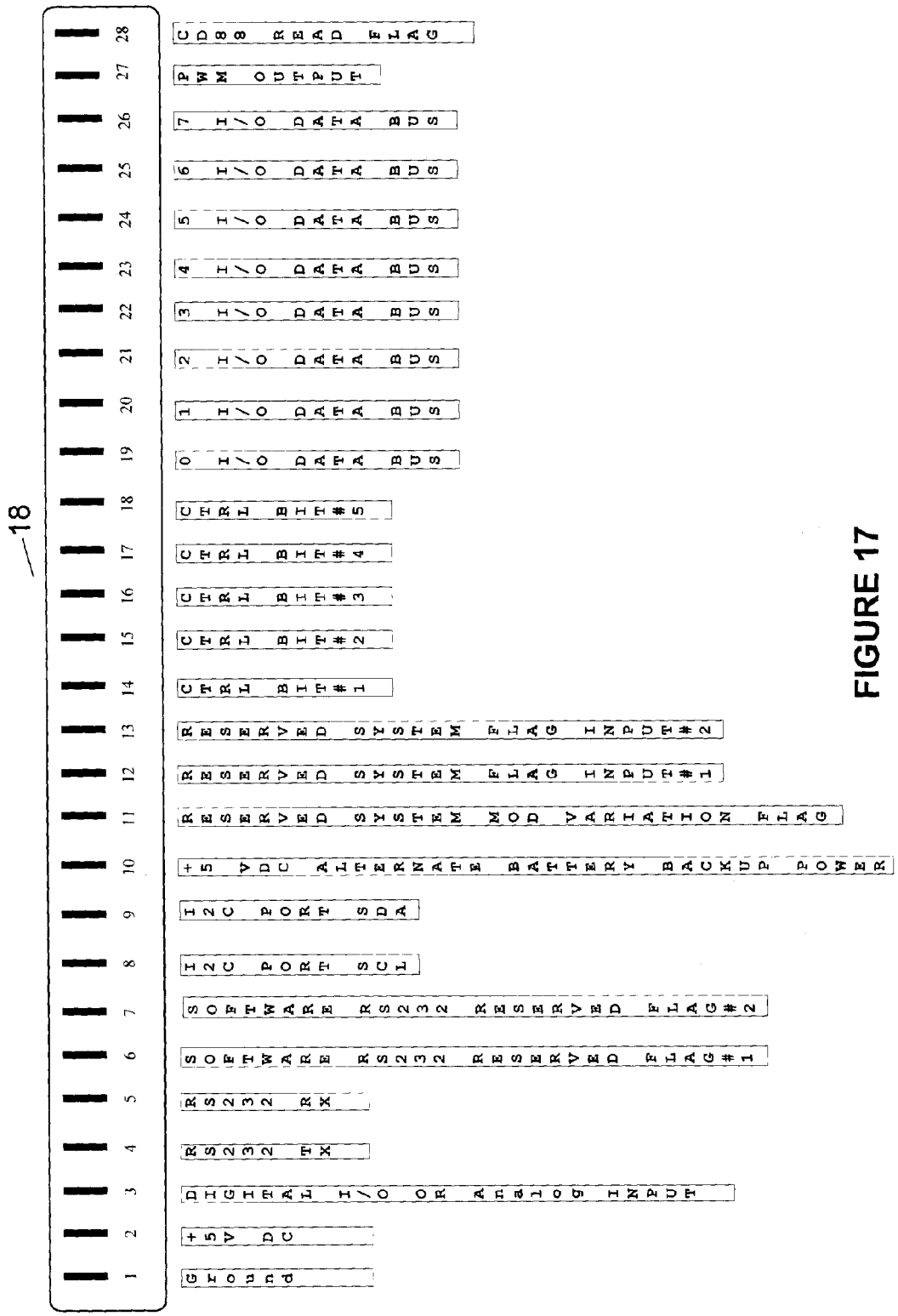
FIG. 17 is an end view of an ACM connector identifying its pinouts.
Figure 18:
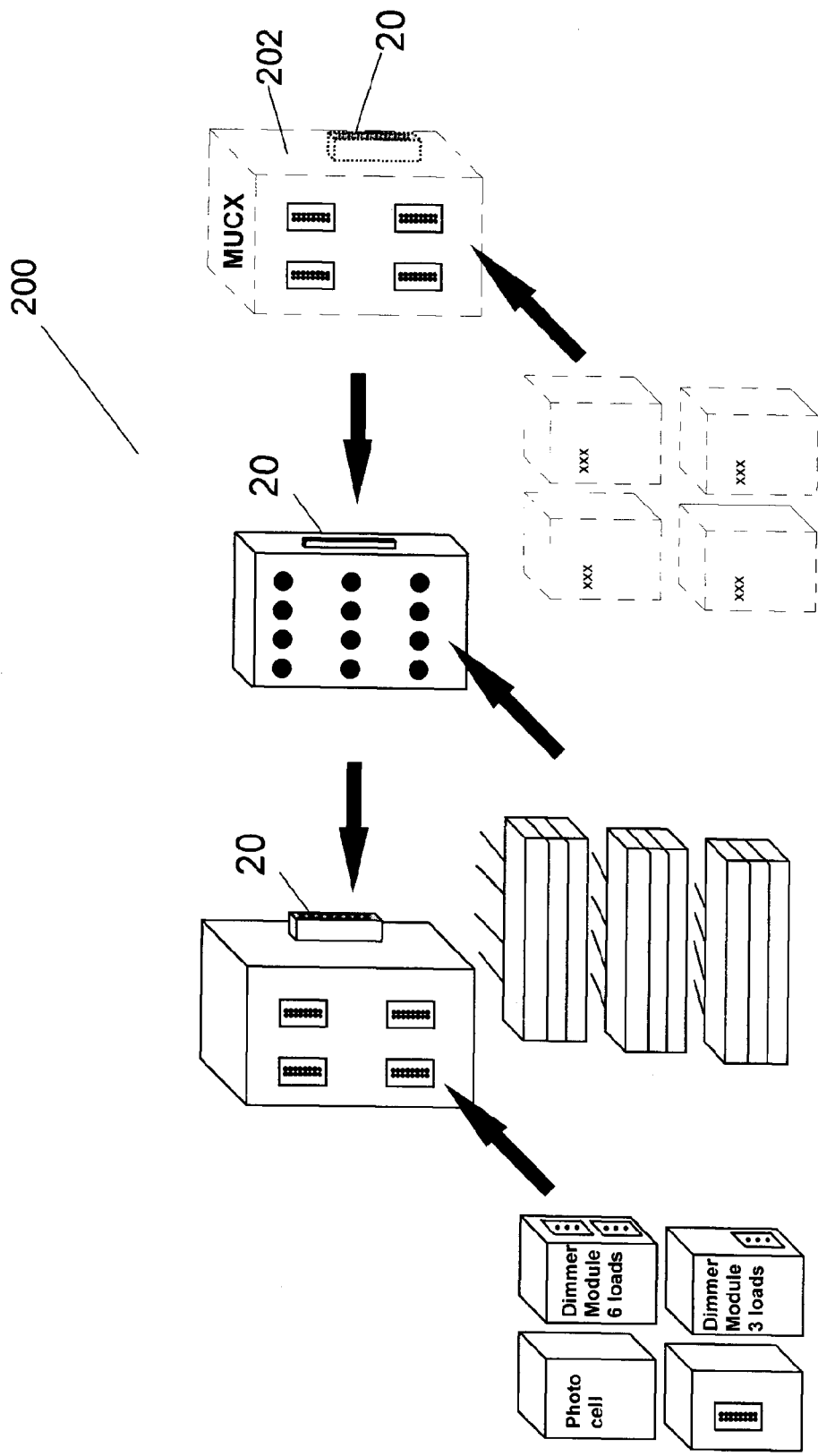
FIG. 18 is an exploded perspective view of an alternative embodiment of a modular apparatus showing stacked heat sink modules permitting the load wires to have access through the holes of the SSB module for connections to the electrical network.

Referring now to FIGS. 10, 11 and 17, each ACM connector 18/68 are 28 pin headers. The IMB slave CPU 52 also offers resources called HUS 66, shown as first and second I/O buses 60 and 70 in FIG. 10. It is to be noted that the house icons in FIG. 11 illustrate that the signals at the HUS 66 originate from signal connections located at 56 which connect to the IMB slave CPU 54. Furthermore, for the sake of clarity, it is noted that HUS is not part of CD88. The HUS is a separate set of resources that can be used in parallel with CD88 which may be required by an ACM 16A/B and comprises the following:

2—RS-232 ports;
4—Analog/Discrete inputs;
1—I²C communications (not related to the I²C in the base expansion connector);
1—Pulse width modulation; and
1-6—I/Os used for reserved special system logic signals Referring now to FIG. 17, the CD88 standard includes pins #14 to 26, whereas the hardware utility signals (HUS) includes pins #3 to #9 , #11 to #13 and pins #27-28. Pins #1, #2 and #10 are dedicated power connections. Thus each ACM connector 18 or 68 provides the following services:

Pin#1: Ground (Power connections)
Pin#2: +5 VDC (Power connections)
Pin#3: Analog input (HUS)
Pin#4/5: RS232 (TX/RX) (HUS)
Pin#6/7: Special discrete inputs used to detect RS-232 ACM's (HUS)
Pin#8/9: I2C (SCL/SDA) (HUS)
Pin#10: Battery back up power (Power connections)
Pin#11: Module variation flag (For future to detect possible ACM variations) (HUS)
Pin#12/13: Reserved system utility inputs (HUS)
Pin#14-18: CD88, five (5) user control output bits from control registers
Pin#19-26 CD88, eight (8) bit data byte from data registers
Pin#27: Pulse width modulation output (HUS)
Pin#28: CD88_Read_Flag (HUS)

How the ACMs are Identified

The IMB 12 or ISB 14 can identify which ACM 16A is plugged in. Each ACM 16A has a hardwired coded address which appears in the data register's bus. Each bit of the bus is either a logical "1" or a logical "0" by using either a parallel pull up or pull down resistor respectively, as described below. When manufactured, a predetermined numerical combination of the eight bit states becomes the ACM's permanent address. Furthermore, some of the ACMs have an eight bit bus control buffer which is controlled by the first bit of the control register. An ACM that only needs the use of the hardware utility signals (HUS), will use the CD88 communications standard to only dispatch its address. However, if the ACM uses the CD88 communications standard to convey data as well, then an eight bit bus control buffer is incorporated in its design. In the case where the data register's bus is to be used to exchange data instead of the module's address, the eight bit bus control buffer latches in the data byte overriding the eight bit address. Therefore, in this case, the data register bus is used to transfer data only. This overrides the address bits because the 8 bit lines are connected to eight separate pull up/down resistors. Similarly, if only the address of the ACM is required, then the eight bit bus control buffer unlatches the data information byte leaving only the reflection of the ACM's eight bit address on the data register's bus. Thus, the data register bus is used to obtain the ACM's address at one instance and convey data at another instance.

Figure 16:
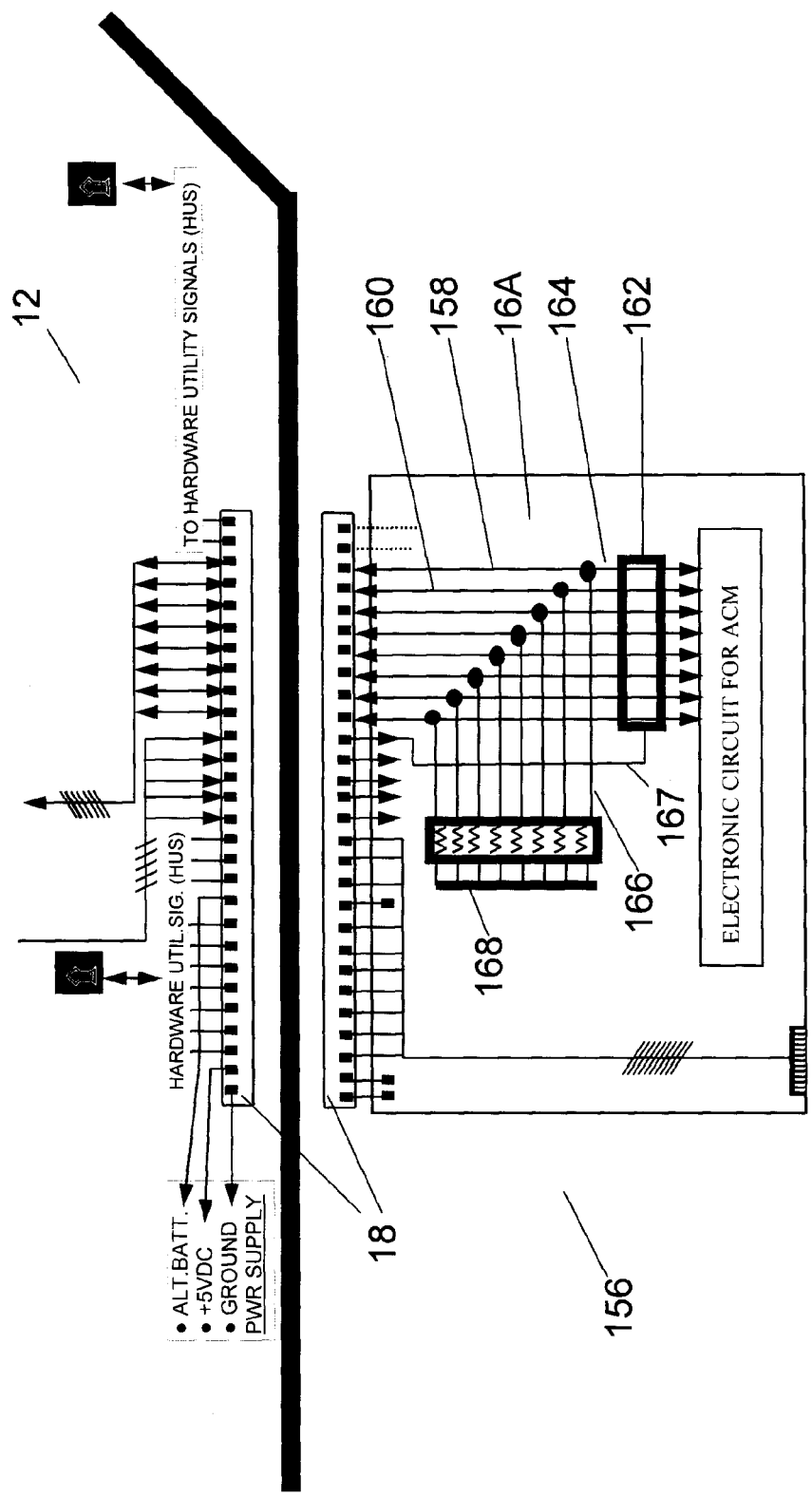
FIG. 16 is a diagram illustrating the identification circuit of an ACM.

As best illustrated in FIG. 16, an ACM circuit 156 is located in each ACM 16A which compliments the CD88 communication standard and HUS services. The circuit 156 comprises an eight bit data bus portion 158 of the 13 bit bus. The eight bit data bus 158 originating from the IMB 12, includes wires 160 which splits in two different routes, the first being, 166, and the second being to an 8 bit bus. The first route 166 communicates with eight parallel pull up or pull down resistors 168, depicting the permanent address of the ACM 16A. The second route 164 communicates with the control buffer 162. A buffer latch control 167 connects the control buffer 162 with the first bit of the control register.

Therefore, each bit of the eight bit data bus 158 will tap to the pull up/down resistor 168, which forms the address of the ACM 16A/B. If the ACM 16A also requires 8 bit data communications, each bit will also tap into an eight bit control buffer 162. The eight bit bus control buffer 162 is not part of the CD88 communication standard. The CD88 communication standard goes from the IMB slave CPU 54 to the four ACM addresses (which are the resistors). Thus, the eight bit bus control buffer 162 is only installed in the ACMs 16A when it is required to use the eight bit data bus 158 to retrieve the address of the ACM 16A in one instance and to use the eight bit data bus 158 as a general bi-directional parallel eight bit data transfer bus in another instance.

Thus in sum, the CD88 communication standard allows the exchange of information from the six wires 102, 104, 106, 108, 110 and 112 from the IMB slave CPU 54 or ISB master CPU 64 to 13 bits of information to any of the four 13 bit buses which connect to any ACM connectors 18 simultaneously or one at a time. Without the CD88 communications standard, the IMB slave CPU 54 or ISB master CPU 64 would need up to 52 discrete hardware I/O resources. It is contemplated that the CD88 communication standard can be modified to use one 16 bit control register and one 16 bit data register thus improving the efficiency of the CPU I/O resources. In the case where 16 bit control and data registers would be used, the communication standard would be named CD1616 and would be able to obtain 116 I/Os from the six wires 102, 104, 106, 108, 110 and 112 from the IMB slave CPU 54 or ISB master CPU, where:

| | |
|---|---|
| Control register: (16 − 3 command bits) = | 13 bits |
| Data register: = | 16 bits |
| | 29 bits |
| Multiplied by 4 ACM connectors: ×4 ports | 116 I/Os total |

Without using the CD88 communications standard, to obtain 116 I/Os in a bus like structure from a standard 8 or 16 bit CPU, would require considerable bus circuitry component customization. To integrate 116 I/Os in a CPLD would be prohibitively expensive. The CD88 communications standard allows a large number of I/Os structured as multiple 13 bit ports to communicate between the IMB slave CPU 54 (or ISB master CPU 64) and a plurality of different types of electronics circuits simultaneously or one at a time. In order to achieve the ultimate space efficiency, the production design for the registers implicated for the CD88 communications standard, will be integrated in a CPLD.

Multiple Universal Communications (MUC) and Multiple Universal Communications Expanders (MUCX)

Figure 19:
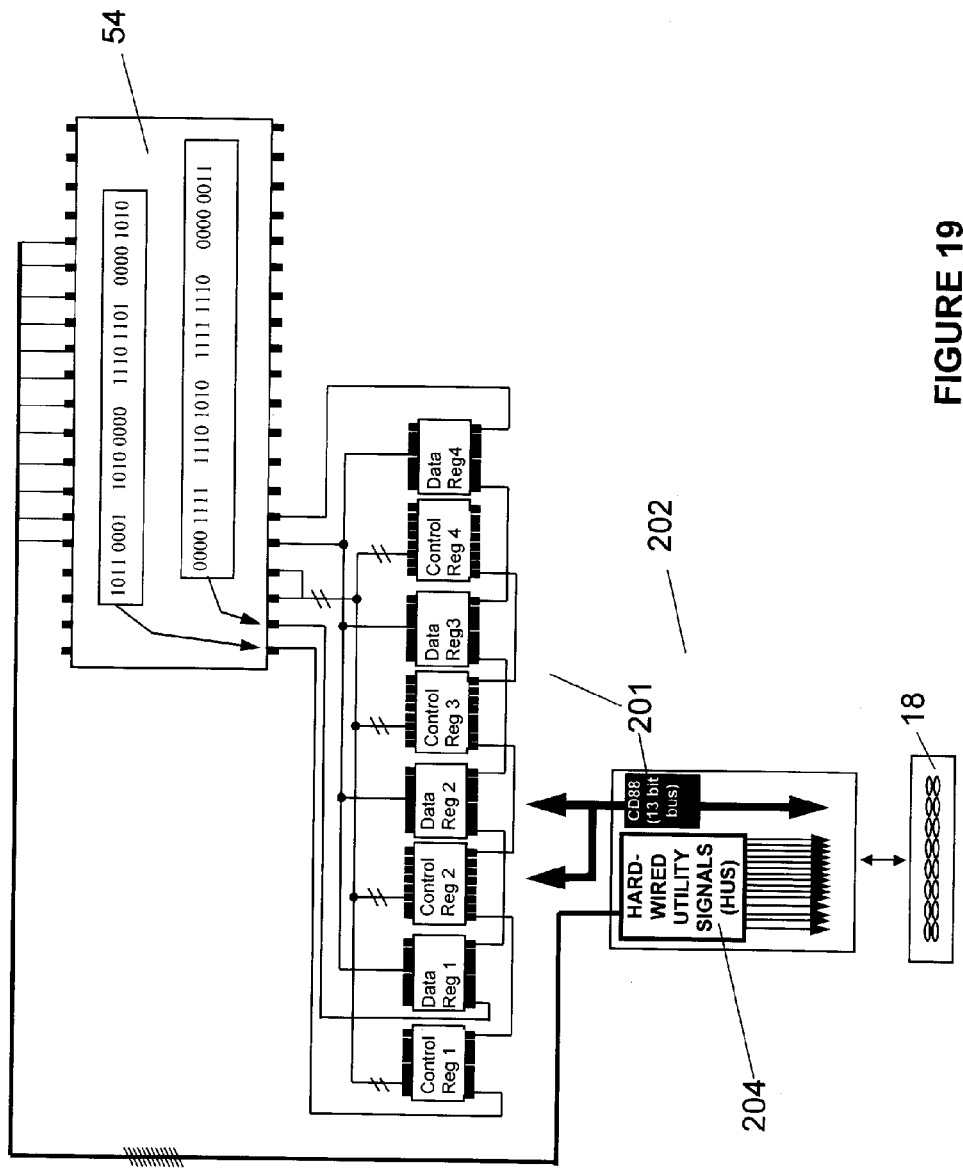
FIG. 19 is a circuit diagram showing the definition of a multiple universal communications (MUC)
Figure 20:
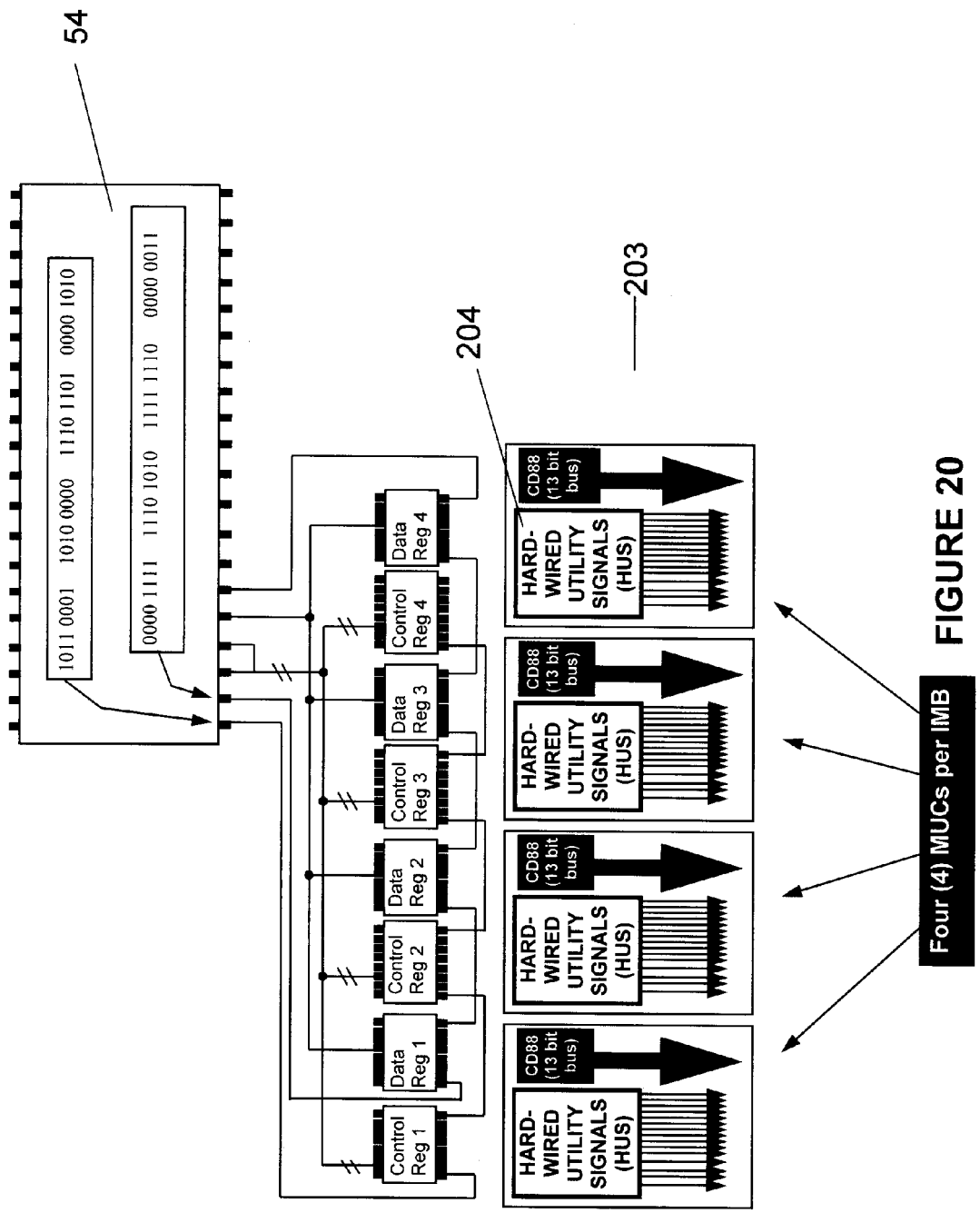
FIG. 20 is a circuit diagram showing four MUCs.

Referring now to FIGS. 19 and 20, a communications control bus CD88 201, a HUS 204, and power connections (not shown) of an ACM connector 18 are defined as 1 MUC 202. FIG. 20 illustrates four MUCs 203 per IMB 12 (or ISB 14).

A MUC (Multiple universal communications) defines the communications components wired into the ACM connector. The CD88, HUS and power connections make up the MUC, thereby creating a MUC standard. As illustrated in FIG. 20, each IMB incorporates four ACM connectors, which allows the MUC standard to be repeated four times per IMB/ISB.

Figure 21:
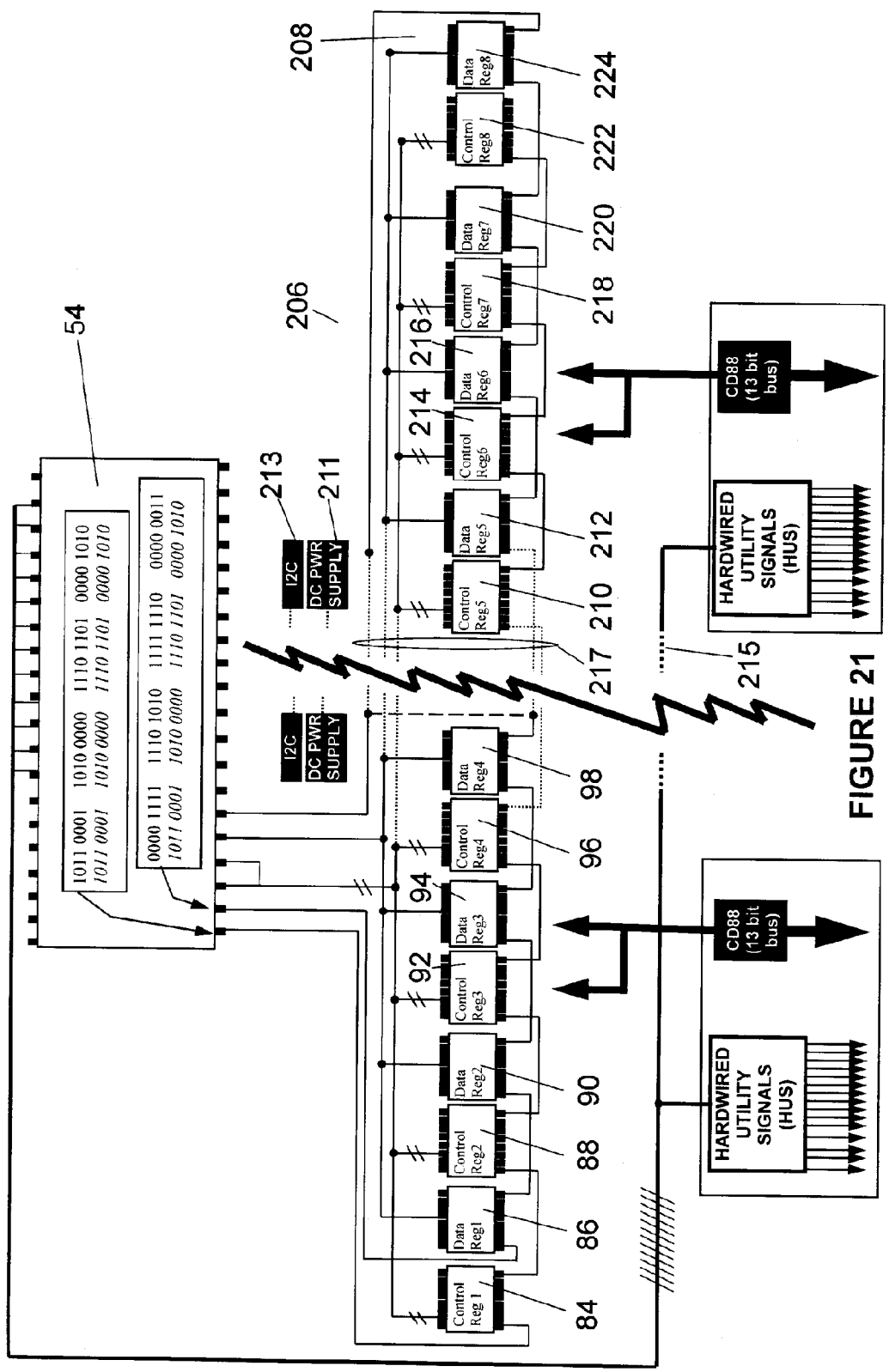
FIG. 21 is a circuit diagram showing an additional eight 8 bit shift registers as part of a of a multiple universal communications extender (MUCX)
Figure 22:
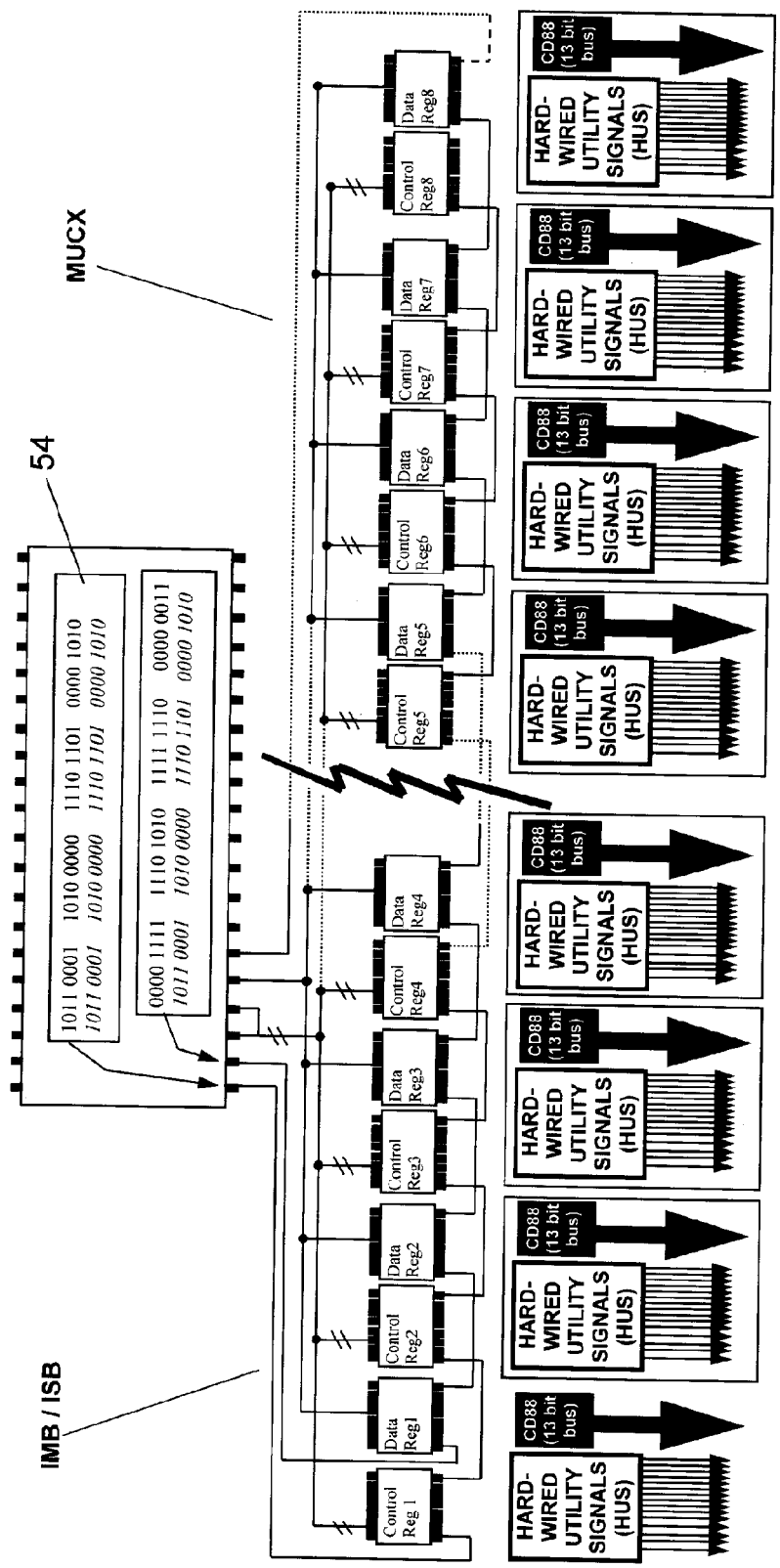
FIG. 22 is a general circuit diagram showing an intelligent master base connected to a MUCX providing 8 MUCS.
Figure 23:
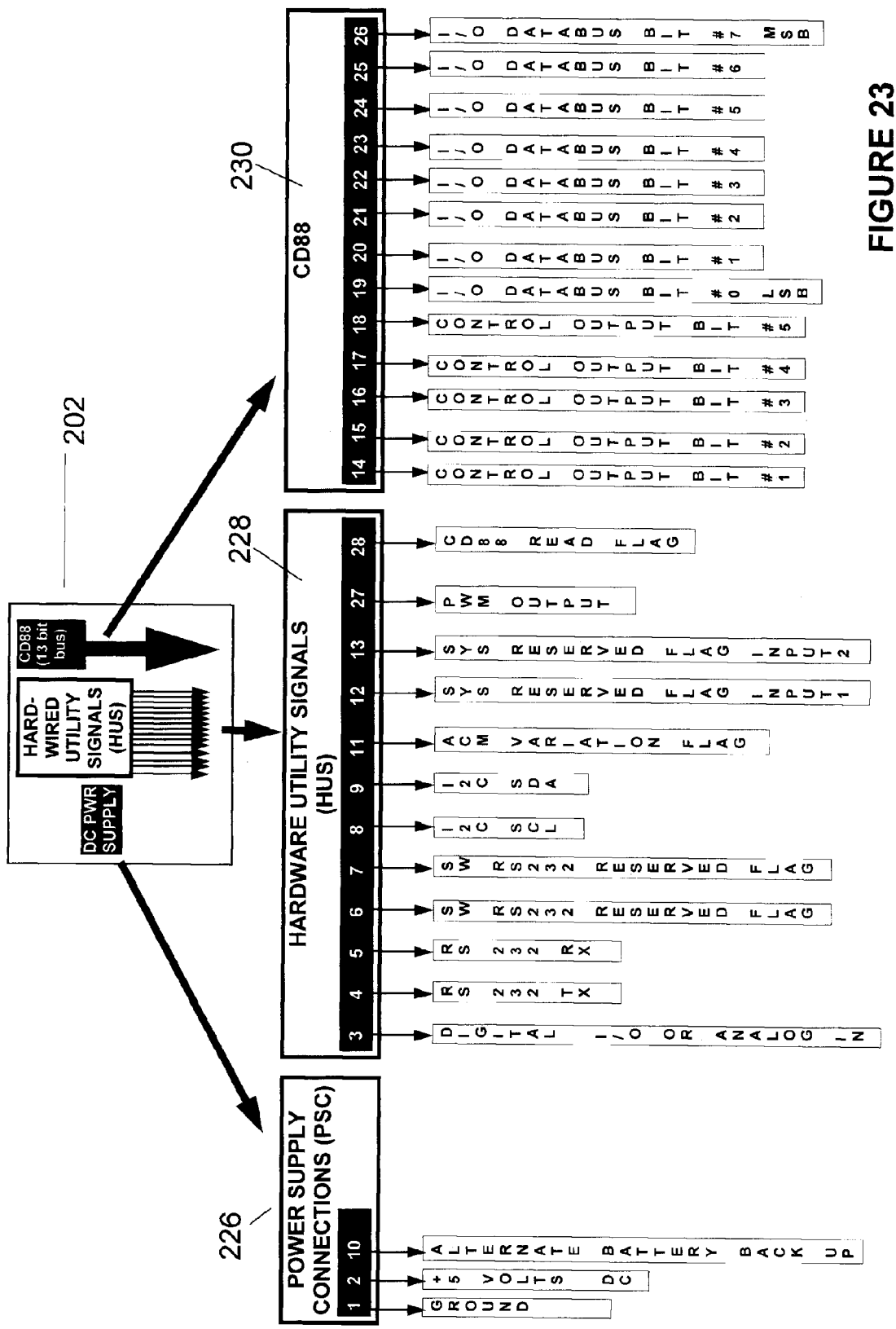
FIG. 23 is a diagram showing details of the components used in a MUC (which are CD88/HUS/PowerSupply connections) with corresponding signals to the ACM connector.

Referring to FIGS. 18 to 23, in which an alternative embodiment of the apparatus of the present invention is illustrated at 200. The apparatus 200 can be further expanded using a multiple universal communications extender (MUCX) 202. The MUCX 202 expands the CD88 circuit via the base expansion connector 20 which allows the CD88 circuitry to be doubled thereby obtaining a total of eight MUCs (8 control registers and 8 data registers). The base expansion connector 20 may also be used to convey power connections 211, I²C 213, HUS 215 and CD88 circuitry 217 as shown in FIG. 23. Every MUCX added, will increase the ACM connectors by four. The reason one would use a MUCX compared to using an ISB is to offer a lower cost solution for less efficiency. Also the HUS's resources are shared between the adjacent base (reading left to right) and every subsequent MUCX that is appended. MUCX's only include a CPLD which incorporates the extended CD88 circuitry, thus making it less expensive but slower.

When a MUCX is used, the IMB slave CPU (or the ISB master CPU) must issue enough serial data bits to program sixteen registers instead of eight. For example, as shown in FIGS. 21 and 22, from the IMB slave CPU 54 located in the IMB 12, two supplementary 16 bit data streams are required to send signals to an additional available circuit 206 comprising an additional eight 8 bit shift registers 208 included in the MUCX. The additional shift registers comprise, in pairs, a fifth control register 210 and a fifth data register 212; a sixth control register 214 and a sixth data register 216; a seventh control register 218 and a seventh data register 220; and an eighth control register 222 and an eighth data register 224. Each of the aforesaid pairs of registers comprise the 13 bit bus, (CD88) which together with the hardware utility signals 228 (HUS) and the power supply connections 226, provide the outlets in the MUC via the ACM connector.

Figure 24:
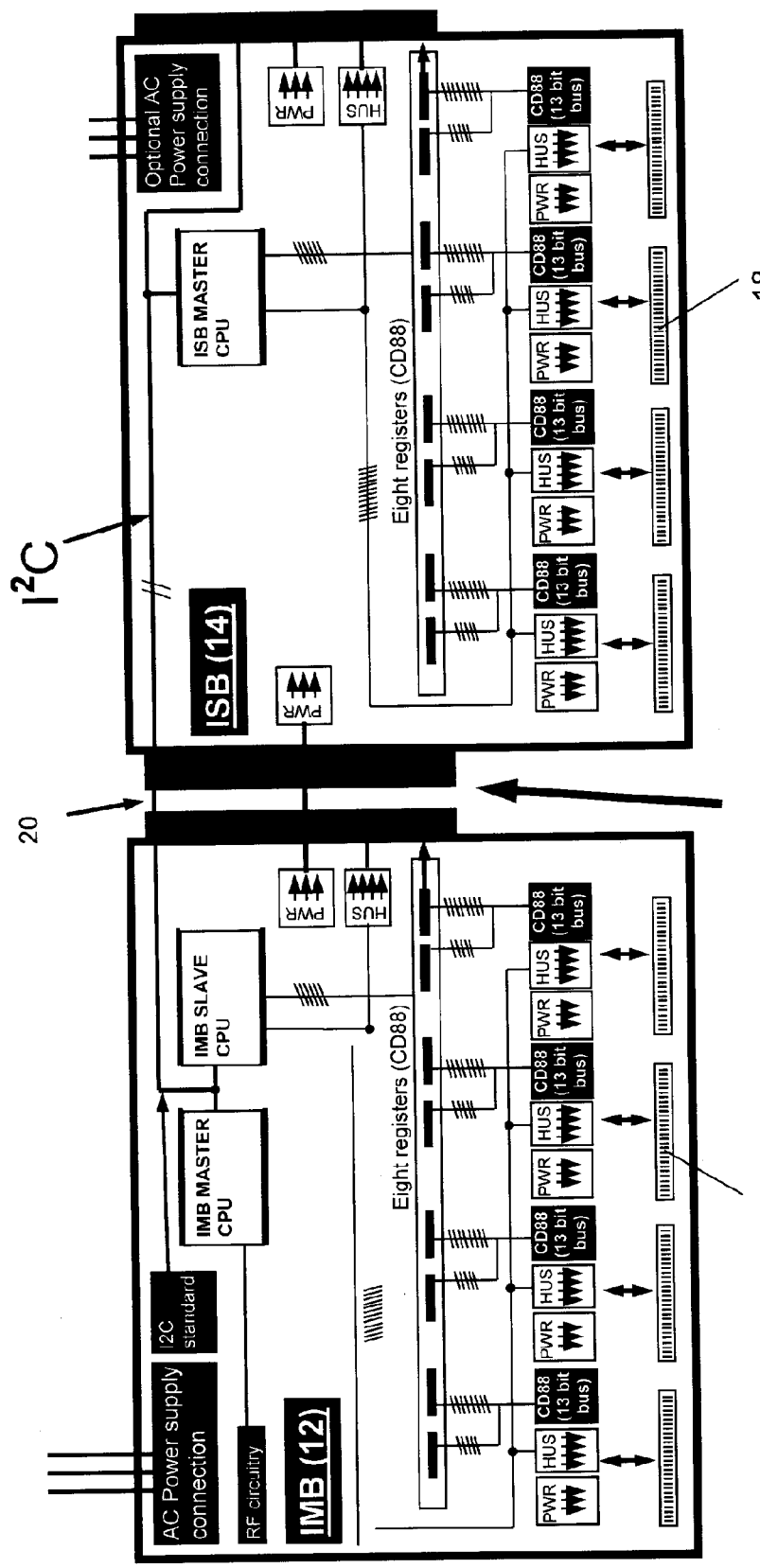
FIG. 24 is a diagram illustrating the internal details of an IMB to ISB installation.
Figure 24A:
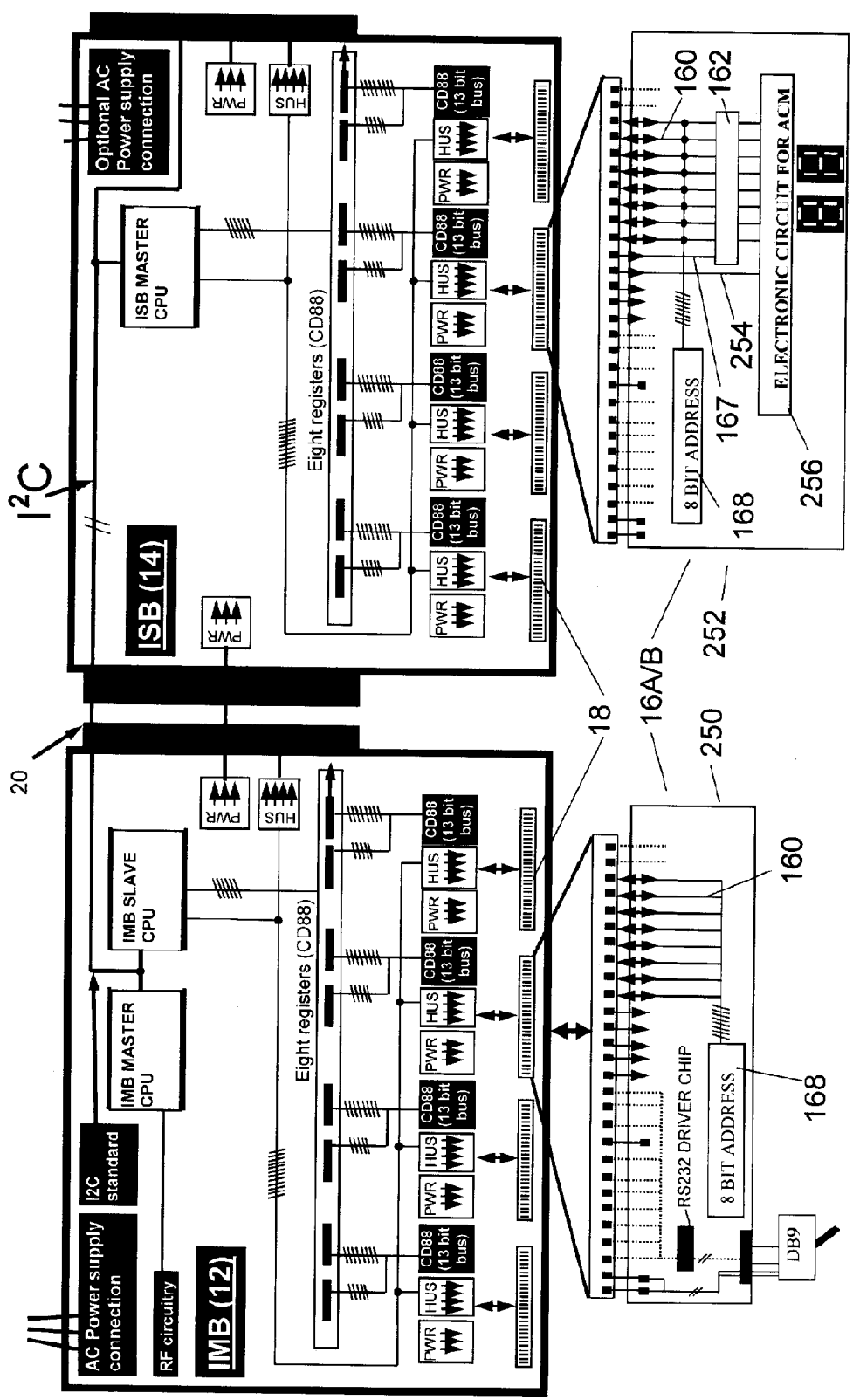
FIG. 24A is a diagram showing two ACMs connected to their respective ACM connectors and illustrating the difference between where one ACM requires hardware utility signals (HUS) and the other not requiring HUS.
Figure 25:
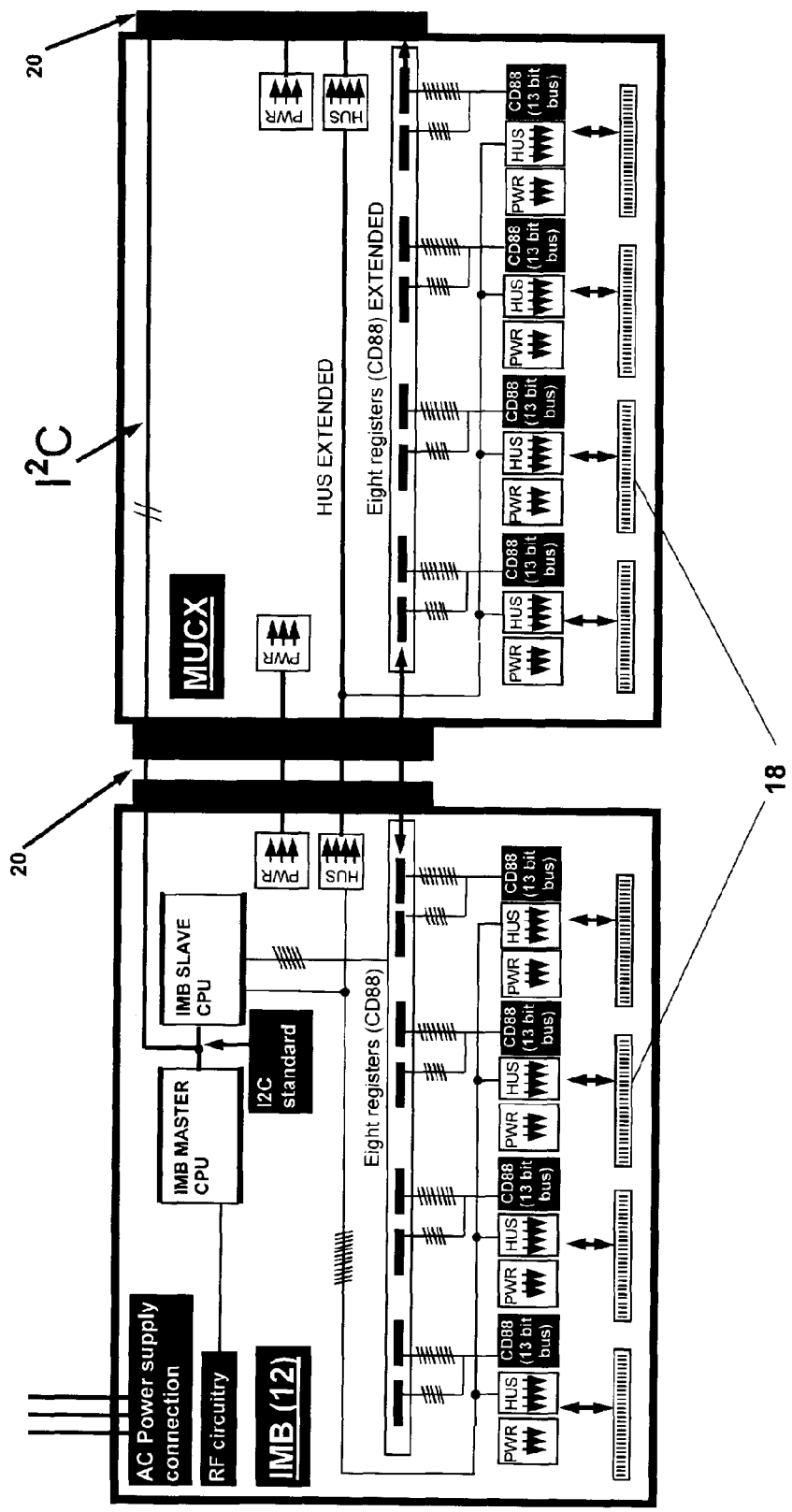
FIG. 25 is a diagram showing the internal details of an IMB to MUCX installation.
Figure 26:
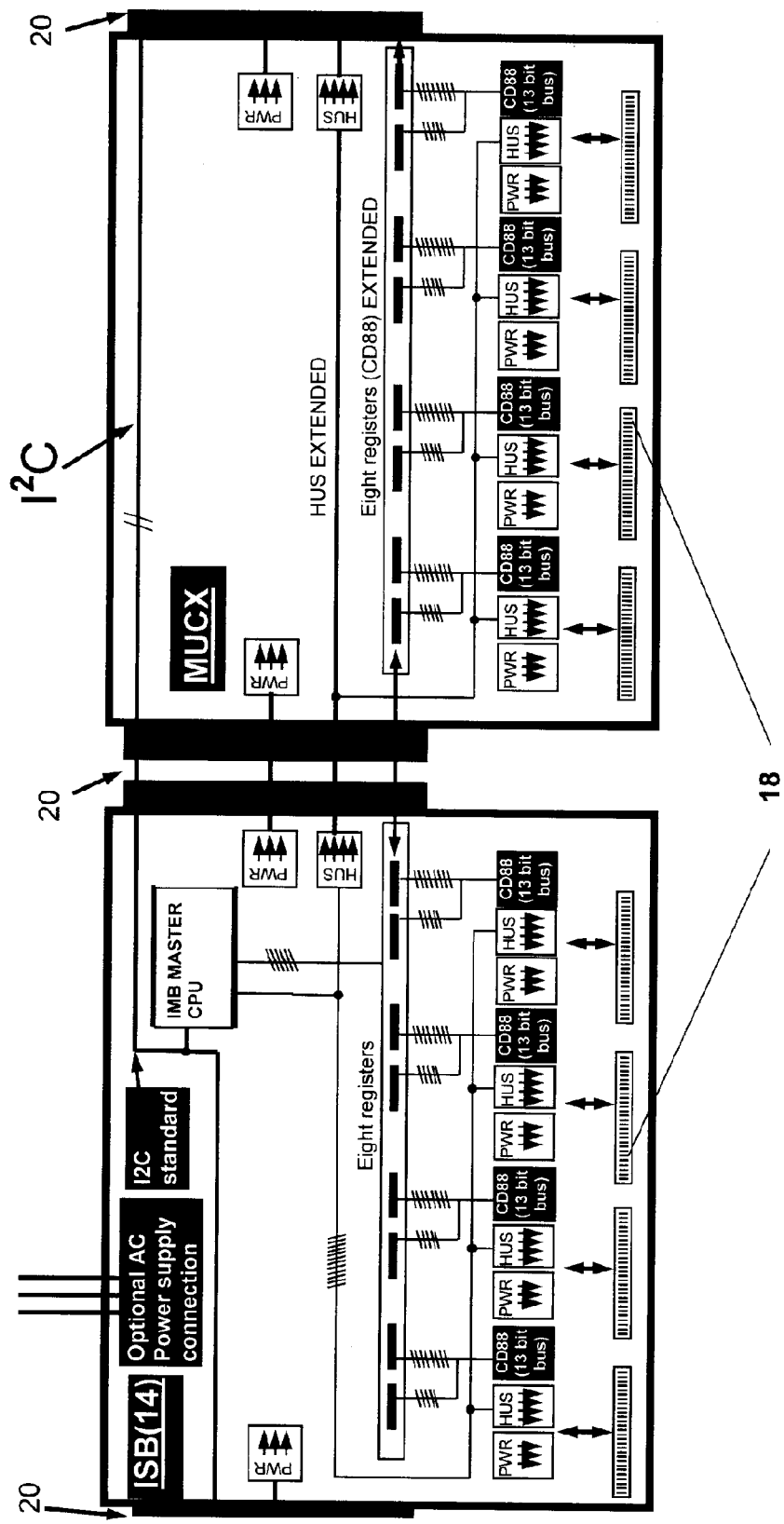
FIG. 26 is a diagram showing the internal details of an ISB to MUCX installation.
Figure 27:
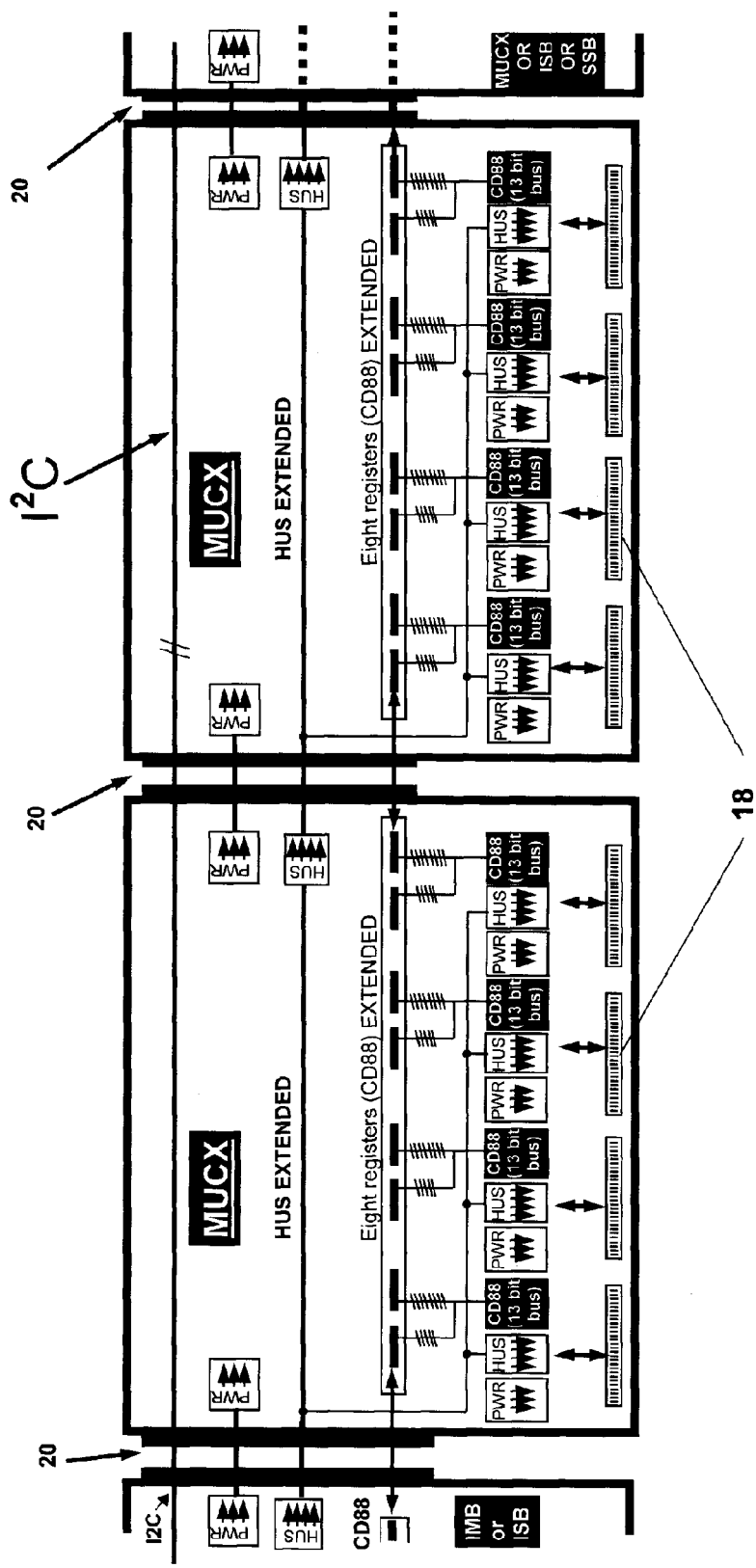
FIG. 27 is a diagram showing the internal details of a combinational IMB or ISB/MUCX/MUCX/ISB or MUCX installation.

Referring to FIGS. 24 and 24A, two ACMs are connected to their respective ACM connectors 18. The ACM 250 is an RS232 module which only requires the 8 bit address to be reflected on the data register's bus 160 so it can be identified. It also requires the RS232 peripheral (included in the IMB slave CPU's resources) portion of the HUS thereby communicating the RX/TX RS232 signals to the RS232 driver allowing the user to connect himself using a standard DB9 connector. Another ACM 252 may be an 8 bit digital signal to 2 seven segment displays which requires no HUS, but requires the data register's 8 bit bus to convey its address in one instance and in another instance convey data to be sent to the specific ACM's circuit which converts it to a 2 digit value on the two seven segment displays. The control register contributes to the ACM's circuit 254 as a control output which is used to control logic circuitry in the specific ACM's circuit 256.

Detailed Operation of CD88

A loading and unloading operation using a serial manipulation in the communications control bus 62, 71 will now be described in detail with reference to FIGS. 11 through 14. The control and data registers can operate in two modes, namely the shift left and shift right modes. For ease of description, only the shift right mode will be described. The eight 8-bit shift registers 76 are arranged in pairs in which the control register controls its adjacent data register. Once the control register is serially loaded, its 3 most significant bits will be outputted to the three wires 128, 130, and 132 which interconnect the control register via the three control pins per register, namely pins 134, 136, 138, 140, 142, and 144. This provides a three bit data command from the control register to its adjacent data register.

Before the data registers 86, 90, 94 and 98 can be loaded or unloaded with data, each control register 84, 88, 92 and 96 first transmits a 3 bit disable command signal to its adjacent data register via 122 to prepare it for incoming data. This instructs the data register to prepare itself to allow data to be serially loaded in or unloaded out. To achieve this, the three control pins interconnect each control register to its associated data register, as best illustrated in FIGS. 11, 13 and 14. Disabling the data register causes the data register's internal logic to enable its serial clocking mechanism. Thus, to load all four data registers, the control registers must instruct all the data registers to be disabled before the data registers can be loaded.

In sum, referring to FIG. 13, before the data registers 86, 90, 94 and 98 can be loaded with data, the control registers 84, 88, 92 and 96 are first serially loaded with their data bytes in which the three most significant bits of these bytes will be the command signal for the respective data register. The three most significant bits of the control register are a specific command that instructs the data register what action it should carry out. Following receipt of the disable command, the data registers 86, 90, 94 and 98 can then be loaded serially.

Figure 12:
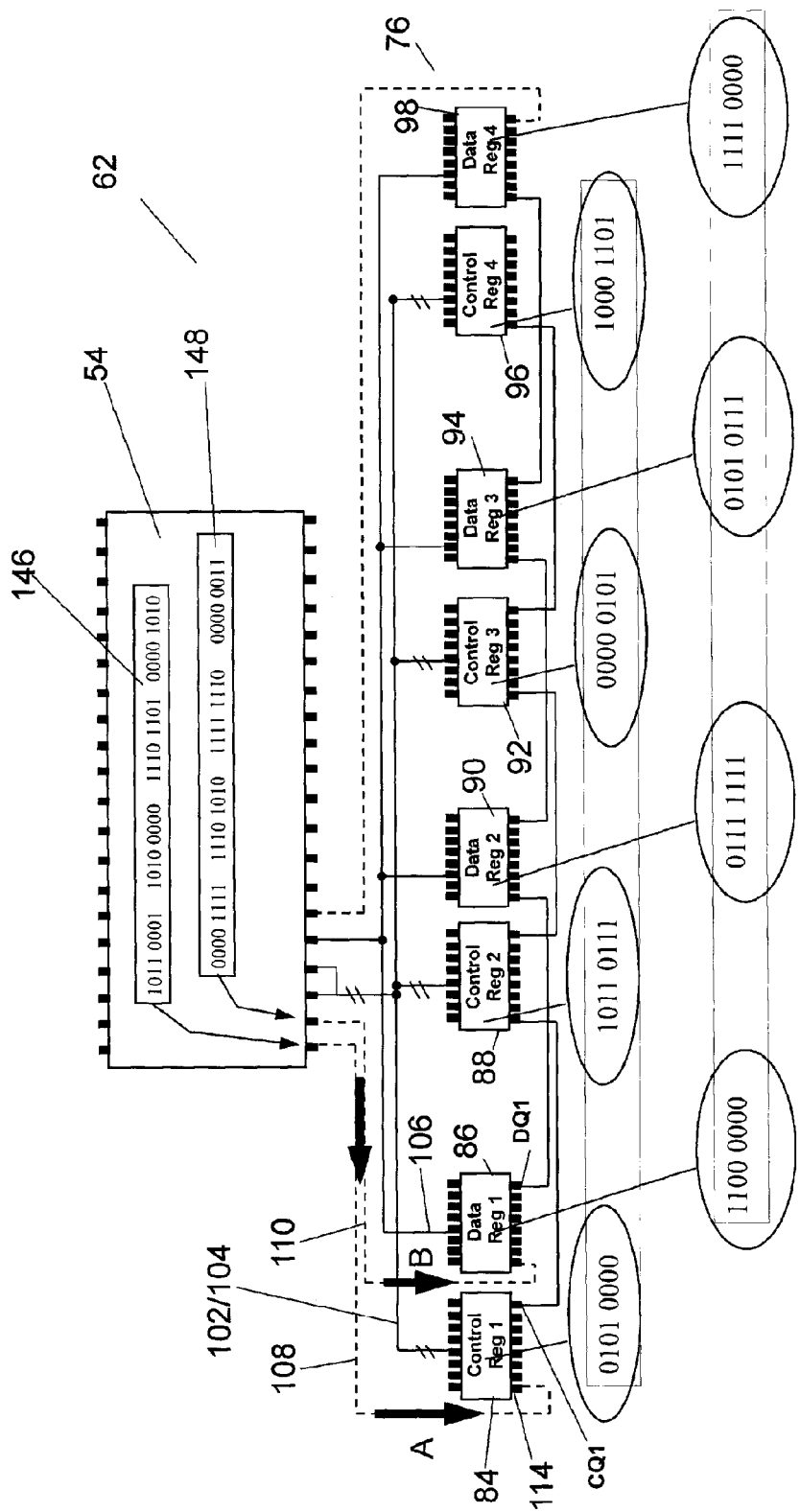
FIG. 12 illustrates serial bit manipulations in a first in first out (FIFO) operation using the circuit of FIG. 11.

Referring to FIGS. 11 and 12, (for clarity purposes, the 3 bit command signal has been omitted from FIG. 12) during loading of the control registers 84, 88, 92 and 96, a first 32 bit stream of data (1011 0001 1010 0000 1110 1101 0000 1010) 146 is serially transferred from the IMB slave CPU 54 to the control registers 84, 88, 92 and 96 via the SL1 wire 108 in the direction of arrow A. Every clock from the clock #1 wire 102 shifts a bit of data from the IMB slave CPU to the control register's SL1 input pin 114. Thus, using the first in first out (FIFO) order, (the right most byte being the first data byte at 146), the first 8 bit data byte will be received in the first control register as 0101 0000, the second 8 bit data byte will be received in the second control register as 1011 0111, the third 8 bit data byte will be received in the third control register as 0000 0101 and the fourth 8 bit data byte will be received in the fourth control register as 1000 1101.

The data registers are now ready to be loaded as follows. During loading of the data registers 86, 90, 94 and 98, a second 32 bit stream of data 148 (0000 1111 1110 1010 1111 1110 0000 0011) is serially transferred from the IMB slave CPU 54 to the data registers via the SL2 wire 110. Every clock from the clock #2 wire 106 shifts a bit of data from the IMB slave CPU to the data register's SL2 input pin in the direction shown by arrow B in FIG. 12. Thus, using the first in first out (FIFO) order, (the right most byte being the first data byte 148), the first 8 bit data byte will be received in the first data register as 1100 0000, the second 8 bit data byte will be received in the second data register as 0111 1111, the third 8 bit data byte will be received in the third data register as 0101 0111 and the fourth 8 bit data byte will be received in the fourth data register as 1111 0000.

The SL1 input pin 114 can serially receive 8 bits at one time without loosing the states of the bits. If, for example, a ninth bit is clocked into this serial input of the first control register 84, then the first bit is sent to the input of the next control register via CQ1 output of the first control register. Similarly, the SL2 signal 110 is connected to the SL2 input pin 116 of the first data register. This pin can also serially receive 8 bits at one time without loosing the states of the bits. If for example, a ninth bit is clocked in to this serial input of the first data register 86, then the first bit will be sent to the input of the next data register via the DQ1 output of first data register. Using the clock signal clock#1 102, 32 clocks will be required for the 32 data bits at 146 to serially travel via the SL1 wire 108 to the serial input of the first control register 84 and continue through the subsequent control registers 2, 3 and 4 thereby filling their contents with data from 146. Similarly, using the clock signal clock#2 106 will also require 32 clocks for the 32 data bits at 148 to serially travel via the SL2 wire 110 to the serial input of the first data register 86 and continue through the subsequent data registers 2, 3 and 4 thereby filling their contents with data from 148.

Thus in sum, loading the control registers requires that the SL1 wire issues a first stream of 32 serial bits 146 in a single operation. The control registers where the serial output pin 78 (CQ1) of the first control register 84 is daisy chained to the input pin of the second control register 88. Furthermore, the serial output pin of the second control register 88 is daisy chained to the input pin of the third control register 92. Finally, the serial output pin of the third control register 92 is daisy chained to the input pin of the fourth control register 96.

Also, loading the four data registers 86, 90, 94 and 98, the SL2 wire must also issue a second stream of 32 serial bits 148 in a single operation and the aforesaid process is repeated for the data registers.

To unload the data registers 86, 90, 94 and 98, another 3 bit disable command code signal is transmitted by the control registers to the data registers. Thereafter, the DQA wire #6 112, which is connected to the output of the fourth data register 98 feeds a stream of 32 bits back into the IMB slave CPU 54, thereby allowing the IMB CPU 54 to systematically store this data in a table defined by its internal logic. However, only the data registers can unload their bytes to the IMB slave CPU 54. Conversely, the control registers cannot unload their bytes to the IMB slave CPU since there is no feedback wire.

Loading and Writing to Buses

As described above, the CD88 communication standard requires that the control registers 84, 88, 92 and 96 are first loaded before the data registers are loaded because once the control registers are loaded, the 3 most significant bits of their contents act as the commands destined for the adjacent data registers.

Figure 15:
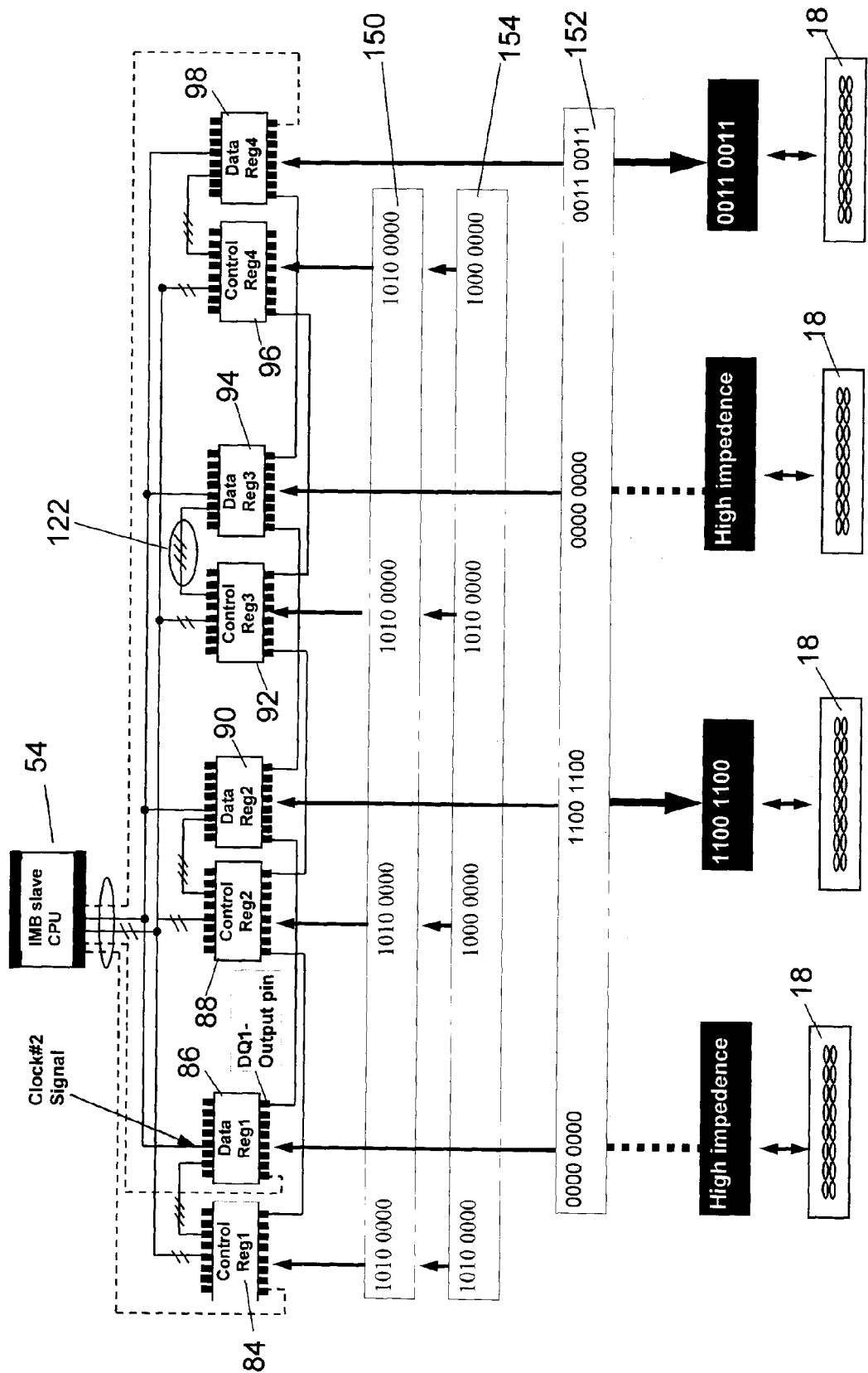
FIG. 15 illustrates a loading and writing to bus operation.

Referring now to FIGS. 13, 14, and 15, the following is a list of the four possible control register commands from the three most significant bits 126 to the data register 94 via the three wires 128, 130 and 132, which instructs what action each data register will take:

| CONTROL REG COMMANDS (3 MSB) | DATA REGISTER MODE |
|---|---|
| 1) 1000 0000 | Write |
| 2) 0000 0000 | Clear |
| 3) 1100 0000 | Read |
| 4) 1010 0000 | Disable |

The "write" mode causes the data register to parallel output its 8 bit byte. The "clear" mode causes the data register to clear its parallel 8 bit byte (sets all bits to "0"). The "read" mode, instructs the data register to do a parallel read of the 8 bit byte. The "disable" mode sets the data register to high impedance, as illustrated in FIG. 15.

Referring to FIG. 14, alternatively it is possible to disable the data registers and unload their contents to the IMB slave CPU 54. In this operation, it is assumed that the internal contents of all the data registers are FFH (1111 1111). Firstly, the control registers are loaded with their data bytes 85 whereby the three most significant bits of each control register will be a first disable command for its adjacent data register (1010 0000). Secondly, the data registers are then serially unloaded through the DQA wire #6 112 causing the 32 bit stream of "1"s 87 to be received by the IMB slave CPU 54.

In sum, once the data registers are loaded, from the IMB slave CPU they can be instructed to output their contents to the outside world via the ACM connectors 18. The opposite is also possible where, once the data registers are loaded with data originating from the outside world via the ACM connectors 18, they can be instructed to serially transfer their contents to the IMB slave CPU via the DQA feedback wire.

Referring to FIG. 15, an example of the operations described above involves loading all the data registers with different values from the IMB slave CPU and then outputting the values stored in the second and fourth data registers 90 and 98 to their respective 8 bit bus while setting the first and third data registers to high impedance. The second data register 90 will output the value of HEX CC (1100 1100) and the fourth data register 98 will output the value of HEX 33 (0011 0011). The first and third data registers 86 and 94 will be set to all "0"s. So to begin, in this example the control registers 84, 88, 92 and 96 are first loaded with their data bytes whereby the three most significant bits of these bytes will be the command for the adjacent data register. All the control registers are first loaded with a 32 bit stream containing the disable command for all the data registers. Thus, in this case a first 32 bit 150 serial operation is:

| 1010 0000 | 1010 0000 | 1010 0000 | 1010 0000 |
|---|---|---|---|
| disable | disable | disable | disable |

As described above, when the disable command above is sensed by the data register, the data register's internal logic enables its serial clocking mechanism.

Following the disabling of the data registers, a second 32 bit 152 serial loading operation of all the data registers is done with the corresponding output values. Thus the second 32 bit 152 serial operation is:

| 0000 0000 | 1100 1100 | 0000 0000 | 00110011 |
|---|---|---|---|
| Data (0) | Data (HEX CC) | Data (0) | Data (HEX 33) |

To output the values from the second and fourth data registers 90 and 98 to their respective 8 bit bus, another 32 bit stream 154 is issued which will make the first and third control registers 84 and 92 contain a disable command, while on the other hand making the second and fourth control registers 88 and 96 contain the write command. Thus the third 32 bit 154 serial operation is:

| 1010 0000 | 1000 0000 | 1010 0000 | 1000 0000 |
|---|---|---|---|
| disable | Write | disable | Write |

Immediately after the control registers are filled with the third 32 bit 154 stream, the two "disable" and the two "write" commands will be issued to their respective data registers which in turn will disable the first and third data registers 86 and 94 and output the HEX values of CC and 33 HEX on the data register buses connected to the second and fourth data registers 90 and 98. Each pair of control and data registers correspond to their respective ACMs 16A or 16B thus affirming that one control register and one data register per ACM 16A or 16B is required. In this example we did not take advantage of the 5 least significant bits of the control registers.

In another example of an operation, the data registers 86, 90, 94 and 98 are set to read in the contents of their respective external buses into the data registers and then unload the data registers to the IMB CPU 54. Firstly, all the control registers 84, 88, 92 and 96 are loaded with a 32 bit stream to set the all the data registers in read mode. In this case the data registers need not be disabled since they don't require their serial mechanism to be enabled). Thus the first 32 bit serial operation is:

| 1100 0000 | 1100 0000 | 1100 0000 | 1100 0000 |
|---|---|---|---|
| read | read | read | read |

Thereafter, all the control registers are again loaded with another 32 bit stream to disable all the data registers since the enabling of the data register's serial mechanism is required next. Thus the second 32 bit serial operation is:

| 1010 0000 | 1010 0000 | 1010 0000 | 1010 0000 |
|---|---|---|---|
| disable | disable | disable | disable |

Then a 32 bit unload command is issued to all the data registers to load the contents loaded form their respective 8 bit buses. Thus the 32 bit serial operation is:

| 1010 1010 | 1010 1111 | 1111 0000 | 1111 1111 |
|---|---|---|---|
| data | data | data | data |

Immediately after the data registers are unloaded to the IMB CPU 54, the IMB CPU 54 will systematically store the bytes in configuration tables that are created to service logic corresponding to the data read from the ACMs.

Referring now to FIGS. 21 and 22, the loading and unloading operation of the registers in the alternative embodiment of the apparatus 206 is essentially identical to that described above, the only difference being that eight additional registers and 64 bit data streams are used due to the addition of a MUCX.

Figure 32:
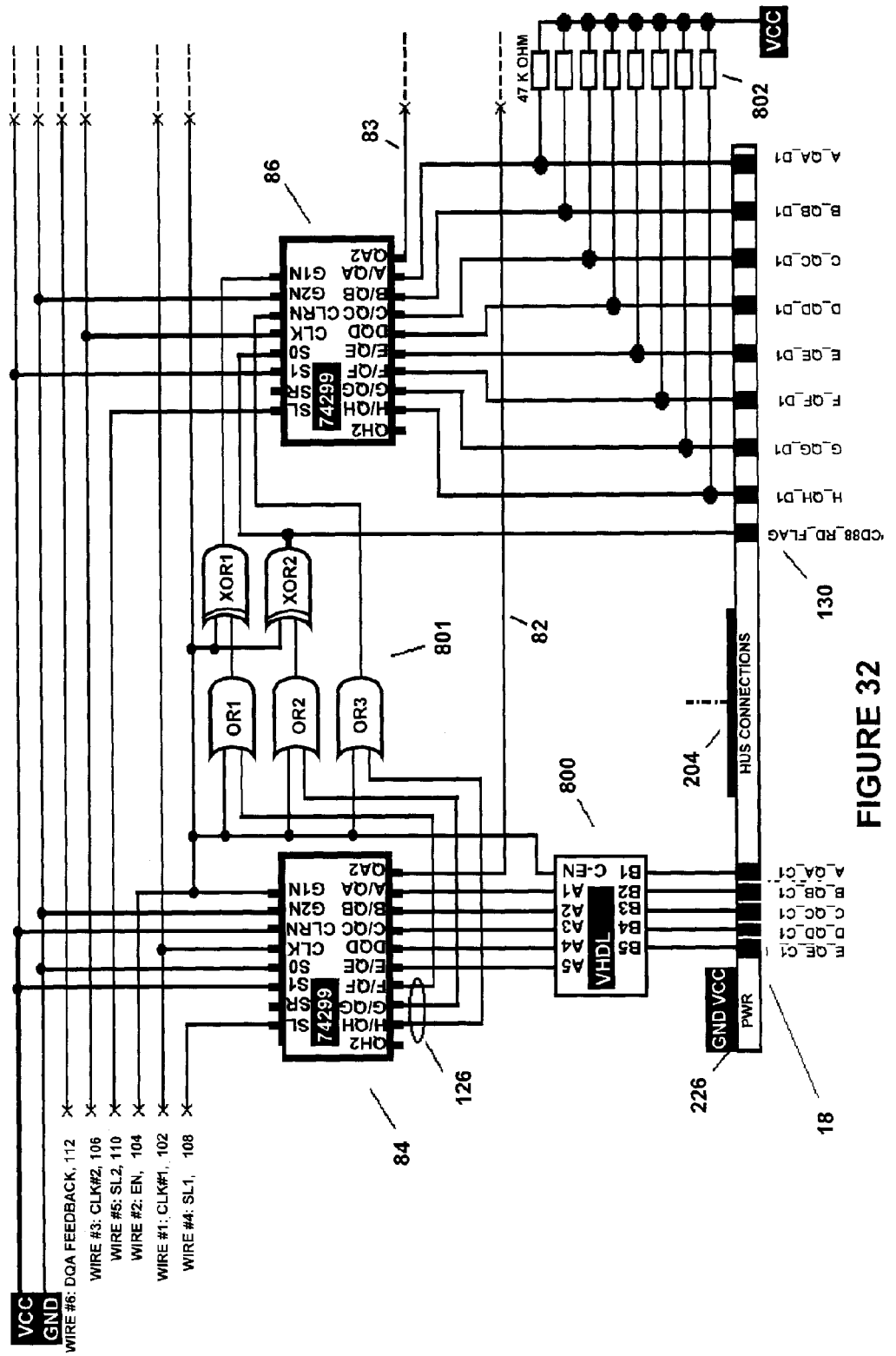
FIG. 32 is a circuit diagram showing a circuit embedded in a MAX II CPLD and repeated 4 times so to achieve the complete CD88 circuit

Referring to FIG. 32, the wires #1,2,3,4,5,6 and items 84, 86, 800 and 801 in the circuit are embedded in a MAX II CPLD and repeated 4 times so to achieve the complete CD88 communication standard circuit. This allows the CD88 communications standard to fit in minimal space. External components 18 and 802 are not embeded in the CPLD: The A_QA_D1, B_QB_D1, C_QC_D1, D_QD_D1, E_QE_D1, F_QF_D1, G_QG_D1 and H_QH_D1 bidirectional pins is the typical data register's bus for every CD88 register pairs. However, before these outputs connect to the ACM connector 18, they also each connect to a 47 Komh pull up resistor. This allows the IMB Slave CPU to read in all high's (FFh) value when no ACM is plugged in. The five outputs (A/QA, B/QB, C/QC, D/QD and E_QE) of the control registers have three possible states which are HIGH (1), LOW (0) or high impedance (HZ). In the event where the control register is disabled by setting the Wire #2, 104, to a HIGH value, the 74299 sets its outputs to a high impedance state, which may cause logic circuits connected to the A/QA, B/QB, C/QC, D/QD and E_QE to act in an unpredictable manner. Therefore, to avoid this, a VHDL logic block is inserted between the five outputs (A/QA, B/QB, C/QC, D/QD and E_QE) of the control register 84 and the terminals on the ACM connector A_QA_C1, B_QB_C1, C_QC_C1, D_QD_C1, E_QE_C1. The VHDL block carries forwards the logic in the following truth table:

Illustrated below is a truth table for one output pin from a control register :

| WIRE #2 104 | A QA | A QA C1 |
|---|---|---|
| 1 | HZ | 1 |
| 0 | 1 | 1 |
| 0 | 0 | 0 |

This is identical for B_QB to E_QE outputs of all the control registers.

Furthermore, when the control register is disabled as discussed above (Wire #2, 104 is HIGH), the 74299 also sets the F/QF, G/QG and H/QH to a high impedance state. Therefore in this situation the data register's inputs 86 (CLRN, S0 and G1N) would see high impedance (HZ). This problem was overcome by building a logic circuit comprising three OR gates and two exclusive OR gates 801 to obtain the correct 3 bit reflection 126 from the control register 84 to the data register 86.

Therefore when the control register is disabled, the data register reads a 3 bit write command thus a high for its reset (CLRN) input 128, a low for its read (SO) input 130 and a low for its DISABLE (G1N) input 132. Hence in this case, the data register would be set to its default state of write mode which is what the CD88 requires while the control register is being disabled.

A logic gate particularity must be pointed out where when an OR gate or's a HZ state and a HIGH value, the result will always be HIGH. Therefore, when the control register 84 is disabled via Wire #2, 104, the 74299 immediately sets all its outputs A/QA to E/QE and the F/QF, G/QG and H/QH outputs to a high impedance state HZ. At this point, OR1 sees HZ at F/QF and when read with a TRUE value from wire #2, 104, the result will validate to a TRUE at the output of OR1 which is further exclusive ored (XOR1) with wire #2, 104 resulting in a FALSE value at the output of XOR1 which is applied to the G1N input of the data register 86. The same logic applies to OR2 which results to a FALSE value at the output of XOR2 which will be applied at the SO input of the data register 86. Also, OR3 sees HZ from H/QH and when ored with a TRUE from wire #2, 104, the result will validate to a TRUE at the output of OR3 resulting in a TRUE value being applied at the CLRN input of the data register 86.

Also, the logic gates at 801 of FIG. 32 can maintain the clear, read and disable 3 bit data register mode commands while the control register is enabled. The required command bits are illustrated below during enabled and disabled instances of the control register.

| CONTROL REGISTER | CLRN | SO | G1N | (3 MSB) DATA register mode |
|---|---|---|---|---|
| DISABLED (Wire#2 = high) | 1 | 0 | 0 | Write "default reset state" |
| ENABLED (Wire#2 = low) | 1 | 0 | 0 | Write |
| ENABLED (Wire#2 = low) | 0 | 0 | 0 | Clear |
| ENABLED (Wire#2 = low) | 1 | 1 | 0 | Read |
| ENABLED (Wire#2 = low) | 1 | 0 | 1 | Disable |

Note that the SO (Read bit) input of the data register is also reflected to pin 28 of the ACM connector called "CD88_Read_Flag" which is used to signal any ACMs that the register pair is in read mode.

Serial Pillar to Nodes Transmission (SPNT)

Figure 28:
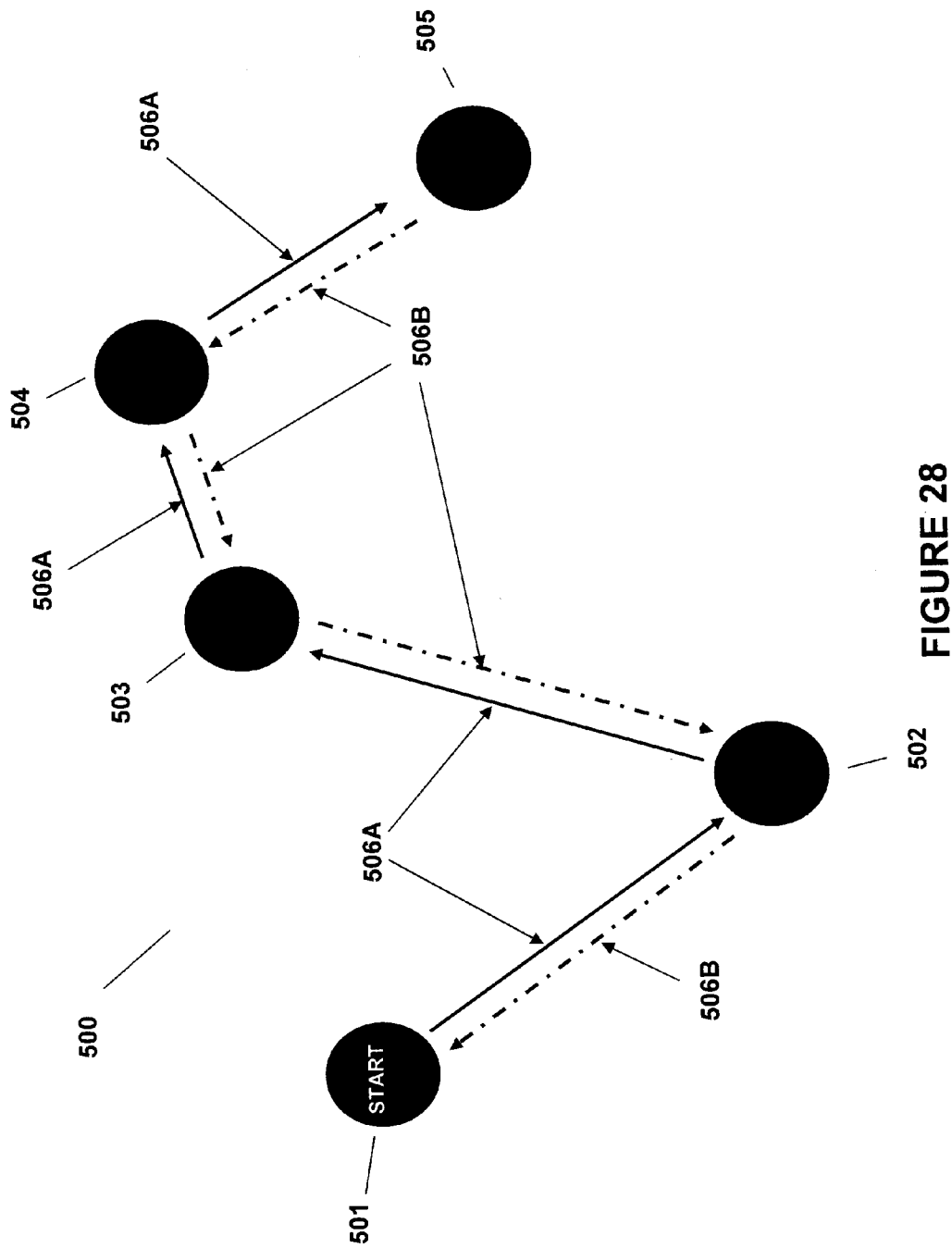
FIG. 28 is a schematic representation of a serial pillar to nodes transmission (SPNT)
Figure 29:
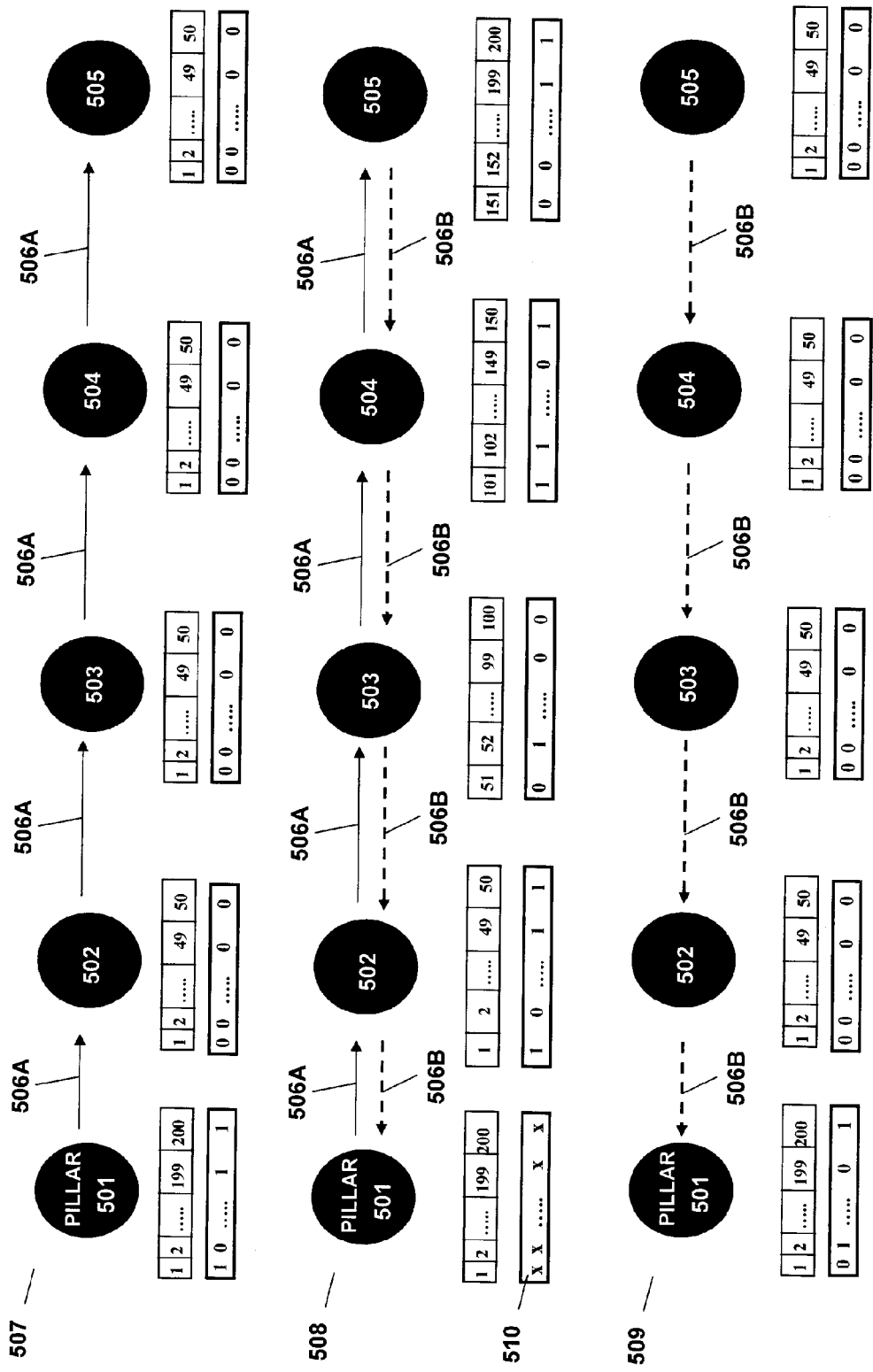
FIG. 29 is a schematic representation of the SPNT in initial and operational states.

Referring to FIGS. 28 and 29, a serial pillar to nodes transmission (SPNT) is a nodal network protocol for transmitting and receiving data in a uniline format between two or more nodes via RF communications as shown at 500 of FIG. 28. Each node is an IMB which comprises an RF transceiver chip such as the EMBER EM260 connected to the IMB Master CPU as illustrated in FIG. 10. The EM260 from Ember is a ZigBee Network Co-Processor that combines a 2.4 GHz IEEE 802.15.4 compliant radio transceiver with a flash-based microprocessor running the EmberZNet ZigBee stack. With a fast SPI-based interface to an application microprocessor, the EM260 allows easy addition of ZigBee networking to the apparatus 10.

SPNT is made up of two or more nodes where one of the nodes must be configured as a Pillar transmission module (PTM) 501. This is the module that will be responsible for initially detecting all other existing nodes involved in its communication environment which is a nodal network environment (NNE). The detection procedure is denoted as the nodal network registration procedure (NNRP). After finishing the NNRP, the PTM is responsible for commencing the transmission of one long serial stream of bits which contains information for all the nodes. FIG. 29 shows the SPNT network in its initial state 507. For example, each node may require 50 bits of information and if 4 nodes have been detected during by the NNRP, the pillar node 501 will transmit a serial stream of 200 bits long in one operation via an RF transmission in the direction shown by the arrows 506A.

Therefore, at 508, upon completion of the $1^{st}$ SPNT operation, node 505 will contain bits ranging from bit #151 to 200, node 504 will contain bits ranging from #101 to 150, node 503 will contain bits ranging from bit #51 to 100 and node 502 will contain bits ranging from bit #1 to 50. In summary, the $1^{st}$ 50 bits of serial data transmitted by the PTM must pass sequentially from node to node until the 50 bits reach their destination at node 505. Similarly the $2^{nd}$ set of serial 50 bits must pass sequentially from node to node until the 50 bits reach their destination at node 504. This process continues until all the nodes recieved their respective 50 bits. Once the 200 bit stream has been completely broadcasted by the PMT 501, the PMT's transmission buffer 510 will be empty and contain non relevant data depicted as "x".

Upon the completion of the $1^{st}$ SPNT operation described above, all the nodes will read and modify their respective 50 bits of data according to their specific requirements and prepare to dispatch an updated set of 50 bits for the $2^{nd}$ SPNT transmission. At this time, every node is instructed to update special "return ready flags" which will be used to confirm the validation of the 50 bits.

The $2^{nd}$ SPNT transmission actually loads the 200 bit stream which is comprised of nodes 502, 503, 504 and 505 back into the PTM 501 via an RF transmission in the direction of depicted by 506B in the same serial sequence described above. After the $2^{nd}$ SPNT transmission is completed the state of the node's data can be viewed at 509 of FIG. 29. At this point, software analyses of the bits loaded in the PTM 501 are carried out by the PTM where the data bits are interpreted and manipulated by respective logic routines. Thereafter, the regeneration of a new 200 bit stream is executed and the aforesaid process repeats itself for further communications with its nodal network environment once again.

Also, at any time, after an SPNT transmission in the direction of 505A is carried out, any node can enter a continuous private broadcasting operation with one, several or all other nodes within the nodal network environment.

In the case where a sixth node is introduced in the nodal network environment, the serial stream will be adjusted to 250 bits. An unlimited amount of nodes can be appended or removed from the network nodal environment.

In the event that a node becomes disfunctional due to software problems or physical damage, the previous node will automatically establish RF communications with next node bypassing the faulty node thereby continuing the serial stream operations.

In the event where the PTM node becomes disfunctional due to software problems or physical damage, the next node in line will be ordered to take over the PTM's sequence of operations and will become the new PTM for the nodal network environment.

SPNT bit definitions may be but not limited to:

| BITS | DESCRIPTION | BIT SIGNIFICANCE |
|---|---|---|
| 1 to 10: | Node ID | |
| 11 to 12: | Status register | BIT#7: Return Ready flag |
| | | BIT#6: Node private communication flag |
| | | BIT#5: Valid data flag (Whether PTM should use data or not) |
| | | BIT#4: Repeat flag (Error orccured, please repeat!) |
| | | BIT#3: CD88 busy status flag |
| | | BIT#2: MUC/MUCX flag |
| | | BIT#1: Node fail flag |
| | | BIT#0: PTM fail flag |
| 13 to 17: | Error number | |
| 18 to 20: | Smart plate type on this node | |
| 21 to 44: | Data and command buffer | |
| 45 to 50: | Series of pertinent information and command flags to all nodes such as node environment variables and product version | |

The length of the serial stream for the SPNT network is at least 50 bits long.

Using readily commercially available protocol stacks (such as Zigbee) embedded in RF chip solutions such as the one found in the EM250 or EM260 RF chips eliminates much of the tedious communication identity mechanisms between nodes.

System Flow Chart

Figure 30:
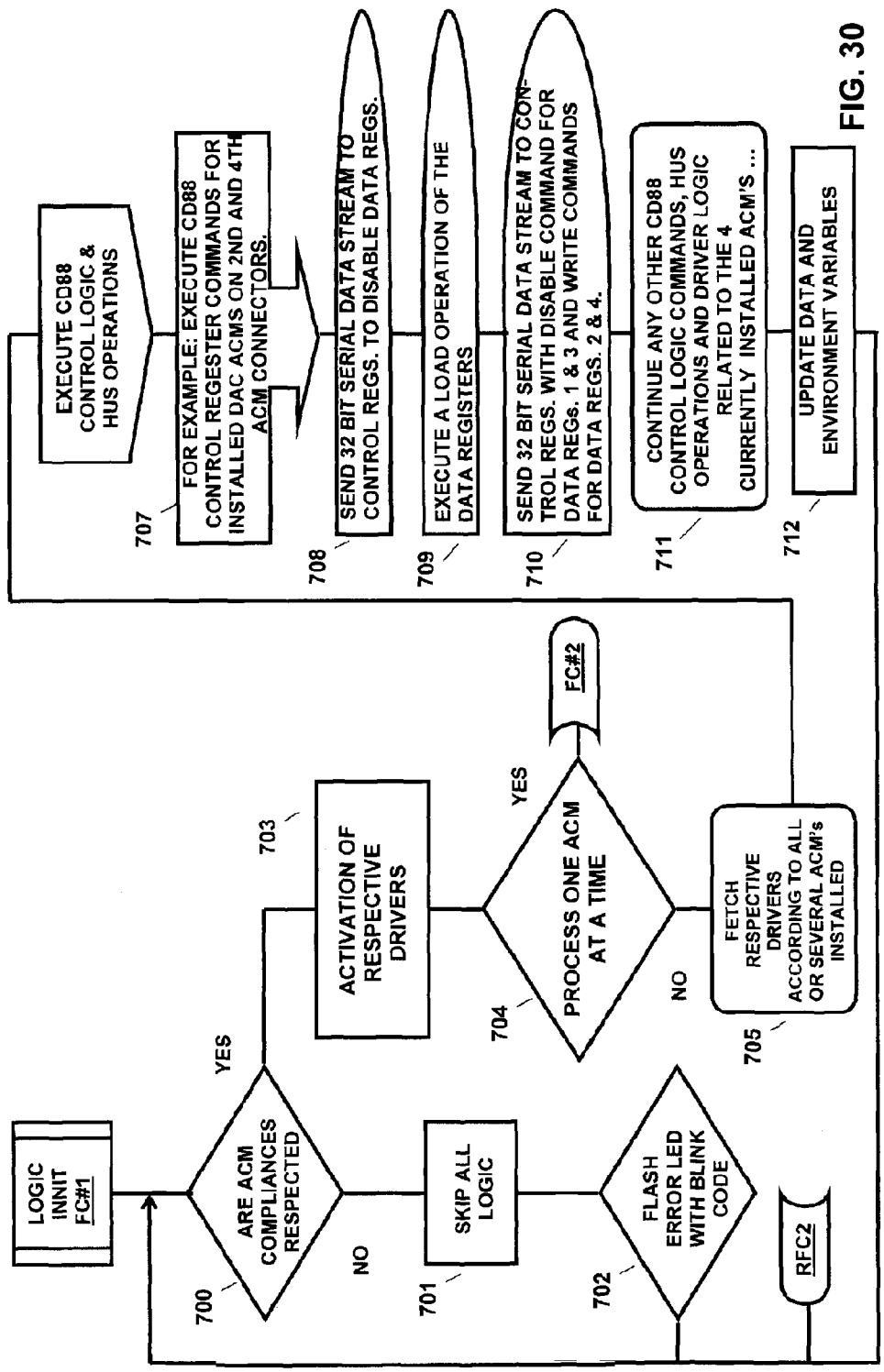
FIG. 30 is a flow diagram showing system logic for processing many ACMs simultaneously and loading of registers.
Figure 31:
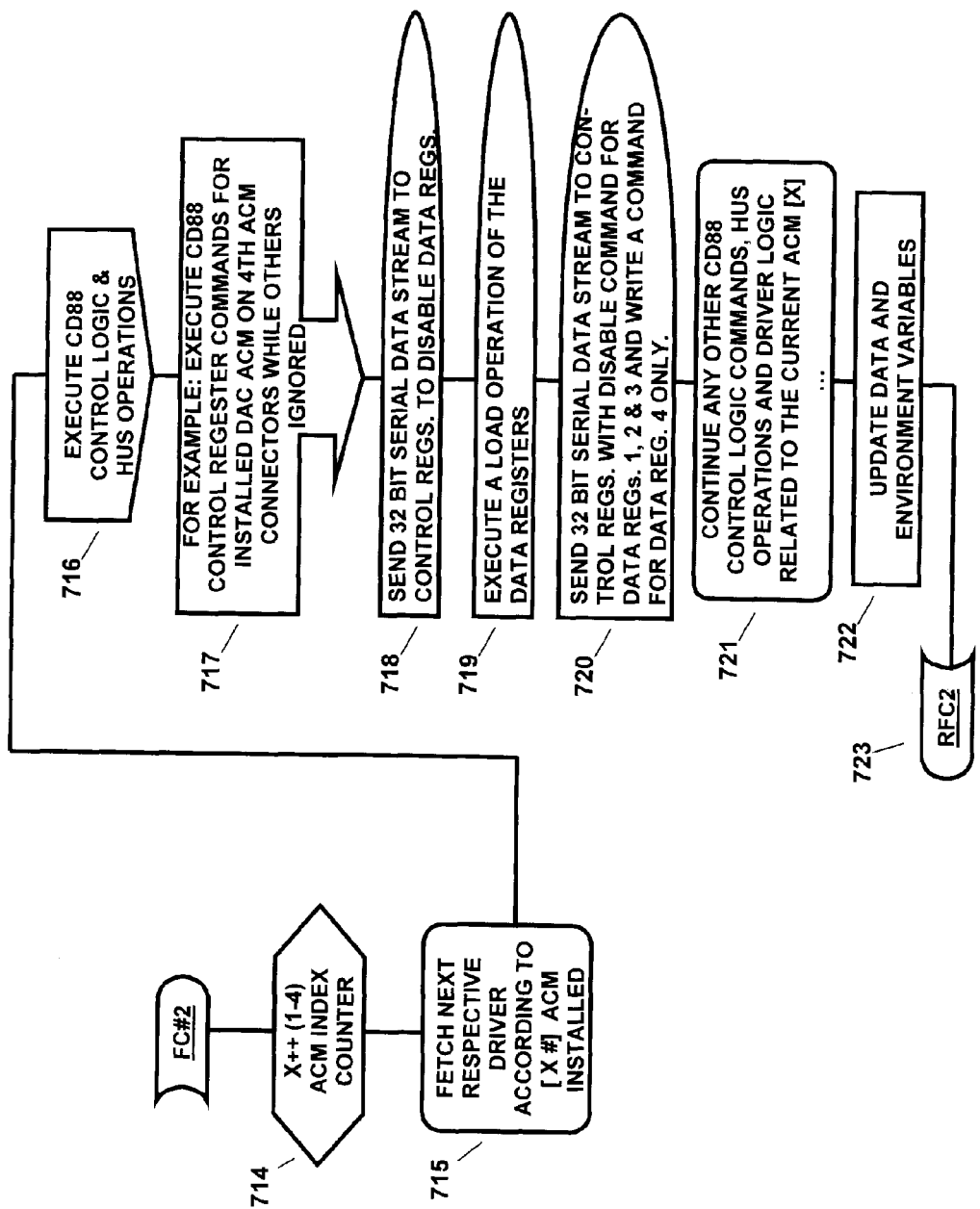
FIG. 31 is a flow diagram showing system logic for processing one ACM at a time and loading of registers.

Referring now to FIGS. 30 and 31, when ACMs are plugged into an ACM connector, the apparatus 10 analyses the ACM so as to limit the amount of ACM types allowed per apparatus 10. For example, only one heat sensor ACM (an ACM used to measure temperature) may be plugged per apparatus 10. If the user mistakenly plugs two heat sensor ACMs at the same time, the internal apparatus logic will warn the user. Therefore, logic initialization involves a logic routine, as illustrated in FIG. 31, which performs a series of ACM compliance tests 700. If there are discrepancies during the compliance tests, all logic is skipped 701 and a visible LED blink code is issued 702 which is indicative of the non compliant issue.

In the event where no compliance failures are detected, a series of driver activations are executed 703 based on the ISB's, MUCX's installed. A "Process one ACM at a time" flag 704 is tested. If this flag is FALSE, then the "NO" route is executed and several ACM software drivers are fetched 705 and will be used to interface the ACMs in one operation at steps 705, 707, 708, 709, 710, 711, 712. Thus each 32 bit serial data stream sent for control registers and each 32 bit serial data stream sent for data registers at 708, 709 710 and 711 will fulfill command and data operations for all 4 ACM ports simultaneously.

If the "Process one ACM at a time" flag 704 is TRUE, then the alternate "YES" route is executed and one ACM driver is fetched and updated. In FIG. 31, while in the first iteration 714, [x] counter will be 1 and therefore only the first set of 8 bits of each 32 bit serial stream for the control and the data registers at 718, 719, 720 and 721 will contain valid control and data information which will correspond to the ACM plugged at ACM connector #1 (or Port 1). Therefore, if [x] counter equals 2, then only the second set of 8 bits of each 32 bit serial stream for the control and the data registers at 718, 719 and 720 and 721 will contain valid control and data information which will correspond to the ACM plugged at ACM connector #2 (or Port 2). At step 715 the correct software driver will be fetched which will used to interface the respective ACM connected to the ACM connector [x]. Therefore, steps 716 to 723 will execute the CD88 communications standard and HUS operations according to the ACM connected at ACM connector [x]. Another way to view this is when the "Process one ACM at a time" flag is TRUE, it will require four operations of 700, 703, 704, 714, 715, 716, 717, 718, 719, 720, 721,722, 723, to process all 4 ACMs per IMB since only one ACM is being processed at a time.

In summary, while "Process one ACM at a time" flag 704 is TRUE, an unlimited series of load, unload, read or write commands are executed in a unique order based on the requirement of all the ACMs being serviced. In addition to these commands, the 5 outputs of each control register may send logic signals in parallel to the load, unload, read or write commands in order to satisfy certain hardware logic sequences required by the ACMs. The same is true for the steps 718, 719, 720 and 721 while "Process one ACM at a time" flag 704 is FALSE, except that in this mode one ACM at a time is being serviced.

Other Embodiments

It will be apparent to persons skilled in the art that a number of variations and modifications can be made without departing from the scope of the invention as defined in the claims.

I claim:

1. A communications control bus, the bus comprising:
 a) an Intelligent Master Base (IMB) slave CPU;
 b) at least two registers;
 c) a first three bit data connector for connecting the at least two registers, the connector permitting transmission of a three bit data signal between the at least two registers; and
 d) a network interconnecting the at least two registers and the IMB slave CPU.

2. The bus, according to claim 1, in which the at least two registers comprise:
 a) a first control register; and
 b) a first data register;
 e) the network interconnecting the first control register and the first data register, the network being configured such that in response to a first at least 8 bit data signal being received at the first control register, a first 3 bit disable command signal is transmitted by the first control register to the first data register.

3. The bus, according to claim 1, in which the at least two registers are connected by a 3 bit command signal.

4. The bus, according to claim 1, in which the at least two registers and the first three bit data connector comprise a 13 bit bus.

5. A modular apparatus for controlling multiple electronic hardware devices, the apparatus comprising: a) at least one intelligent master base for use with an electrical circuit; b) a first communications control bus, according to claim 1, located in the intelligent master base; and c) at least one adaptable cube module connected to the intelligent master base, the communications control bus being adapted to allow the number of adaptable cube modules to be increased in multiples of four.

6. A circuit for remotely controlling multiple hardware devices, the circuit comprising a communications control bus, according to claim 1.

7. The bus, according to claim 2, the at least two registers further comprise:
 a) a second control register;
 b) a second data register;
 c) a third control register;

d) a third data register;
e) a fourth control register; and
f) a fourth data register;
g) the network being configured such in response to second, third, and fourth at least 8 bit data signals being received respectively at the second, third and fourth control registers, a second, third and fourth 3 bit disable command signal is transmitted to the respective second, third and fourth data registers.

8. The bus, according to claim 2 or 7, in which the first control register is paired with the first data register; the second control register is paired with the second data register; the third control register is paired with the third data register; and the fourth control register is paired with the fourth data register.

9. The bus, according to claim 4, in which the 13 bit bus includes an eight bit bi-directional data register and five most significant output bits of an adjacent control register.

10. The bus, according to claim 9, in which the first three bit data connector issues a command to the adjacent control register.

11. The apparatus, according to claim 5, in which an intelligent slave base is connected to the intelligent master base.

12. The apparatus, according to claim 5, in which the intelligent master base and the adaptable cube module are sized and shaped for location in an electrical box.

13. The apparatus, according to claim 5, in which a smart plate is connected to the adaptable cube module.

14. The apparatus, according to claim 5, in which a smart plate is connected to the intelligent master base.

15. The apparatus, according to claim 5, in which a slim slave base module is connected to the intelligent master base.

16. The apparatus, according to claim 5, in which a slim slave base module is connected to the intelligent slave base.

17. The apparatus, according to claim 5, in which the intelligent master base comprises:
   a) an IMB master CPU;
   b) an IMB slave CPU electrically connected to the IMB master CPU via an I²C standard;
   c) at least two adaptable cube module connectors for receiving the adaptable cube modules;
   d) a first HUS bus interconnecting the at least two adaptable cube module connectors to the IMB slave CPU;
   e) a circuit for remotely controlling the multiple electronic hardware devices, the circuit being connected to the IMB slave CPU; and
   f) a power supply for powering the circuit, the IMB master CPU, and the IMB slave CPU, the power supply being connected to an electrical wiring network.

18. The apparatus, according to claim 5, in which each adaptable cube module connector is at least a 28 pin header.

19. The apparatus, according to claim 5, in which each adaptable cube module comprises:
   a) an adaptable cube module connector for receiving the intelligent master base;
   b) a conductive circuit having an eight bit bus portion, and first and second routes;
   c) an 8 bit bus control buffer connected to the second route; and
   d) a plurality of resistors connected to the first route, the resistors defining an address of the adaptable cube module, the conductive circuit communicating data from the intelligent master base to the resistors.

20. The bus, according to claim 2, in which an SL1 signal wire connects the IMB slave CPU to the first control register.

21. The bus, according to claim 2, in which an SL2 signal wire connects the IMB slave CPU to the first data register.

22. The bus, according to claim 2 or 7, in which the network is configured such in response to fifth, sixth, seventh and eighth at least 8 bit data signals being received respectively at the first, second, third and fourth control registers, a fifth, sixth, seventh, and eighth 3 bit load command signal is transmitted to the respective first, second, third and fourth data registers so that each data register is permitted to receive at least 8 bits of data.

23. The bus, according to claim 7, in which a first 32 bit stream of data is received by the first, second, third and fourth control registers.

24. The bus, according to claim 7, in which a second 32 bit stream of data is received by the first, second, third and fourth data registers.

25. The bus, according to claim 7, in which a first clock signal wire interconnects the first, second, third and fourth control registers to the IMB slave CPU.

26. The bus, according to claim 7, in which an enable signal wire interconnects the first, second, third and fourth control registers to the IMB slave CPU.

27. The bus, according to claim 7, in which a second clock signal wire connects the first, second, third and fourth data registers to the IMB slave CPU.

28. The bus, according to claim 7, in which a Data Queue A (DQA) feedback wire connects the fourth data register to the IMB slave CPU.

29. The bus, according to claim 7, in which each control register includes at least one input/output pin and each data register includes at least one input/output pin.

30. The bus, according to claim 8, in which at least three wires interconnect each paired control register and data register.

31. The bus, according to claim 8, in which at least one Adaptable Cube Module (ACM) connector is connected to each pair of control registers and data registers.

32. The apparatus, according to claim 11, in which a second communications control bus is located in the intelligent slave base.

33. The apparatus, according to claim 11, in which a smart plate is connected to the intelligent slave base.

34. The apparatus, according to claim 11, in which the intelligent slave base further comprises:
   a) an Intelligent Slave Base (ISB) master CPU;
   b) at least two adaptable cube module connectors for receiving the adaptable cube modules;
   c) a second communications control bus located in the intelligent slave base; and
   d) a second HUS bus interconnecting the at least two adaptable cube module connectors to the ISB master CPU; and
   e) a power supply for powering the ISB master CPU, the power supply being connected to the IMB.

35. The apparatus, according to claim 11, wherein the intelligent slave base and the intelligent master base are connected by a base expansion connector.

36. The apparatus, according to claim 12, in which the intelligent master base and the adaptable cube module are located in an 1104, 4.times.4 or 4/11/16, 6.times.6, 8.times.8, 10.times.10, 12.times.12, 16.times.16 or 24.times.24 electrical box.

37. The apparatus, according to claim 12, in which the electrical box includes any a combination of one or more hardware devices selected from the group consisting of: IMB, ISB, MUCX's, RF communications in the IMB, lighting dimmer circuits, connectivity for a graphical color touch screen, a long range motion detector, thermostat, a lux meter, smoke detector, doorbell buzzer button, humidistat, intercom, camera, battery charger, GFI (Ground fault interruption), arc detector, single or duplex receptacles, motion sensor, single/double pole button switches, AC/DC discrete low/high voltage input, AC/DC discrete low/high voltage output, DC analog voltage/current output, DC analog voltage/current input, $CO_2$ sensor, RS232 RF links, DAC, ADC, on/off photocell, RS232, RF-RS-232, RS-422, RS-485, RF-RS-422, RF-RS-485, pulse width modulator output, buzzer, night light, power bar with electrical cord, switch/dimmer buttons and battery charger.

38. The apparatus, according to claim 13, in which the smart plate includes features selected from the group consisting of: a graphical color touch screen, a battery charger, proximity sensors, a long range motion sensor, a thermostat, a lux meter, a smoke detector, doorbell buzzer system, video camera images, a humidistat, an intercom system, an intrusion system, a camera, programmable control function blocks, a permanent nightlight, a detachable nightlight, virtual switches/dimmers, hot water tank displays, telephone and smart tagging systems.

39. The apparatus, according to claim 15, in which the slim slave base module comprises a PC board for communicating conductive traces between base expansion connectors, the board having located therein a plurality of holes through which power conductors pass independent of the conductive traces.

40. The apparatus, according to claim 15, in which the slim slave base module comprises a PC board for communicating conductive traces between base expansion connectors, the board having a plurality of housing terminal screws for connecting to the electrical wiring system.

41. The apparatus, according to claim 17, in which the IMB slave CPU is a PIC micro-controller or DSC/DSP processors.

42. The apparatus, according to claim 17, further includes an RF transceiver chip having a mesh topology stack, the stack communicating information in the format of the Serial Pillar To Node (SPTN) communications protocol.

43. The apparatus, according to claim 17, in which the intelligent master base is cuboid.

44. The apparatus, according to claim 19, includes the adaptable cube module connector includes a plurality of connections for use with HUS services.

45. The apparatus, according to claim 19, in which the conductive circuit further comprises a buffer latch control connected to an output of a control register.

46. The apparatus, according to claim 19, further comprises a smart plate cover interface.

47. The apparatus, according to claim 19, in which the resistors are parallel pull up or pull down resistors.

48. The apparatus, according to claim 19, in which the adaptable cube module is cuboid.

49. The bus, according to claim 22, in which the network is configured such in response to ninth, tenth, eleventh and twelfth at least 8 bit data signals being received respectively at the first, second, third and fourth control registers, a fifth, sixth, seventh and eighth 3 bit disable command signal is transmitted to the respective first, second, third and fourth data registers.

50. The bus, according to claim 24, in which the second 32 bit stream of data is transmitted from the fourth data register to the IMB slave CPU.

51. The bus, according to claim 30, in which each control register transmits a 3 bit command signal to each data register located adjacent thereto.

52. The bus, according to claim 31, includes four ACM connectors.

53. The bus, according to claim 31, further comprising a Hardware Utility Signal (HUS) and a Multiple Universal Communication (MUC).

54. The apparatus, according to claim 34, in which the intelligent slave base is cuboid.

55. The apparatus, according to claim 46, in which the smart plate cover interface and the adaptable cube module are one-piece.

56. The apparatus, according to claim 46, in which the smart plate includes a smoke detector, at least one infra red proximity detector, at least one motion detector, at least one GFI (Ground fault interruption), at least one Arc detection, or at least one lighting dimmer circuit.

57. The apparatus, according to claim 35, in which the base expansion connector comprises an $I^2C$ standard.

58. The bus, according to claim 49, in which the network is configured such in response to a 3 bit unload command signal is transmitted to the respective first, second, third and fourth data registers from the respective first, second, third and fourth control registers, the at least 8 bits of data stored in the data registers is transmitted to the IMB slave CPU.

59. The bus, according to claim 53, in which each IMB includes at least four MUCs.

60. An intelligent slave base comprising:
a) an ISB master CPU;
b) four cube module connectors for receiving respectively four adaptable cube modules;
c) a communications control bus according to claim 1;
d) a HUS bus interconnecting the adaptable cube module connectors to the ISB master CPU; and
e) a power supply for powering the ISB master CPU, the power supply being connectable to an intelligent master base.

* * * * *